US009743266B2

(12) United States Patent
Cohen et al.

(10) Patent No.: US 9,743,266 B2
(45) Date of Patent: *Aug. 22, 2017

(54) DEVICE PAIRING VIA DEVICE TO DEVICE CONTACT

(71) Applicant: SEARETE LLC, Bellevue, WA (US)

(72) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 371 days.

This patent is subject to a terminal disclaimer.

(21) Appl. No.: 14/282,971

(22) Filed: May 20, 2014

(65) Prior Publication Data
US 2014/0335789 A1    Nov. 13, 2014

Related U.S. Application Data

(63) Continuation-in-part of application No. 12/932,624, filed on Feb. 28, 2011, now Pat. No. 8,839,389, which
(Continued)

(51) Int. Cl.
H04W 8/00      (2009.01)
H04B 7/24      (2006.01)
H04B 5/00      (2006.01)
H04B 7/00      (2006.01)
H04M 1/66      (2006.01)
(Continued)

(52) U.S. Cl.
CPC .......... *H04W 8/005* (2013.01); *H04L 9/3231* (2013.01); *H04L 63/061* (2013.01); *H04L 63/18* (2013.01); *H04M 1/7253* (2013.01); *H04W 12/06* (2013.01); *H04W 76/023* (2013.01); *G10L 15/26* (2013.01); *H04K 1/00* (2013.01); *H04L 63/0861* (2013.01); *H04L 2209/805* (2013.01); *H04M 2250/12* (2013.01); *H04W 4/008* (2013.01); *H04W 12/04* (2013.01)

(58) Field of Classification Search
CPC . G10L 15/265; G10L 15/26; G10L 2015/221; G10L 2015/223; G10L 2015/225; G10L 2015/22; G10L 17/00; H04M 1/6066; H04W 8/005; H04W 4/008; H04W 40/24; H04W 76/00; H04W 76/02; H04W 76/04; H04W 76/028; G06F 21/30
USPC ...... 704/270, 270.1, 273, 275; 455/418–420, 455/11, 411, 569.1
See application file for complete search history.

(56) References Cited

U.S. PATENT DOCUMENTS 5,805,672 A    9/1998  Barkat
6,154,727 A   11/2000  Karp et al.
(Continued)

OTHER PUBLICATIONS

"Miscellaneous Voice Pairing Material," miscellaneous publications.
(Continued)

*Primary Examiner* — Paras D Shah

(57) ABSTRACT

A system may include and/or involve a first device, a second device, and logic to effect pairing of the first and second devices upon detection of physical contact between the devices.

28 Claims, 15 Drawing Sheets

Related U.S. Application Data is a continuation-in-part of application No. 12/927,609, filed on Nov. 17, 2010, now Pat. No. 8,676,119, which is a continuation-in-part of application No. 11/153,922, filed on Jun. 14, 2005, now Pat. No. 7,865,140, which is a continuation-in-part of application No. 11/150,858, filed on Jun. 10, 2005, now Pat. No. 8,699,944, which is a continuation-in-part of application No. 11/137,859, filed on May 24, 2005, now Pat. No. 9,258,285, which is a continuation-in-part of application No. 11/136,099, filed on May 23, 2005, now Pat. No. 7,925,022.

(51) Int. Cl.

| | |
|---|---|
| H04M 3/00 | (2006.01) |
| H04M 1/00 | (2006.01) |
| H04B 1/00 | (2006.01) |
| G10L 21/00 | (2013.01) |
| H04W 76/02 | (2009.01) |
| H04L 9/32 | (2006.01) |
| H04L 29/06 | (2006.01) |
| H04M 1/725 | (2006.01) |
| H04W 12/06 | (2009.01) |
| H04W 4/00 | (2009.01) |
| G10L 15/26 | (2006.01) |
| H04W 12/04 | (2009.01) |
| H04K 1/00 | (2006.01) |

(56) References Cited

U.S. PATENT DOCUMENTS

| | | | |
|---|---|---|---|
| 6,314,401 B1 * | 11/2001 | Abbe | G07C 9/00087 704/272 |
| 6,377,825 B1 | 4/2002 | Kennedy | |
| 6,480,825 B1 | 11/2002 | Sharma et al. | |
| 6,529,875 B1 | 3/2003 | Nakajima et al. | |
| 6,823,186 B2 | 11/2004 | Salokannel et al. | |
| 6,867,965 B2 | 3/2005 | Khoo | |
| 6,961,541 B2 | 11/2005 | Overy et al. | |
| 7,050,834 B2 | 5/2006 | Harwood et al. | |
| 7,072,886 B2 | 7/2006 | Salmenkaita et al. | |
| 7,082,316 B2 | 7/2006 | Eiden et al. | |
| 7,088,220 B2 | 8/2006 | Kotzin | |
| 7,254,708 B2 | 8/2007 | Silvester | |
| 7,350,230 B2 * | 3/2008 | Forrest | G06Q 20/32 705/67 |
| 7,363,505 B2 | 4/2008 | Black | |
| 7,684,754 B2 | 3/2010 | Glass et al. | |
| 7,778,601 B2 | 8/2010 | Seshadri et al. | |
| 7,925,022 B2 | 4/2011 | Jung et al. | |
| 2002/0065663 A1 | 5/2002 | Thomas et al. | |
| 2002/0137505 A1 | 9/2002 | Eiche | |
| 2003/0162556 A1 | 8/2003 | Libes | |
| 2003/0220765 A1 * | 11/2003 | Overy | H04L 63/0492 702/158 |
| 2003/0226041 A1 | 12/2003 | Palmer et al. | |
| 2004/0073795 A1 | 4/2004 | Jablon | |
| 2004/0123106 A1 | 6/2004 | D'Angelo et al. | |
| 2004/0124966 A1 | 7/2004 | Forrest | |
| 2004/0132510 A1 | 7/2004 | Yamashita | |
| 2004/0246607 A1 | 12/2004 | Watson et al. | |
| 2004/0248513 A1 * | 12/2004 | Glass | H04W 40/24 455/41.1 |
| 2005/0010417 A1 | 1/2005 | Holmes | |
| 2005/0018687 A1 * | 1/2005 | Cutler | H04L 29/06027 370/395.2 |
| 2005/0044372 A1 * | 2/2005 | Aull | G06F 21/35 713/176 |
| 2005/0048961 A1 | 3/2005 | Ribaudo et al. | |
| 2005/0125664 A1 * | 6/2005 | Berkema | H04L 63/061 713/168 |
| 2005/0221829 A1 * | 10/2005 | Nishida | G01S 11/06 455/440 |
| 2005/0266798 A1 | 12/2005 | Moloney et al. | |
| 2006/0019605 A1 | 1/2006 | Shau | |
| 2006/0046719 A1 | 3/2006 | Holtschneider | |
| 2006/0068842 A1 | 3/2006 | Sanguino et al. | |
| 2006/0116107 A1 | 6/2006 | Hulvey | |
| 2006/0267860 A1 | 11/2006 | Rinaldo, Jr. et al. | |
| 2007/0026797 A1 * | 2/2007 | Borjeson | G06F 21/445 455/41.2 |
| 2007/0173212 A1 | 7/2007 | Mergler | |
| 2008/0166966 A1 | 7/2008 | Hamasaki et al. | |

OTHER PUBLICATIONS

"Miscellaneous Sources for Near Field Communications," miscellaneous publications.

ECMA International, "Near Field Communication," Ecma/TC32-TG19/2004/1.

"Cellport Announces First Universal, Hands-Free Cell Phone System for Cars"; Intelligent Transportation Society of America; Bearing a date of Jul. 16, 2001; pp. 1-2; printed on Feb. 24, 2006. http://www.itsa.org/itsnews.nsf/key/5FAA?OpenDocument; Intelligent Transportation Society of America.

"eCash on the Move at Volkswagen"; iButton Applications/Dallas Semiconductor MAXIM, Bearing a date of 2006; pp. 1-2; printed on Feb. 27, 2006; http://www.maxim-ic.com/products/ibutton/applications/index.cfm?Act-ion=DD&id=21; Maxim Integrated Products.

"Ecma welcomes ISO/IEC adoption of NFC Standard for short range wireless communication"; ecma Internatonal; Bearing a date of Dec. 8, 2003; printed Feb. 24, 2006; pp. 1-3; http://www.ecma-international.org/news/Ecma-340-NFCIP-1.htm.

"Industry giants tout touch computing"; Computing; Bearing the dates of 1995-2006; pp. 1-2; printed Feb. 24, 2006; http://www.computing.co.uk/vnunet/news2124597/industry-giants; vnu business publications.

Kiser, Ken; "Newall Electronics Introduces Wearable DRO Technology"; Industrial Product News Online; pp. 1-2; printed Feb. 24, 2006; http://www.ipnews.com/archives/dro/jan02/newall%5Felect.htm.

Cameron, Casey et al.; "Knuckletop Computing: The Java Ring"; pp. 1-4.
http://java.sun.com/features/1998/03/rings.html.

Lewis, John; "Put on your human-machine interface"; Design News; Bearing dates Aug. 20, 2001 and 1997-2006; pp. 1-4; printed Feb. 24, 2006; http://designnews.com/article/CA150040.html; Reed Business Information.

"Mass Transit in Istanbul, Turkey" and "Parking in Argentina"; iButton Applications/Dallas Semiconductor MAXIM; Bearing a date of 2006; pp. 1-3; printed Feb. 27, 2006; http://www.maxim-ic.com/products/ibutton/applications/index.cfm?Action=DD-&id=8; Maxim Integrated Products.

"Near Field Communication"; What You Need to Know About; Bearing a date of 2006; pp. 1-3; printed on Mar. 3, 2006; http://experts.about.com/e/n/ne/Near.sub.--Field.sub.--Communication.htm; About, Inc.

"Near Field Communication"; Wikipedia; Bearing a date of Feb. 17, 2006; pp. 1-2; printed on Feb. 24, 2006; http://en.wikipedia.org/wiki/Near.sub.--Field.sub.--Communication.

"Secure Website Logon and Transactions"; iButton Applications; Bearing a date of 2004; pp. 1-2; printed on Mar. 3, 2006; http://72.14.207.104/search?q=cache:4JM396tN.sub.--ToJ:db.maxim-ic.com/ib-utton/applications/index.cfm; Maxim/Dallas Semiconductor Corp.

* cited by examiner

DEVICE PAIRING VIA DEVICE TO DEVICE CONTACT

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)). In addition, the present application is related to the "Related Application(s)," if any, listed below:

1. For purposes of the USPTO extra-statutory requirements, the present application constitutes a continuation in part of currently co-pending U.S. patent application entitled DEVICE PAIRING VIA DEVICE TO DEVICE CONTACT, naming Alexander J. Cohen, Edward K.Y. Jung, Royce A. Levien, Robert W. Lord, Mark A. Malamud, John D. Rinaldo Jr. as inventors, U.S. application Ser. No. 11/136,099 filed May 23, 2005, which is currently co-pending, or is an application of which a currently co-pending application is entitled to the benefit of the filing date.

2. For purposes of the USPTO extra-statutory requirements, the present application constitutes a continuation in part of currently co-pending U.S. patent application entitled DEVICE PAIRING VIA HUMAN INITIATED CONTACT, naming Alexander J. Cohen, Edward K.Y. Jung, Royce A. Levien, Robert W. Lord, Mark A. Malamud, John D. Rinaldo Jr. as inventors, U.S. application Ser. No. 11/137,859 filed May 24, 2005, which is currently co-pending, or is an application of which a currently co-pending application is entitled to the benefit of the filing date.

3. For purposes of the USPTO extra-statutory requirements, the present application constitutes a continuation in part of currently co-pending U.S. patent application entitled DEVICE PAIRING VIA VOICE COMMANDS, naming Alexander J. Cohen, Edward K.Y. Jung, Royce A. Levien, Robert W. Lord, Mark A. Malamud, John D. Rinaldo Jr. as inventors, U.S. application Ser. No. 11/150,858 filed Jun. 10, 2005, which is currently co-pending, or is an application of which a currently co-pending application is entitled to the benefit of the filing date.

4. For purposes of the USPTO extra-statutory requirements, the present application constitutes a continuation in part of currently co-pending U.S. patent application entitled DEVICE PAIRING VIA INTERMEDIARY DEVICE, naming Alexander J. Cohen, Edward K.Y. Jung, Royce A. Levien, Robert W. Lord, Mark A. Malamud, John D. Rinaldo Jr. as inventors, U.S. application Ser. No. 11/153,922 filed Jun. 14, 2005, which is currently co-pending, or is an application of which a currently co-pending application is entitled to the benefit of the filing date.

5. For purposes of the USPTO extra-statutory requirements, the present application constitutes a continuation in part of currently co-pending U.S. patent application entitled DEVICE PAIRING VIA INTERMEDIARY DEVICE, naming Alexander J. Cohen, Edward K.Y. Jung, Royce A. Levien, Robert W. Lord, Mark A. Malamud, John D. Rinaldo Jr. as inventors, U.S. application Ser. No. 12/927,609 filed Nov. 17, 2010, which is currently co-pending, or is an application of which a currently co-pending application is entitled to the benefit of the filing date.

6. For purposes of the USPTO extra-statutory requirements, the present application constitutes a continuation in part of currently co-pending U.S. patent application entitled DEVICE PAIRING VIA DEVICE TO DEVICE CONTACT, naming Alexander J. Cohen, Edward K.Y. Jung, Royce A. Levien, Robert W. Lord, Mark A. Malamud, John D. Rinaldo Jr. as inventors, U.S. application Ser. No. 12/932,624 filed Feb. 28, 2011, which is currently co-pending, or is an application of which a currently co-pending application is entitled to the benefit of the filing date.

PRIORITY APPLICATIONS

If an Application Data Sheet (ADS) has been filed on the filing date of this application, it is incorporated by reference herein. Any applications claimed on the ADS for priority under 35 U.S.C. §§119, 120, 121 or 365(c), and any and all parent, grandparent, great-grandparent, etc. applications of such applications, are also incorporated by reference, including any priority claims made in those applications and any material incorporated by reference, to the extent such subject matter is not inconsistent herewith.

RELATED APPLICATIONS

None.

The United States Patent and Trademark Office (USPTO) has published a notice to the effect that the USPTO's computer program require that patent applications both reference a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listing of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates to the pairing of two devices for trusted cooperation.

BACKGROUND

Pairing involves establishing a secure and/or trusted wireless communication channel between devices. Pairing is becoming more common in a world increasingly populated by cooperating devices. However, the mechanisms for pairing devices remain relatively primitive and do not take advantage of the rich variety of ways in which people and devices may interact with and among one another.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

i. A device may include and/or involve at least one contact sensor, and logic to effect pairing with another device upon activation of the contact sensor.

ii. The device may include and/or involve logic to detect increasing proximity with the other device and to interpret activation of the contact sensor, in conjunction with recently detected increasing proximity with the other device, as an indication that pairing with the other device should be attempted.

iii. The device may include and/or involve logic to enable the device to wirelessly exchange with the other device information needed for pairing, upon approaching or becoming proximate with the other device, but prior to activation of the contact sensor, and logic to interpret activation of the contact sensor as an indication that the information should be applied to complete the pairing process.

iv. The device may include and/or involve logic to enable the device to exchange with the other device information needed for pairing via the physical contact point.

v. The device may include and/or involve logic to interpret activation of the contact sensor as an indication to initiate exchange with the other device of at least one of authentication, authorization, or compatibility information needed for pairing.

vi. The device may include and/or involve logic to interrupt the pairing process if contact is broken.

vii. The device may include and/or involve logic to enable the device to wirelessly exchange with the other device information needed for pairing only during activation of the contact sensor.

viii. The device may include and/or involve logic to authenticate and/or authorize pairing with the other device.

ix. The device may include and/or involve logic to establish a secure channel for communication of pairing information.

x. The device may include and/or involve logic to ascertain a manner in which contact between the devices is accomplished. The logic to ascertain a manner in which contact between the two devices is accomplished may include and/or involve logic to ascertain relative motion between the device and the other device. The logic to ascertain relative motion between the device and the other device may include and/or involve logic to ascertain at least one of rotation, angle of approach, or relative lateral motion between the device and the other device.

xi. The device may include and/or involve logic to ascertain relative motion between the device and the other device at the point of contact. The logic to ascertain relative motion between the device and the other device may include and/or involve logic to ascertain at least one of rotation, angle of approach, or relative lateral motion between the device and the other device, and/or logic to ascertain at least one of rotation at the point of contact, angle of contact, or relative lateral motion at the point of contact.

xii. The device may include and/or involve logic to detect a duration of contact and to interpret the duration of contact as an indication of how and/or whether pairing of the device and the other device should proceed.

xiii. The device may include and/or involve logic to detect multiple instances of contact and to interpret the multiple instances of contact as an indication of how and/or whether pairing of the device and the other device should proceed.

xiv. The device may include and/or involve logic to detect an intensity of contact and to interpret the intensity of contact as an indication of how and/or whether pairing of the device and the other device should proceed. The logic to detect an intensity of contact and to interpret the intensity of contact as an indication of how and/or whether pairing of the device and the other device should proceed may include and/or involve logic to detect at least one of an average contact force, a peak contact force, or a force gradient.

xv. The device may include and/or involve logic to detect temperature at the contact point or points, and/or conductivity at the contact point or points, as an indication of how and/or whether pairing of the device and the other device should proceed.

xvi. The device may include and/or involve logic to communicate wirelessly with at least one device different than the other device to obtain information needed to effect pairing with the other device. The at least one device different than the other device may include and/or involve at least one proximate desktop, laptop, or handheld computing device.

xvii. The device may include and/or involve logic to await user input as a result of activation of the contact sensor. The logic to await user input as a result of activation of the contact sensor may include and/or involve logic to await authentication information for the user, and/or logic to await at least one of input from a keypad, voice input, or biometric input.

xviii. The device may include and/or involve logic to authorize an extent of pairing of the device and the other device. The logic to authorize an extent of pairing of the device and the other device may include and/or involve logic to authorize paired access to a greater number and/or different functions of one or both devices than would be available if the devices were paired without physical contact, and/or logic to authorize paired access the extent of which varies according to the manner and/or point of physical contact between the devices, and/or logic to authorize that a person using one or both devices is authorized to do so, and/or to what extent.

xix. The device may include and/or involve logic to provide one or more audible and/or visual and/or tactile indications on the progress and/or results of pairing of the device and the other device. The logic to provide one or more audible and/or visual and/or tactile indications on the progress and/or results of pairing of the device and other device may include and/or involve at least one menu of pairing options, and/or logic to provide an indication that a user should provide input to the pairing process, and/or logic to provide at least one of one or more lights, tones, vibrations, sounds, or display indications, and/or at least one of logic to provide an indication that pairing was (a) successful, (b) unsuccessful due to insufficient available information, (c) to indicate that pairing between the devices is available, or (d) to indicate that pairing is in process. The logic to provide an indication that a user should provide input to the pairing process may include and/or involve logic to provide an indication that the user should provide at least one of a password, a spoken input, a biometric input, or information from a card and/or memory device.

xx. A method may include and/or involve detecting physical contact between devices, and effecting pairing between the devices as a result of detecting the physical contact.

xxi. The method may include and/or involve detecting proximity between the devices and interpreting physical contact, in conjunction with recently detected increasing proximity between the devices, as an indication that pairing of the devices should be attempted.

xxii. The method may include and/or involve wirelessly exchanging information needed for pairing between the devices, upon the devices becoming proximate with one another, but prior to contact between the devices, and interpreting contact between the devices as an indication to complete pairing of the devices.

xxiii. The method may include and/or involve exchanging information needed for pairing the devices via one or more physical contact points.

xxiv. The method may include and/or involve contact between the devices initiating exchange between the devices of at least one of authentication, authorization, or compatibility information needed for pairing.

xxv. The method may include and/or involve interrupting the pairing process if the devices lose contact with one another.

xxvi. The method may include and/or involve the devices wirelessly exchanging pairing information only during a time when the devices are in physical contact.

xxvii. The method may include and/or involve ascertaining a manner in which contact between the two devices is accomplished. Ascertaining a manner in which contact between the two devices is accomplished may include and/or involve ascertaining relative motion between the devices. Ascertaining relative motion between the devices may include and/or involve ascertaining at least one of rotation, angle of approach, or relative lateral motion between the devices.

xxviii. The method may include and/or involve ascertaining relative motion between the devices at one or more points of contact. Ascertaining relative motion between the devices may include and/or involve ascertaining at least one of rotation, angle of approach, or relative lateral motion between the devices, and/or ascertaining at least one of rotation, angle of contact, or relative lateral motion at the one or more points of contact.

xxix. The method may include and/or involve interpreting a duration of contact as an indication of how and/or whether pairing of the devices should proceed and/or be accomplished.

xxx. The method may include and/or involve interpreting multiple instances of contact between the devices as an indication of how and/or whether pairing of the devices should proceed and/or be accomplished.

xxxi. The method may include and/or involve interpreting an intensity of contact between the devices as an indication of how and/or whether pairing of the devices should proceed and/or be accomplished. Interpreting the intensity of contact between the devices as an indication of how and/or whether pairing of the devices should proceed and/or be accomplished may include and/or involve applying at least one of an average contact force, a peak contact force, or a force gradient as the indication of how and/or whether pairing of the devices should proceed and/or be accomplished.

xxxii. The method may include and/or involve the devices communicating wirelessly to obtain information needed to effect pairing with one another.

xxxiii. The method may include and/or involve prompting for user input as a result of contact occurring between the devices. Prompting for user input as a result of contact occurring between the devices may include and/or involve prompting for authentication information for the user, and/or providing an indication that the user should provide at least one of input from a keypad, voice input, or biometric input.

xxxiv. The method may include and/or involve authorizing an extent of pairing of the devices according to at least one of identification of one or both of the devices, or identification of a user of one or both of the devices. Authorizing an extent of pairing of the devices according to at least one of identification of one or both of the devices, or identification of a user of one or both of the devices may include and/or involve authorizing access to a greater number and/or different functions of one or both devices than would be available if the devices were paired without physical contact, and/or authorizing access to functions and/or features of one or both devices to an extent that varies according to the manner and/or point of physical contact between the devices, and/or authorizing that the user may use one or both devices, and/or to what extent.

xxxv. The method may include and/or involve providing one or more audible and/or visual and/or tactile indications on the progress and/or results of pairing of the devices.

xxxvi. A system may include and/or involve a first device, a second device, and logic to effect pairing of the first and second devices upon detection of physical contact between the devices.

xxxvii. The system may include and/or involve logic to detect increasing proximity between the first and second devices and to interpret physical contact between the devices, in conjunction with recently detected increasing proximity between the devices, as an indication that pairing of the devices should be effected.

xxxviii. The system may include and/or involve logic to enable the devices to wirelessly exchange information needed for pairing, upon the devices approaching or becoming proximate with one another, but prior to physical contact between the devices, and logic to interpret activation of the contact sensor as an indication that the information should be applied to complete the pairing process.

xxxix. The system may include and/or involve logic to enable the devices to exchange pairing information with one another via one or more physical contact points.

xl. The system may include and/or involve logic to interpret physical contact between the devices as an indication to initiate exchange between the devices of at least some of authentication, authorization, or compatibility information needed for pairing.

xli. The system may include and/or involve logic to interrupt the pairing process if contact between the devices is broken.

xlii. The system may include and/or involve logic to enable the devices to wirelessly exchange information needed for pairing only during physical contact between the devices.

xliii. The system may include and/or involve logic to authenticate and/or authorize pairing between the devices.

xliv. The system may include and/or involve logic to establish a secure channel for communication of pairing information between the devices.

xlv. The system may include and/or involve logic to ascertain a manner in which contact between the devices is accomplished. The logic to ascertain a manner in which contact between the devices is accomplished may include and/or involve logic to ascertain relative motion between the devices. The logic to ascertain relative motion between the devices may include and/or involve logic to ascertain at least one of rotation, angle of approach, or relative lateral motion between the devices.

xlvi. The system may include and/or involve logic to ascertain relative motion between the devices at one or more points of contact. The logic to ascertain relative motion between the devices may include and/or involve logic to ascertain at least one of rotation, angle of approach, or relative lateral motion between the devices, and/or logic to ascertain at least one of rotation at the point of contact, angle of contact, or relative lateral motion at the point of contact.

xlvii. The system may include and/or involve logic to detect a duration of contact between the devices and to interpret the duration of contact as an indication of how and/or whether pairing of the devices should proceed.

xlviii. The system may include and/or involve logic to detect multiple instances of contact between the devices and to interpret the multiple instances of contact as an indication of how and/or whether pairing of the devices should proceed.

xlix. The system may include and/or involve logic to detect an intensity of contact between the devices and to interpret the intensity of contact as an indication of how and/or whether pairing of the devices should proceed. The logic to detect an intensity of contact between the devices and to interpret the intensity of contact as an indication of how and/or whether pairing of the devices should proceed may include and/or involve logic to detect at least one of an average contact force, a peak contact force, or a force gradient.

l. The system may include and/or involve logic to communicate wirelessly with at least one device different than the devices to pair, to obtain information needed to effect pairing between the devices. The at least one device different than the devices to pair may include and/or involve at least one proximate desktop, laptop, or handheld computing device.

li. The system may include and/or involve logic to await user input as a result of contact between the devices. The logic to await user input as a result of contact between the devices may include and/or involve logic to await authentication information for the user, and/or logic to await at least one of input from a keypad, a voice input, or a biometric input.

lii. The system may include and/or involve logic to authorize an extent of pairing of the devices. The logic to authorize an extent of pairing of the devices may include and/or involve logic to authorize paired access to a greater number and/or different functions of one or both devices than would be available if the devices were paired without physical contact, and/or logic to authorize paired access the extent of which varies according to the manner and/or point or points of physical contact between the devices, and/or logic to authorize that a person using one or both devices is authorized to do so, and/or to what extent.

liii. The system may include and/or involve logic to provide one or more audible and/or visual and/or tactile indications on the progress and/or results of pairing of the devices. The logic to provide one or more audible and/or visual and/or tactile indications on the progress and/or results of pairing of the devices may include and/or involve logic to provide at least one menu of pairing options, and/or logic to provide an indication that a user should provide input to the pairing process, and/or logic to provide at least one of one or more lights, tones, vibrations, sounds, or display indications, and/or at least one of logic to provide an indication that pairing was (a) successful, (b) unsuccessful due to insufficient available information, (c) to indicate that pairing between the devices is available, or (d) to indicate that pairing is in process. The logic to provide an indication that a user should provide input to the pairing process may include and/or involve logic to provide an indication that the user should provide at least one of a password, a spoken input, a biometric input, or information from a card and/or memory device.

liv. Other system/method/apparatus aspects are described in the text (e.g. detailed description and claims) and drawings forming the present application.

A device may include and/or involve at least one contact sensor, and logic to cause the device to, upon activation of the contact sensor, wait for a signal from another device indicating that the other device has been touched, and upon receiving the signal, undertake pairing with the other device. The logic to cause the device to, upon activation of the contact sensor, wait for a signal from another device indicating that the other device has been touched, and upon receiving the signal, undertake pairing with the other device may include and/or involve logic to cause the device, upon activation of the contact sensor, to wait for a limited amount of time for the signal indicating that the other device has been touched, and if such signal is not received within the limited amount of time, to cause the device to stop waiting for the signal, and/or one or more one touch-sensitive areas, temperature-sensitive areas, or conductivity-sensitive areas.

The device may include and/or involve logic to detect increasing proximity with the other device and to interpret activation of the contact sensor, in conjunction with recently detected increasing proximity with the other device, as an indication that preparation to pair with the other device should be initiated.

The device may include and/or involve logic to enable the device to wirelessly exchange with the other device information needed for pairing, upon approaching or becoming proximate with the other device, but prior to activation of the contact sensor, and logic to interpret activation of the contact sensor as an indication that the information should be applied to complete the pairing process upon receiving the signal indicating that the other device has been touched.

The device may include and/or involve logic to enable the device to exchange with the other device information needed for pairing via physical contact points of the device and the other device.

The device may include and/or involve logic to interpret activation of the contact sensor as an indication to initiate exchange with the other device of at least some of authentication, authorization, or compatibility information needed for pairing, and to interpret the signal indicating that the other device has been touched as an indication that the authentication, authorization, or compatibility information should be applied to complete pairing with the other device.

The device may include and/or involve logic to interrupt the pairing process if contact with the device or other device is broken.

The device may include and/or involve logic to enable the device to wirelessly exchange with the other device information needed for pairing only during activation of the contact sensor of the device, or only during activation of the contact sensor of the device and after receiving the signal indicating that the other device has been touched.

The device may include and/or involve logic to authenticate and/or authorize pairing with the other device.

The device may include and/or involve logic to establish a secure channel between the device and the other device for communication of pairing information.

The device may include and/or involve logic to ascertain a manner in which contact with the device is accomplished. The logic to ascertain a manner in which contact with the device is accomplished may include and/or involve logic to ascertain relative motion between the device and a finger that is contacting the device. The logic to ascertain relative motion between the device and a finger that is contacting the device may include and/or involve logic to ascertain at least one of rotation, angle of incidence, or relative lateral and/or circular motion between the device and the finger.

The device may include and/or involve logic to ascertain relative motion between the device and the other device. The logic to ascertain relative motion between the device and the other device may include and/or involve logic to ascertain at least one of rotation of one device with respect to the other, angle between the devices, or relative lateral motion of the devices.

The device may include and/or involve logic to detect a duration of contact and to interpret the duration of contact as an indication of how and/or whether pairing of the device and the other device should proceed.

The device may include and/or involve logic to detect multiple instances of contact and to interpret the multiple instances of contact as an indication of how and/or whether pairing of the device and the other device should proceed.

The device may include and/or involve logic to detect an intensity of contact and to interpret the intensity of contact as an indication of how and/or whether pairing of the device and the other device should proceed. The logic to detect an intensity of contact and to interpret the intensity of contact as an indication of how and/or whether pairing of the device and the other device should proceed may include and/or involve logic to detect at least one of an average contact force, a peak contact force, or a force gradient.

The device may include and/or involve logic to communicate wirelessly with at least one device different than the other device to obtain information needed to effect pairing with the other device. The at least one device different than the other device may include and/or involve at least one of a proximate desktop, a laptop, or a handheld computing device.

The device may include and/or involve logic to await and employ user input as a result of activation of the contact sensor and signal indicating that the other device has been touched. The logic to await and employ user input as a result of activation of the contact sensor and signal indicating that the other device has been touched may include and/or involve logic to await and employ authentication information for the user, and/or logic to await and employ at least one of input from a keypad, voice input, or biometric input.

The device may include and/or involve logic to authorize an extent of pairing of the device and the other device. The logic to authorize an extent of pairing of the device and the other device may include and/or involve logic to authorize paired access to a greater number and/or different functions of one or both devices than would be available if the devices were paired without each device being touched, and/or logic to authorize paired access the extent of which varies according to the manner and/or point of physical contact with the device and/or the other device, and/or logic to authorize that a person using one or both devices is authorized to do so, and/or to what extent, and/or logic to determine an extent of pairing based at least in part upon which device is touched first. The logic to authorize paired access the extent of which varies according to the manner and/or point of physical contact with the device and/or the other device may include and/or involve logic to authorize paired access the extent of which varies according to an amount of area touched on one or both devices.

The device may include and/or involve logic to provide one or more audible and/or visual and/or tactile indications on the progress and/or results of pairing of the device and other device. The logic to provide one or more audible and/or visual and/or tactile indications on the progress and/or results of pairing of the device and other device may include and/or involve at least one menu of pairing options, and/or logic to provide an indication that a user should provide input to the pairing process, and/or logic to provide a first indication when the first device is touched, and logic to provide a second indication when the second device is touched, and/or logic to provide at least one of one or more lights, tones, vibrations, sounds, or display indications, and/or at least one of logic to provide an indication that the pairing was successful, an indication that the pairing was unsuccessful due to insufficient available information, an indication that the pairing between the devices is available, or an indication that the pairing is in process. The logic to provide an indication that a user should provide input to the pairing process may include and/or involve logic to provide an indication that the user should provide at least one of a password, a spoken input, a biometric input, or information from a card and/or memory device.

A method may include and/or involve detecting physical contact of a person with a first device and/or with a second device, and effecting pairing between the first and second device as a result of detecting the physical contact of the person with the first and/or the second devices.

The method may include and/or involve effecting pairing between devices upon detection of simultaneous physical contact with both devices by the person.

The method may include and/or involve detecting contact with the first device, followed by contact with the second device, as an indication that pairing of the devices should be effected.

The method may include and/or involve wirelessly exchanging information needed for pairing between the devices, upon the devices becoming proximate with one another, but prior to contact with the devices, and interpreting contact with the devices as an indication to complete pairing of the devices.

The method may include and/or involve the devices exchanging information needed for pairing via points where the devices are touched.

The method may include and/or involve touching a first of the devices initiating exchange between the devices of at least some of authentication, authorization, or compatibility information needed for pairing.

The method may include and/or involve interrupting the pairing process if contact is lost with one or both of the devices.

The method may include and/or involve the devices wirelessly exchanging pairing information only during a time when contact is made with one or both of the devices.

The method may include and/or involve ascertaining a manner in which contact with one or both devices is accomplished. Ascertaining a manner in which contact with one or both devices is accomplished may include and/or involve ascertaining the manner in which one or more fingers touch one or both devices. Ascertaining the manner in which one or more fingers touch one or both devices may include and/or involve ascertaining at least one of rotation, angle of approach, or relative lateral motion of one or more fingers at one or more points of contact with one or more of the devices.

The method may include and/or involve ascertaining relative motion between the devices. Ascertaining relative motion between the devices may include and/or involve ascertaining at least one of rotation, relative angle, or relative lateral motion of the devices.

The method may include and/or involve interpreting a duration of contact with one or both devices as an indication of how and/or whether pairing of the devices should proceed and/or be accomplished.

The method may include and/or involve interpreting multiple instances of contact with one or both devices as an indication of how and/or whether pairing of the devices should proceed and/or be accomplished.

The method may include and/or involve interpreting the intensity of contact with one or both devices as an indication of how and/or whether pairing of the devices should proceed and/or be accomplished. Interpreting the intensity of contact with one or both devices as an indication of how and/or whether pairing of the devices should proceed and/or be accomplished may include and/or involve interpreting at least one of an average contact force, a peak contact force, or a force gradient as the indication of how and/or whether pairing of the devices should proceed and/or be accomplished.

The method may include and/or involve the devices communicating wirelessly to obtain information needed to effect pairing with one another.

The method may include and/or involve prompting for user input as a result of contact occurring with one or both devices. Prompting for user input as a result of contact occurring with one or both devices may include and/or involve prompting for authentication information for the user, and/or providing an indication that the user should provide at least one of input from a keypad, voice input, or biometric input.

The method may include and/or involve authorizing an extent of pairing of the devices according to at least one of identification of one or both of the devices, or identification of a user of one or both of the devices. Authorizing an extent of pairing of the devices according to at least one of identification of one or both of the devices, or identification of a user of one or both of the devices may include and/or involve authorizing access to a greater number and/or different functions of one or both devices than would be available if the devices were paired without contact taking place to one or both devices, and/or authorizing access to functions and/or features of one or both devices to an extent of which varies according to the manner and/or point of contact with one or both devices, and/or authorizing that the user may use one or both devices, and/or to what extent.

The method may include and/or involve providing one or more audible and/or visual and/or tactile indications on the progress and/or results of pairing of the devices.

A system may include and/or involve a first device, a second device, and logic to effect pairing of the first and second devices upon activation of contact sensors of both the first and second devices.

The system may include and/or involve logic to detect increasing proximity between the devices and to interpret activation of one or both of the contact sensors, in conjunction with recently detected increasing proximity between the devices, as an indication that preparation to pair the devices should be initiated.

The system may include and/or involve logic to enable the devices to wirelessly exchange information needed for pairing, upon the devices approaching or becoming proximate with one another, but prior to activation of contact sensors of one or both devices, and logic to interpret activation of the contact sensors of one or both devices as an indication that the information should be applied to complete the pairing process.

The system may include and/or involve logic to enable the devices to exchange information needed for pairing via physical contact points of the devices.

The system may include and/or involve logic to interpret activation of the contact sensors of one or both devices as an indication to initiate exchange between the devices of at least some of authentication, authorization, or compatibility information needed for pairing, and to interpret signals indicating that the devices have been touched as an indication that the authentication, authorization, or compatibility information should be applied to complete pairing between the devices.

The system may include and/or involve logic to interrupt the pairing process if contact with one or both devices is broken.

The system may include and/or involve logic to enable the devices to wirelessly exchange information needed for pairing only during activation of contact sensors of both devices.

The system may include and/or involve logic to authenticate and/or authorize pairing between the devices.

The system may include and/or involve logic to establish a secure channel between the devices for communication of pairing information.

The system may include and/or involve logic to ascertain a manner in which contact with one or both devices is accomplished. The logic to ascertain a manner in which contact with one or both devices is accomplished may include and/or involve logic to ascertain relative motion between one or both devices, and/or a finger or fingers contacting one or both devices. The logic to ascertain relative motion between one or both devices, and/or a finger or fingers contacting one or both devices may include and/or involve logic to ascertain at least one of rotation, angle of incidence, or relative lateral and/or circular motion between the devices and/or the fingers and the devices.

The system may include and/or involve logic to ascertain relative motion between the devices. The logic to ascertain relative motion between the devices may include and/or involve logic to ascertain at least one of rotation of one device with respect to the other, angle between the devices, or relative lateral motion of the devices.

The system may include and/or involve logic to detect a duration of contact with one or both devices and to interpret the duration of contact as an indication of how and/or whether pairing of the devices should proceed.

The system may include and/or involve logic to detect multiple instances of contact with one or both devices and to interpret the multiple instances of contact as an indication of how and/or whether pairing of the devices should proceed.

The system may include and/or involve logic to detect an intensity of contact with one or both devices and to interpret the intensity of contact as an indication of how and/or whether pairing of the devices should proceed. The logic to detect an intensity of contact with one or both devices and to interpret the intensity of contact as an indication of how and/or whether pairing of the devices should proceed may include and/or involve logic to detect at least one of an average contact force, a peak contact force, or a force gradient.

The system may include and/or involve logic to communicate wirelessly with at least one device different than the devices being paired in order to obtain information needed to effect pairing between the devices. The at least one device different than the devices being paired may include and/or involve at least one of a proximate desktop, a laptop, or a handheld computing device.

The system may include and/or involve logic to await user input as a result of activation of contact sensors of one or both devices. The logic to await user input as a result of activation of contact sensors of one or both devices may include and/or involve logic to await authentication information for the user, and/or logic to await at least one of input from a keypad, voice input, or biometric input.

The system may include and/or involve logic to authorize an extent of pairing of the devices. The logic to authorize an extent of pairing of the devices may include and/or involve logic to authorize paired access to a greater number and/or different functions of one or both devices than would be available if the devices were paired without each device being touched, and/or logic to authorize paired access the extent of which varies according to the manner and/or point of physical contact with one or both devices, and/or logic to authorize that a person using one or both devices is authorized to do so, and/or to what extent, and/or logic to determine an extent of pairing based at least in part upon which device is touched first. The logic to authorize paired access the extent of which varies according to the manner and/or point of physical contact with one or both devices may include and/or involve logic to authorize paired access the extent of which varies according to an amount of area touched on one or both devices.

The system may include and/or involve logic to provide one or more audible and/or visual and/or tactile indications on the progress and/or results of pairing of the devices. The logic to provide one or more audible and/or visual and/or tactile indications on the progress and/or results of pairing of the devices may include and/or involve at least one menu of pairing options, and/or logic to provide an indication that a user should provide input to the pairing process, and/or logic to provide a first indication when the first device is touched, and logic to provide a second indication when the second device is touched, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available or an indication that pairing is in process. The logic to provide an indication that a user should provide input to the pairing process may include and/or involve logic to provide an indication that the user should provide at least one of a password, a spoken input, a biometric input, or information from a card and/or memory device. Other system/method/apparatus aspects are described in the text (e.g., detailed description and claims) and drawings forming the present application.

A method may include and/or involve receiving at least one sound, and pairing at least two devices as a result of the at least one sound. Pairing at least two devices as a result of the at least one sound may include and/or involve recognizing from the sound an identification of at least one of the devices, and/or extracting authentication information from the sound, and/or identifying at least one purpose, feature, attribute, and/or function from the sound and identifying at least one of the devices, and/or a pairing thereof, as providing the identified at least one purpose, feature, attribute, and/or function, and/or comparing information of the sound with a biometric voice print, and/or extracting from the sound both information needed to pair the devices and a biometric voice print, and/or analyzing voice information of the at least one sound, and/or identifying a type or types of the sound and selecting the devices to pair at least in part according to the type or types of the sound, and/or identifying a type or types of the sound and determining an extent of pairing of the devices at least in part according to the type or types of the sound, and/or determining a level and/or variation of at least one of volume, pitch, or tone of the sound, and selecting at least one of the devices to pair, and/or an extent of pairing, accordingly. Identifying at least one purpose, feature, attribute, and/or function from the sound and identifying at least one of the devices, and/or a pairing thereof, as providing the identified at least one purpose, feature, attribute, and/or function may include and/or involve at least one of identifying when at least one of the devices was purchased, identifying a status of at least one device, identifying an existing relationship between devices, identifying at least one device pairing history, identifying a manufacturer of at least one device, identifying a place of manufacture for at least one device, identifying a year of manufacture or version for at least one device, or identifying a location of at least one device. Analyzing voice information of the at least one sound may include and/or involve identifying words and/or phrases from the voice information, and/or identifying, from the voice information, an individual that is the source of the voice information. Identifying a type or types of the sound may include and/or involve identifying at least one of a whistle, a click, a clap, a knock, a snap, a ring, or a tone.

The method may include and/or involve discontinuing pairing of the at least two devices. Discontinuing pairing at least partially because the at least two devices may include and/or involve discontinuing pairing when the at least two devices are no longer proximate with one another, and/or discontinuing pairing of the at least two devices at least partially because of completion of a task, and/or discontinuing pairing at least partially because an amount of authorized pairing time lapses, and/or discontinuing pairing at least partially due to a user selection to discontinue pairing. Discontinuing pairing of the at least two devices as a result of completion of a task may include and/or involve discontinuing pairing of the at least two devices at least partially because of at least one of placing a call, transferring a file, sending a message, or performing a backup.

The method may include and/or involve retaining information about the pairing of the at least two devices.

The method may include and/or involve applying the retained information to resume pairing of the at least two devices, after pairing of the at least two devices is discontinued and/or interrupted. Applying the retained information to resume pairing of the at least two devices, after pairing of the at least two devices is discontinued and/or interrupted may include and/or involve applying the retained information to resume pairing of the at least two devices once the at least two devices are once again in proximity, and/or applying the retained information to resume pairing of the at least two devices, once the at least two devices are once again in communication with one another.

The method may include and/or involve detecting proximity between the devices and interpreting at least one sound, in conjunction with proximity between the devices, as an indication that pairing of the devices should be attempted.

The method may include and/or involve detecting increasing proximity between the devices and interpreting at least one sound, in conjunction with recently detected increasing proximity between the devices, as an indication that pairing of the devices should be attempted.

The method may include and/or involve the devices wirelessly exchanging information needed for pairing, upon approaching or becoming proximate with one another, but prior to receiving at least one sound, and interpreting the at least one sound as an indication that the exchanged information should be applied to complete the pairing process.

The method may include and/or involve logic to interpret the sound as an indication to initiate exchange with the other device of at least some of authentication, authorization, or compatibility information needed for pairing.

The method may include and/or involve un-pairing the devices as a result of a same or different sound or sounds.

The method may include and/or involve authenticating and/or authorizing pairing of the devices.

The method may include and/or involve establishing a secure channel for communication of pairing information.

The method may include and/or involve ascertaining relative motion between two or more of the devices. Ascertaining relative motion between two or more of the devices may include and/or involve ascertaining at least one of rotation, angle of approach, or relative lateral motion between the two or more devices.

The method may include and/or involve detecting a duration of the sound and applying the duration of the sound as an indication of to what extent and/or whether pairing of the devices should take place.

The method may include and/or involve detecting multiple sounds and applying the multiple sounds as an indication of to what extent and/or whether pairing of the devices should proceed.

The method may include and/or involve detecting an intensity of sound and applying the intensity of sound as an indication of to what extent and/or whether pairing of the devices should proceed. Detecting an intensity of sound and applying the intensity of sound as an indication of to what extent and/or whether pairing of the devices should proceed may include and/or involve detecting at least one of an average volume, a peak volume, or a volume gradient of the sound or sounds.

The method may include and/or involve communicating with at least one device different than the devices to pair, to obtain information needed to effect pairing of the devices. The at least one device different than the devices to pair may include and/or involve at least one of a proximate desktop, a laptop, or a handheld computing device.

The method may include and/or involve awaiting user input as a result of the sound or sounds. Awaiting user input as a result of the sound or sounds may include and/or involve awaiting authentication information for the user, and/or awaiting at least one of input from a keypad, voice input, or biometric input.

The method may include and/or involve pairing the devices to an extent determined by qualities and/or circumstances of the sound or sounds. Pairing the devices to an extent determined by qualities and/or circumstances of the sound or sounds may include and/or involve pairing to enable functions and/or features of one or both devices, or the combination thereof, determined by qualities and/or circumstances of the sound or sounds, and/or authorizing that a person or persons using one or both devices is authorized to do so, and/or to what extent.

The method may include and/or involve providing one or more audible and/or visual and/or tactile indications on the progress and/or results of pairing of the devices. Providing one or more audible and/or visual and/or tactile indications on the progress and/or results of pairing of the devices may include and/or involve presenting pairing options to a user of the devices, and/or providing an indication that a user should provide input to the pairing process, and/or providing at least one of one or more lights, tones, vibrations, sounds, or display indications, and/or providing at least one of an indication that pairing was successful, an indication that pairing was unsuccessful due to insufficient available information, an indication that pairing between the devices is available, or an indication that pairing is in process. Presenting pairing options to a user of the devices may include and/or involve presenting at least one of a visual menu or voice prompts. Presenting pairing options may include and/or involve presenting options relevant to the way the pairing is accomplished, presenting options for parameters of the pairing, or presenting options for one or more tasks and/or functions served by the pairing. Presenting options for parameters of the pairing may include and/or involve presenting options for pairing duration, location constraints, or conditions for terminating pairing.

Providing an indication that a user should provide input to the pairing process may include and/or involve providing an indication that the user should provide at least one of a password, a spoken input, a selection of an option, a biometric input, or information from a card and/or memory device.

The method may include and/or involve receiving a user selection from among the presented pairing options, and proceeding with pairing according to the user selection.

A device may include and/or involve a sound sensor, and logic to enable the device to ascertain and/or identify, from signals received via the sound sensor, at least one of pairing information, at least one other device with which to pair, a person effecting pairing of the device with the at least one other device, or an extent to which to pair with the at least one other device. The logic to enable the device to ascertain and/or identify, from signals received via the sound sensor, at least one of pairing information, at least one other device with which to pair, a person effecting pairing of the device with the at least one other device, or an extent to which to pair with the at least one other device may include and/or involve logic to recognize from the signals an identification of at least one device with which to pair, and/or logic to extract user authentication information from the signals, and/or logic to identify at least one purpose and/or function and/or feature from the signals, and to identify at least one device providing the identified at least one purpose and/or function and/or feature, and/or logic to compare information of the signals with a biometric voice print, and/or logic to extract from the signals both information to identify at least one device with which to pair, and a biometric voice print, and/or logic to analyze the signals as voice information, and/or logic to identify a type of sound represented by the signals, and/or logic to determine a level and/or variation or at least one of volume, pitch, or tone of sound represented by the signals. The logic to analyze the signals as voice information may include and/or involve logic to identify words and/or phrases from the signals, and/or logic to identify, from the signals, an individual that is the source of voice information represented by the signals. The logic to identify a type of sound represented by the signals may include and/or involve logic to identify at least one of a whistle, a click, a clap, a knock, a snap, a ring, or a tone.

The device may include and/or involve logic to detect proximity between the device and at least one other device, and to interpret at least one sound represented by the signals, in conjunction with proximity between the devices, as an indication that pairing of the device with at least one other device should be attempted.

The device may include and/or involve logic to detect increasing proximity between the device and the at least one other device, and to interpret at least one sound represented by the signals, in conjunction with recently detected increasing proximity between the device and the at least one other device, as an indication that pairing of the device with the at least one other device should be attempted.

The device may include and/or involve logic to enable the device to wirelessly receive information needed for pairing, upon approaching or becoming proximate with the at least one other device, but prior to receiving signals representing at least one sound, and logic to interpret the at least one sound as an indication that the received information should be applied to complete pairing with the at least one other device.

The device may include and/or involve logic to interpret the signals as an indication to initiate exchange with the at least one other device of at least some of authentication, authorization, or compatibility information needed for pairing.

The device may include and/or involve logic to unpair the device from the at least one other device, as a result of receiving signals representing one or more sounds.

The device may include and/or involve logic to enable the device to exchange with the at least one other device, during and/or proximate to a duration of the signals representing one or more sounds, information needed for pairing.

The device may include and/or involve logic to authenticate and/or authorize pairing of the device with one or more other devices.

The device may include and/or involve logic to establish a secure channel for communication of pairing information.

The device may include and/or involve logic to ascertain relative motion between the device and the at least one other device. The logic to ascertain relative motion between the device and the at least one other device may include and/or involve logic to ascertain at least one of rotation, angle of approach, or relative lateral motion between the device and the at least one other device.

The device may include and/or involve logic to detect a duration of the sound represented by the signals and to interpret the duration of the sound as an indication of to what extent and/or whether pairing of the device with the at least one other device should be accomplished.

The device may include and/or involve logic to detect multiple sounds from the signals and to interpret the multiple sounds as an indication of to what extent and/or whether pairing of the devices should be accomplished.

The device may include and/or involve logic to detect an intensity of sound represented by the signals, and to interpret the intensity of sound as an indication of to what extent and/or whether pairing of the devices should be accomplished. The logic to detect an intensity of sound represented by the signals, and to interpret the intensity of sound as an indication of to what extent and/or whether pairing of the devices should be accomplished may include and/or involve logic to detect at least one of an average volume, a peak volume, or a volume gradient.

The device may include and/or involve logic to communicate with the at least one device different than the devices to pair, to obtain information needed to effect pairing of the devices. The at least one device different than the devices to pair may include and/or involve at least one of a proximate desktop, a laptop, or a handheld computing device.

The device may include and/or involve logic to await user input as a result of the signals representing sound. The logic to await user input as a result of the signals representing sound may include and/or involve logic to await authentication information for a user of the device, and/or logic to await at least one of input from a keypad, a voice input, or a biometric input.

The device may include and/or involve logic to authorize an extent of pairing of the device and the at least one other device. The logic to authorize an extent of pairing of the device and the at least one other device may include and/or involve logic to authorize paired access to a greater number and/or different functions of one or more than one of the devices to pair, than would be available if the devices were paired without application of the signals representing sound, and/or logic to authorize paired access the extent of which varies according to the nature of the sound represented by the signals, and/or logic to authorize that a person using one or more of the devices to pair is authorized to do so, and/or to what extent.

The device may include and/or involve logic to provide one or more audible and/or visual and/or tactile indications on the progress and/or results of pairing of the device and the at least one other device. The logic to provide one or more audible and/or visual and/or tactile indications on the progress and/or results of pairing of the device and the at least one other device may include and/or involve at least one presentation of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing is available, or an indication that pairing is in process. The logic to provide an indication that a user should provide input to the pairing process may include and/or involve logic to provide an indication that the user should provide at least one of a password, a spoken input, a biometric input, a selection of a pairing option, or information from a card and/or memory device.

A system may include and/or involve a first device, a second device, and logic to enable the first and second devices to pair as a result of at least one sound. The logic to enable the first and second devices to pair as a result of at least one sound may include and/or involve logic to recognize from the sound an identification of at least one of the first and second devices, and/or logic to extract authentication information from the sound, and/or logic to identify at least one purpose and/or function from the sound and to identify at least one of the first and second devices as providing the identified at least one purpose and/or function, and/or logic to compare information of the sound with a biometric voice print, and/or logic to extract from the sound both information to identify the first and/or second devices and a biometric voice print, and/or logic to analyze voice information, and/or logic to identify a type of the sound, and/or logic to determine a level and/or variation or at least one of volume, pitch, or tone of the sound. The logic to analyze voice information may include and/or involve logic to identify words and/or phrases from the voice information, and/or logic to identify, from the voice information, an individual that is the source of the voice information. The logic to identify a type of the sound may include and/or involve logic to identify at least one of a whistle, a click, a clap, a knock, a snap, a ring, or a tone.

The system may include and/or involve logic to detect proximity between the devices and to interpret at least one sound, in conjunction with proximity between the devices, as an indication that pairing of the devices should be attempted.

The system may include and/or involve logic to detect increasing proximity between the devices and to interpret at least one sound, in conjunction with recently detected increasing proximity between the devices, as an indication that pairing of the devices should be attempted.

The system may include and/or involve logic to enable the devices to wirelessly exchange information needed for pairing, upon approaching or becoming proximate with one another, but prior to receiving at least one sound, and logic to interpret the at least one sound as an indication that the information should be applied to complete the pairing process.

The system may include and/or involve logic to interpret the sound as an indication to initiate exchange with the other device of at least some of authentication, authorization, or compatibility information needed for pairing.

The system may include and/or involve logic to unpair the devices as a result of the same or different sound or sounds.

The system may include and/or involve logic to authenticate and/or authorize pairing of the devices.

The system may include and/or involve logic to establish a secure channel for communication of pairing information.

The system may include and/or involve logic to ascertain relative motion between the devices. The logic to ascertain relative motion between the devices may include and/or involve logic to ascertain at least one of rotation, angle of approach, or relative lateral motion between the devices.

The system may include and/or involve logic to detect a duration of the sound and to interpret the duration of the sound as an indication of how and/or whether pairing of the devices should proceed.

The system may include and/or involve logic to detect multiple sounds and to interpret the multiple sounds as an indication of how and/or whether pairing of the devices should proceed.

The system may include and/or involve logic to detect an intensity of sound and to interpret the intensity of sound as an indication of how and/or whether pairing of the devices should proceed. The logic to detect an intensity of sound and to interpret the intensity of sound as an indication of how and/or whether pairing of the devices should proceed may include and/or involve logic to detect at least one of an average volume, a peak volume, or a volume gradient.

The system may include and/or involve logic to communicate with at least one device different than the devices to pair, to obtain information needed to effect pairing of the devices. The at least one device different than the devices to pair may include and/or involve at least one of a proximate desktop, a laptop, or a handheld computing device.

The system may include and/or involve logic to await user input as a result of the sound. The logic to await user input as a result of the sound may include and/or involve logic to await authentication information for the user, and/or logic to await at least one of input from a keypad, a voice input, or a biometric input.

The system may include and/or involve logic to authorize an extent of pairing of the devices. The logic to authorize an extent of pairing of the devices may include and/or involve logic to authorize paired access to a greater number and/or different functions of one or both devices than would be available if the devices were paired without application of the sound, and/or logic to authorize paired access the extent of which varies according to the nature of the sound, and/or logic to authorize that a person using one or both devices is authorized to do so, and/or to what extent.

The system may include and/or involve logic to provide one or more audible and/or visual and/or tactile indications on the progress and/or results of pairing of the devices. The logic to provide one or more audible and/or visual and/or tactile indications on the progress and/or results of pairing of the devices may include and/or involve logic to provide at least one presentation of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, a spoken input, a biometric input, a user selection of a pairing option, or information from a card and/or memory device. Other system/method/apparatus aspects are described in the text (e.g., detailed description and claims) and drawings forming the present application.

A method may include and/or involve applying a first device to facilitate pairing between a second device and a third device by touching the first device to the second device, and then touching the first device to the third device, with a result that the second device and third device are thus enabled to pair with one another.

The method may include and/or involve discontinuing pairing of the second device and the third device. The discontinuing pairing of the second device and the third device may include and/or involve discontinuing pairing when the second device and third device are no longer proximate with one another, and/or discontinuing pairing at least partially due to an action of a user of the first and/or second devices, and/or discontinuing pairing at least partially because the second device and/or third device are no longer proximate with the first device, and/or discontinuing pairing at least partially because an amount of authorized pairing time lapses, and/or discontinuing pairing of the second device and the third device at least partially as a result of completion of a task, for example at least partially as a result of placing a call, transferring a file, sending a message, or performing a backup.

The method may include and/or involve retaining information about the pairing of the second device and the third device.

The method may include and/or involve applying the retained information to resume pairing of the second device and the third device, after pairing of the second device and the third device is discontinued and/or interrupted. The applying the retained information to resume pairing of the second device and the third device, after pairing of the second device and the third device is discontinued and/or interrupted may include and/or involve applying the retained information to resume pairing of the second device and the third device once the second device and the third device are once again in proximity with one another, and/or applying the retained information to resume pairing of the second device and the third device when the first device is once again in contact with the second device and/or the third device, and/or applying the retained information to resume pairing of the second device and the third device, when the first device is once again in proximity with the second device and/or the third device.

The method may include and/or involve detecting a manner of contact between the first device and the second device and/or the third device. The detecting a manner of contact between the first device and the second device and/or the third device may include and/or involve detecting relative motion between the first device and the second device and/or the third device at a point or points of contact, and/or detecting a duration of contact between the first device and the second device and/or the third device, and determining from the duration of contact an indication of how and/or whether pairing of the second device and the third device should be accomplished, and/or detecting multiple instances of contact between the first device and the second device and/or the third device, and interpreting the multiple instances of contact as an indication of how and/or whether pairing of the second device and the third device should be accomplished, and/or detecting an intensity of contact between the first device and the second device and/or the third device, and interpreting the intensity of contact as an indication of how and/or whether pairing of the second device and the third device should be accomplished, and/or detecting a point or points of contact between the first device and the second device and/or the third device, and interpreting the point or points of contact as an indication of how and/or whether pairing of the second device and the third device should be accomplished. The detecting an intensity of contact between the first device and the second device and/or the third device, and interpreting the intensity of contact as an indication of how and/or whether pairing of the second device and the third device should be accomplished may include and/or involve detecting at least one of an average contact force, a peak contact force, or force gradient.

The method may include and/or involve providing one or more audible and/or visual and/or tactile indications on the progress and/or results of pairing of the second device and the third device. The providing one or more audible and/or visual and/or tactile indications on the progress and/or results of pairing of the second device and the third device may include and/or involve presenting at least one pairing option, and/or providing an indication that a user should provide input to the pairing process, and/or providing at least one of one or more lights, tones, vibrations, sounds, or display indications, and/or at least one of providing an indication that pairing was successful, providing an indication that pairing was unsuccessful due to insufficient available information, providing an indication that pairing between the devices is available, or providing an indication that pairing is in process. Presenting at least one pairing option may include and/or involve one or more of presenting options relevant to the way the pairing is accomplished, presenting options for parameters of the pairing, or presenting options for one or more tasks and/or function served by the pairing. The providing an indication that a user should provide input to the pairing process may include and/or involve providing an indication that the user should provide at least one of a password, spoken input, biometric input, or information from a card and/or memory device. Presenting options for parameters of the pairing may include and/or involve presenting options for pairing duration, location constraints, or conditions for terminating pairing.

The method may include and/or involve awaiting user input as a result of contact between the first device and the second device and/or third device. The awaiting user input as a result of contact between the first device and the second device and/or third device may include and/or involve awaiting at least one of input from a keypad, one or more buttons, a voice input, or a biometric input, and/or awaiting authentication information for the user.

The method may include and/or involve receiving user input to the pairing process.

The method may include and/or involve applying the user input to complete the pairing of the second device and the third device.

A system may include and/or involve a first device, a second device, and a third device, and logic to facilitate pairing between the second device and the third device as a result of contact between the first device and at least one of the second and third devices. The logic to facilitate pairing between the second device and the third device as a result of contact between the first device and at least one of the second and third devices may include and/or involve logic to receive pairing information from the second device as a result of contact with the second device, and to communicate the pairing information to the third device as a result of contact with the third device, and/or logic to communicate pairing information to the second device as a result of contact with the second device, and to communicate the pairing information to the third device as a result of contact with the third device, and/or logic to pick up pairing information from the second device as a result of contact with the second device, and to carry the pairing information and to communicate the pairing information to the third device as a result of contact with the third device, and/or logic to wirelessly communicate information received from either or both of the second device and third device to a fourth device in order to facilitate pairing of the second device and the third device. The logic to communicate pairing information to the second device as a result of contact with the second device, and to communicate the pairing information to the third device as a result of contact with the third device may include and/or involve logic to communicate the pairing information via one or more points of contact, and/or logic to communicate the pairing information using short-range wireless technology, and/or logic to communicate the pairing information after a time or times of contact with the second device and/or the third device has ended, and/or logic to wirelessly communicate pairing information prior to contact with the second device and/or the third device, and to communicate additional pairing information upon contact with the second device and/or third device, the additional pairing information employed by the second device and/or third device during pairing, and/or logic to communicate the pairing information during a time or times of contact with the second device and/or the third device, and/or logic to communicate information stored by the first device prior to contact with either of the second device or the third device. The logic to wirelessly communicate pairing information received from either or both of the second device and third device to a fourth device in order to facilitate pairing of the second device and the third device may include and/or involve logic to communicate user and/or device authentication information to the fourth device. The additional pairing information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information. The system may include logic to communicate device and/or user authentication and/or authorization information to the second and/or third devices, for example as a result of contact between the second and/or third devices and the first device.

The system may include and/or involve logic to retain information about the pairing of the second device and the third device, after pairing of the second device and the third device is complete. The logic to retain information about the pairing of the second device and the third device, after pairing of the second device and the third device is complete may include and/or involve logic to apply the retained information to resume pairing of the second device and the third device, after pairing of the second device and the third device is interrupted. The logic to apply the retained information to resume pairing of the second device and the third device, after pairing of the second device and the third device is interrupted may include and/or involve logic to apply the retained information to resume pairing of the second device and the third device once the second device and the third device are once again in proximity, and/or logic to apply the retained information to resume pairing of the second device and the third device when the first device is once again in contact with the second device and/or the third device, and/or logic to apply the retained information to resume pairing of the second device and the third device, once the first device is once again in proximity with the second device and the third device.

The system may include and/or involve logic to discontinue pairing of the second device and the third device. The logic to discontinue pairing of the second device and the third device may include and/or involve logic to discontinue pairing when the second device and/or third device are no longer proximate with the first device, and/or logic to discontinue pairing if an amount of authorized user time lapses, and/or discontinuing pairing of the at least two devices as a result of completion of a task, for example as a result of placing a call, transferring a file, sending a message, or performing a backup.

The system may include and/or involve logic to detect a manner of contact between the first device and the second device and/or the third device. The logic to detect a manner of contact between the first device and the second device and/or the third device may include and/or involve logic to detect relative motion between the first device and the second device and/or the third device at a point or points of contact, and/or logic to detect a duration of contact between the first device and the second device and/or the third device, and to determine from the duration of contact an indication of how and/or whether pairing of the second device and the third device should be accomplished, and/or logic to detect multiple instances of contact between the first device and the second device and/or the third device, and to interpret the multiple instances of contact as an indication of how and/or whether pairing of the second device and the third device should be accomplished, and/or logic to detect an intensity of contact between the first device and the second device and/or the third device, and to interpret the intensity of contact as an indication of how and/or whether pairing of the second device and the third device should be accomplished. The logic to detect an intensity of contact between the first device and the second device and/or the third device, and to interpret the intensity of contact as an indication of how and/or whether pairing of the second device and the third device should be accomplished may include and/or involve logic to detect at least one of an average contact force, a peak contact force, or force gradient.

The system may include and/or involve logic to await user input as a result of contact between the first device and the second device and/or third device. The logic to await user input as a result of contact between the first device and the second device and/or third device may include and/or involve logic to await at least one of input from a keypad, one or more buttons, a voice input, or a biometric input, and/or logic to await authentication information for the user.

The system may include and/or involve logic to provide one or more audible and/or visual and/or tactile indications on the progress and/or results of pairing of the second device and the third device. The logic to provide one or more audible and/or visual and/or tactile indications on the progress and/or results of pairing of the second device and the third device may include and/or involve logic to provide at least one menu of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, spoken input, biometric input, or information from a card and/or memory device.

A first device may include and/or involve at least one contact sensor, and logic to facilitate pairing between a second device and a third device as a result of contact between the contact sensor and at least one of the second and third devices. The logic to facilitate pairing between a second device and a third device as a result of contact between the contact sensor and at least one of the second and third devices may include and/or involve logic to receive pairing information from the second device as a result of contact with the second device, and to communicate the pairing information to the third device as a result of contact with the third device, and/or logic to communicate pairing information to the second device as a result of contact with the second device, and to communicate the pairing information to the third device as a result of contact with the third device, and/or logic to pick up pairing information from the second device as a result of contact with the second device, and to carry the pairing information and to communicate the pairing information to the third device as a result of contact with the third device, and/or logic to wirelessly communicate pairing information received from either or both of the second device and third device to a fourth device in order to facilitate pairing of the second device and the third device, and/or logic to detect a time interval between contact of the first device with the second device, and contact of the first device with the third device. The logic to communicate pairing information to the second device as a result of contact with the second device, and to communicate the pairing information to the third device as a result of contact with the third device may include and/or involve logic to communicate the pairing information via one or more points of contact, and/or logic to communicate the pairing information using short-range wireless technology, and/or logic to communicate the pairing information during a time or times of contact with the second device and/or the third device, and/or logic to communicate information stored by the first device prior to contact with either of the second device or the third device, and/or logic to wirelessly communicate pairing information prior to contact with the second device and/or the third device, and to communicate additional pairing information upon contact with the second device and/or third device, the additional pairing information employed by the second device and/or third device to pair, and/or logic to communicate the pairing information during a time or times of contact with the second device and/or the third device, and/or logic to communicate the pairing information after a time or times of contact with the second device and/or the third device has ended. The logic to wirelessly communicate pairing information received from either or both of the second device and third device to a fourth device in order to facilitate pairing of the second device and the third device may include and/or involve logic to communicate user and/or device authentication information to the fourth device. The logic to detect a time interval between contact of the first device with the second device, and contact of the first device with the third device may include and/or involve logic to communicate pairing information to the third device sufficient to cause pairing with the second device to proceed only when the time interval does not exceed a threshold. The additional pairing information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information. The additional pairing information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information. The logic to facilitate pairing between a second device and a third device as a result of contact between the contact sensor and at least one of the second and third devices may include and/or involve logic to communicate device and/or user authentication and/or authorization information to the second and/or third devices.

The first device may include and/or involve logic to perform wireless communications.

The first device may include and/or involve logic to retain information about the pairing of the second device and the third device, after pairing of the second device and the third device is complete. The logic to retain information about the pairing of the second device and the third device, after pairing of the second device and the third device is complete may include and/or involve logic to apply the retained information to resume pairing of the second device and the third device, after pairing of the second device and the third device is interrupted. The logic to apply the retained information to resume pairing of the second device and the third device, after pairing of the second device and the third device is interrupted may include and/or involve logic to apply the retained information to resume pairing of the second device and the third device once the second device and the third device are once again in proximity, and/or logic to apply the retained information to resume pairing of the second device and the third device when the first device is once again in contact with the second device and/or the third device.

The first device may include and/or involve logic to discontinue pairing of the second device and the third device. The logic to discontinue pairing of the second device and the third device may include and/or involve logic to discontinue pairing when the second device and/or third device are no longer proximate with the first device, and/or logic to discontinue pairing if an amount of authorized user time lapses.

The first device may include and/or involve logic to detect a manner of contact between the first device and the second device and/or the third device. The logic to detect a manner of contact between the first device and the second device and/or the third device may include and/or involve logic to detect relative motion between the first device and the second device and/or the third device at a point or points of contact, and/or logic to detect a duration of contact between the first device and the second device and/or the third device, and to determine from the duration of contact an indication of how and/or whether pairing of the second device and the third device should be accomplished, and/or logic to detect multiple instances of contact between the first device and the second device and/or the third device, and to interpret the multiple instances of contact as an indication of how and/or whether pairing of the second device and the third device should be accomplished, and/or logic to detect an intensity of contact between the first device and the second device and/or the third device, and to interpret the intensity of contact as an indication of how and/or whether pairing of the second device and the third device should be accomplished, and/or logic to detect a point or points of contact between the first device and the second device and/or the third device, and to interpret the point or points of contact as an indication of how and/or whether pairing of the second device and the third device should be accomplished. The logic to detect an intensity of contact between the first device and the second device and/or the third device, and to interpret the intensity of contact as an indication of how and/or whether pairing of the second device and the third device should be accomplished may include and/or involve logic to detect at least one of an average contact force, a peak contact force, or force gradient.

The first device may include and/or involve logic to await user input as a result of activation of the at least one contact sensor. The logic to await user input as a result of activation of the at least one contact sensor may include and/or involve logic to await at least one of input from a keypad, one or more buttons, a voice input, or a biometric input, and/or logic to await authentication information for the user.

The first device may include and/or involve logic to provide one or more audible and/or visual and/or tactile indications on the progress and/or results of pairing of the second device and the third device. The logic to provide one or more audible and/or visual and/or tactile indications on the progress and/or results of pairing of the second device and the third device may include and/or involve logic to provide at least one menu of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, spoken input, biometric input, or information from a card and/or memory device.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 2A is a flow chart of an embodiment of a device pairing method.

FIG. 3A is a block diagram of an embodiment of a device to accommodate pairing.

FIG. 3B is a block diagram of an embodiment of a device to accommodate pairing.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to effect the operation of a device. Software, hardware, and firmware are examples of logic. Hardware logic may be embodied in circuits. In general, logic may comprise combinations of software, hardware, and/or firmware.

Figure 1:
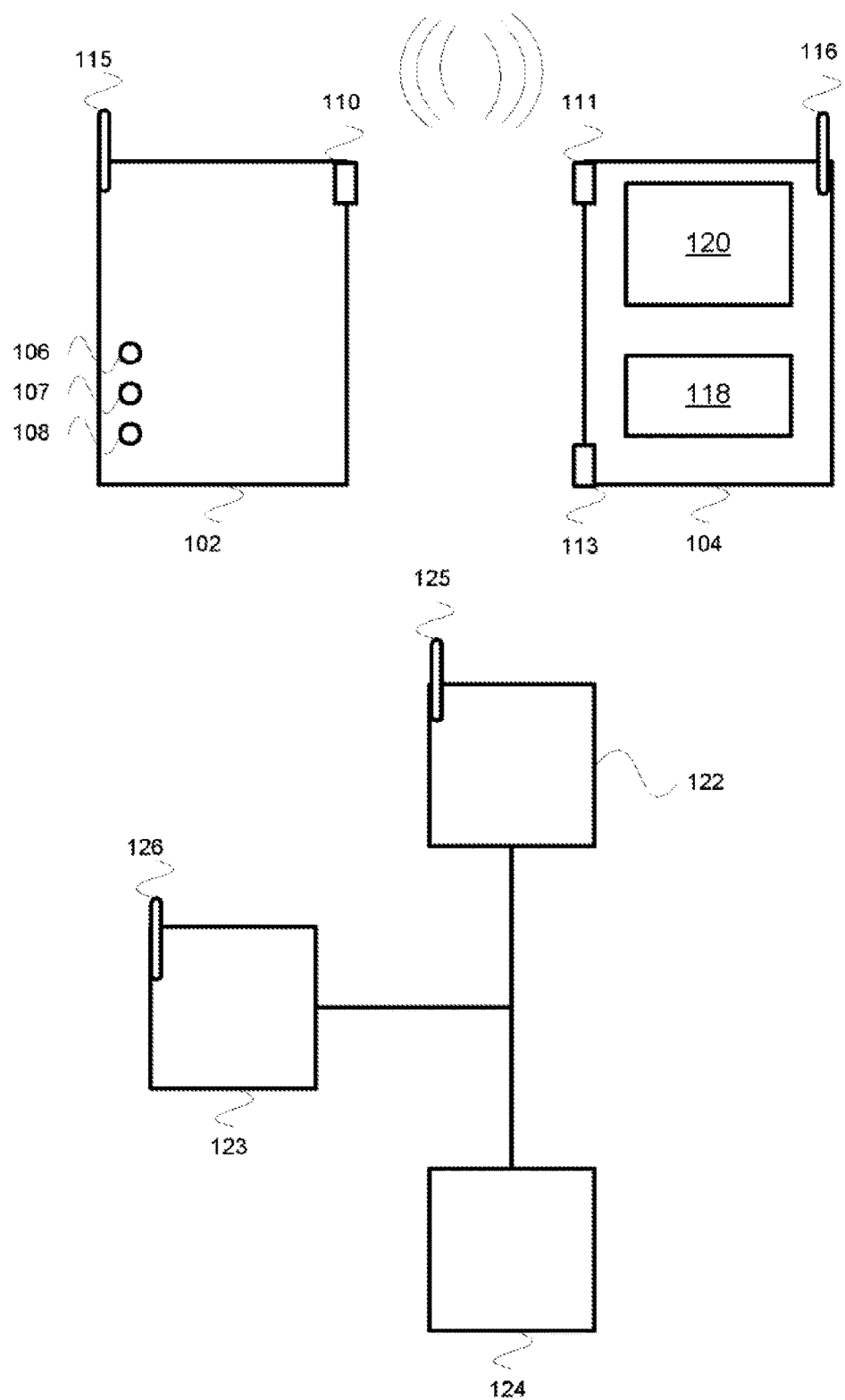
FIG. 1 is a block diagram of an embodiment of a device pairing arrangement.

FIG. 1 is a block diagram of an embodiment of a device pairing arrangement.

Overview of FIG. 1

A device 102 includes a microphone 106, a speaker 107, a LED 108, an antenna 115 and a contact area 110. There may be more than one contact area 110. The contact area 110 may be incorporated in a complex device part such as a touch sensitive screen incorporating other functions such as display. The contact area 110 may be any part of the device 102 which is used to touch another device 104.

The microphone 106 may be used for audible input to the device 102 and may not be present in all embodiments. Audible input may include sounds such as tapping or voice input such as whistling or speaking Voice input may be processed into words and/or phrases, and/or it may be processed as a sound pattern (e.g. a voice print). Voice input may be used, at least in part, as a biometric for individual identification.

The speaker 107 and LED 108 may be used for audible and visual information conveyed from the device 102, such as requests that an individual perform an action or feedback on the condition of some operation the device may have performed or be performing. The speaker 107 and/or LED 108 may not be present in all embodiments. Other means of communicating information such as a buzzer, display, tactile surface may be present additionally or instead of the speaker 107 and/or LED 108.

User feedback may be communicated to the user in various ways, such as those described above using speakers/LEDs/other outputs of the device, or via some other proximate device.

The device 102 may include an antenna 115 for wireless communication with other devices. The device 102 may include other features such as a scanner, a camera, or cellular telephone capabilities.

Examples of devices 102 and 104 include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A second device 104 includes contact areas 111 and 113, an antenna 116, logic 118, and a display 120. The device 104 may have a single contact area, or, as shown, two or more contact areas 111, 113. The device 104 need not include a display 120, although a display may prove useful for certain aspects of the pairing process. The display 120 could be part of the first device 102, or some other device such as 122 and/or 124.

The logic 118 operates to effect various techniques and acts for pairing the first device 102 and the second device 104. The logic 118 may exist on the first device 102, the second device 104, or in part on both devices. The logic 118 may exist, at least in part, on other devices, such as devices 122, and/or 124. The devices 122 and 124 may comprise a proximate laptop, desktop, or other computing device, and/or supporting network and communication equipment.

The display 120 may be used to provide information to an individual or individuals such as the person or persons causing the contact between the two devices. In some embodiments, other means of communicating information such as an LED, buzzer, or speaker may be present additionally or instead of the display 120 on either or both of devices 102 and 104, and/or on a proximate device such as 122 or 124.

The antenna 116 enables wireless communication between the device 104 and other devices. The device 104 may include other features not described herein. The device 104 may be a laptop, desktop, tower, or server computer attached via wireless or wired communications to an Intranet and/or the Internet and providing, for example, a sophisticated application such as a medical patient monitoring station or machine control application for a machine tool.

The device 102 may be moved by a user to touch the device 104. The device 104 may also be mobile. For example, the device 104 could be a cellular telephone, PDA, or laptop computer. In some situations, either all or some part of both device 102 and device 104 may be moving at a time of contact. For example, one individual could be moving 102 while another is moving 104 and the two devices 102 104 could thus contact.

Depending on the circumstances, the device 102 or a part thereof may be moved to contact device 104, and/or the device 104 or a part thereof may be moved to contact device 102.

The device pairing arrangement may also include additional devices, such as device 122, 123, and 124. Various data, logic, resources, and capabilities, including information and logic, to accomplish the pairing process may be provided by these other devices 122, 123, and 124. The devices 102 and/or 104 to pair may communicate with one or more of the devices 122-124 using wireless or other types of communication during the pairing process.

By way of example, the device 123 may provide a network access point for a wired and/or wireless network. Thus, for example, the device 123 may include an antenna 125. The antenna 125 may enable one or both of devices 102 104 to communicate via a network with other devices, such as device 124, located remotely from device 102 104. Such communication may enable devices 102 and/or 104 to receive additional information from device 124 that may assist in the pairing process. Some of the logic 118 used to effectuate pairing including even in some cases the decision to pair may be embodied in a remote device or devices 124.

Pairing

The device pairing arrangement includes a first device 102, a second device 104, and logic 118 to effect pairing of the first and second devices upon detection of physical contact between the first and second devices. Pairing involves cooperative operation of the two devices 102 104, generally involving communication between the devices 102 104. Effecting pairing may involve actions such as identifying either one or both devices 102 104 or one or more device characteristics, features, and/or functions; identifying (authenticating) the person or some characteristic of the person using the devices 102 104; authorizing the pairing and/or to what extent; and configuring one or both of the devices 102 104 with settings and information to facilitate paired operation.

Effectuating pairing involves communication of information. Information may be communicated in various ways, including using the contact points, wirelessly, or using some wired communication method, or combinations thereof.

Information to facilitate pairing may be communicated between the two devices 102 104, or almost entirely from one device to another. For example, device 102 may consist of a medallion or ring containing stored value (similar in concept to a prepaid phone card) which is used primarily to accomplish a commercial transaction. When the medallion 102 is touched to device 104, information about the stored value may be passed to device 104. Device 104 may then perform many, most, or all actions involved to establish pairing, such as identifying the commercial transaction and deciding if it may be accomplished. (The user may be interacting through a touch screen or keyboard or verbally with device 104 during this period.). Device 104 may then initiate pairing. While the two devices are paired, device 104 may pass information about the commercial transaction back to device 102.

The information exchanged, and the direction of such exchange, may vary according to the implementation. For example, the device 102 might pass information about a desired common purpose to the device 104, along with capabilities of the device 102. The device 104 may determine if it is suitable to provide the common service with device 102, and notify device 102 of this decision. The device 102 may then pass information authenticating the person using it to the device 104. And so on.

Sometimes, effectuation of pairing may at times require an individual to provide an input to one or both of the devices 102 104, or to perform an action. For example, the user of the device 102 and/or 104 may have to enter a password or provide a biometric input before pairing will be accomplished. The user may have to speak his or her name, to be validated biometrically. The individual may have to present a finger to a scanner for biometric fingerprint identification.

Effectuation of pairing may in some instances involve access to information and processing capability external to the two pairing devices 102 104. For example, if an individual provides a biometric input to device 102, it might use the antenna 115 to communicate the fingerprint information wirelessly to device 123 via the antenna 126. Device 123 might then provide the fingerprint information, via a network, to device 124 for authentication and authorization of the user's permission to pair device 104 with device 102.

The information needed to effect pairing may be passed using a variety of physical medium. Some or all of the information needed to effect pairing may be communicated through the contact point of the two devices 102 104. Some or all of the information needed to effect pairing may be communicated using a wireless capability of either or both devices 102 104. Either or both of devices 102 104 may implement wired or wireless network connectivity, so that some or all of the information needed to effect pairing may be communicated to one or both devices via a communication network.

One or both devices 102 104 may be paired with some other device (not shown) at the time the devices 102 104 become proximate and touch. Depending on the circumstances, the original pairing or pairings may be terminated, and a pairing between the devices 102 104 effected. Or, a second pairing may occur between devices 102 104 and one or more original pairings may continue. In some circumstances, when the two devices 102 104 touch, pairing may be rejected if one or both devices 102 104 are already paired.

Contact Between Devices

The logic 118 may operate to interpret device contact, e.g. activation of the contact sensors of one or both devices 102 104, as an indication to initiate exchange between the devices 102 104 of at least some of authentication, authorization, compatibility and/or configuration information needed for pairing. Under these circumstances, this information may be passed during or after contact has occurred. Again, although the logic 118 is illustrated with respect to device 104, the logic may in fact exist wholly or in part in various elements of the system, including devices 102, 122, and 124, or any other device of the system.

The logic 118 may operate to interpret recognition of contact as a confirmation that pairing is to occur. When the devices 102 104 have a mechanism for communicating information when they are not in contact, some of the information needed to effect pairing may be communicated prior to the time of contact. For example, the devices 102 104 may both have antennas 115 116 supporting wireless communication and may pass some pairing information when in proximity but before making contact.

As previously noted, the logic 118 may include logic to enable the devices 102 104 to exchange pairing information, at least in part, with one another via the physical contact point. The logic 118 may provide for interrupting the pairing process if contact is broken. The logic 118 may provide for enabling the devices to wirelessly exchange information needed for pairing only during activation of the contact sensor.

Manner of Contact

The logic 118 to effect pairing may include logic to ascertain a manner in which contact between the two devices is accomplished. By identifying a manner of contact, other information is provided by the contact beyond the fact of contact. This additional information may be used during pairing effectuation. For example, the additional information may act to authenticate (identify) and/or authorize a user of the device(s) 102 104. For example, touching and, at the same time, rotating the device 102 clockwise could indicate that pairing should occur between a headset and a telephone base, with connection to the office. Counterclockwise rotation could mean pairing between the headset and the base, with a connection to a relative's home.

The manner of touching may be used for other purposes. For example, in the previous example of touching and rotating, a particular pattern of movements and/or rotations could be used to authorize the pairing.

The logic 118 may determine which contact area (such as 111 or 113) or areas are being touched. The logic 118 may determine the orientation of one device 102 with respect to the other 104 at the time of contact. For example, logic may determine that the long axis of one device 102 is oriented horizontally with respect to the long axis of the second device 104. Determining the orientation of one device 102 with respect to another 104 may be performed by determining the orientation of one contact area (such as the long axis of contact area 110) on device 102 with respect to a contact area 111 on device 104.

The logic 118 may operate to ascertain relative motion between the devices 102 104. Ascertaining relative motion may include may include ascertaining at least one of rotation, angle of approach, or relative lateral motion between the devices 102 104. Determining relative lateral motion may include logic to recognize that the device 102 which has touched the device 104 is moving across one or more of the contact points 110 111 113, and if so, how fast and in what relative direction.

The logic 118 may operate to detect a duration of contact and to interpret the duration of contact as an indication of how and/or whether pairing of the devices should proceed. The logic 118 may operate to detect multiple instances of contact and to interpret the multiple instances of contact as an indication of how and/or whether pairing of the devices should proceed. The logic 118 may operate to detect an intensity of contact and to interpret the intensity of contact as an indication of how and/or whether pairing of the devices should proceed, for example to detect at least one of an average contact force, a peak contact force, or force gradient.

Relative Motion Before or after Contact

The logic 118 may operate to ascertain relative motion between the devices 102 104 prior to or after contact. Information about relative motion may be applied for various purposes, including authentication and/or authorization. For example, the user may be required to swing the device 102 to and fro when proximate to the device 104 within a certain number of seconds of touching in order for the pairing to be authorized. Ascertaining relative motion prior to or after contact may include use of the wireless capabilities of the devices 102 104.

Authentication/Authorization

The logic 118 to effect pairing may include logic to authenticate and/or authorize pairing between the devices 102 104. Authenticating and/or authorizing the pairing may include identifying one or both devices 102 104 and/or identifying at least one device characteristic for one or both devices 102 104, such as determining whether the devices 102 104 are suitable for use for the purpose required and that they 102 104 are compatible for pairing to accomplish that purpose. For example, pairing may have been initiated with a goal of accomplishing a commercial transaction requiring secure communication. Both devices 102 104 may have a device characteristic of supporting one or more varieties of encryption. However, they 102 104 may support only DES encryption in common. The recognition that the devices 102 104 are compatible and that DES encryption should be employed may occur as a result of the information exchanged during the pairing effectuation process.

Authenticating and/or authorizing pairing may include identifying a user of one or both of the devices) 102 104 touching and/or to identify at least one characteristic of the user. For example, the user may be a member of a group, department, or organization, such as a computer network administrator with broad access privileges.

The system may include logic to authorize an extent of pairing of the devices 102 104. By extent of pairing it is meant authorization of which functions and how extensively certain functions can be performed while the devices are paired. Authorization of an extent of pairing may be based, at least in part, on the identity or at least one characteristic of the user. Authorization of an extent of pairing may be based, at least in part, on the identity of the devices 102 104 or device characteristics or state.

Other factors may be taken into consideration when authorizing an extent of pairing to allow. Authorization of an extent of pairing may be based, at least in part, on time of day or physical location. Authorization of an extent of pairing may be based, at least in part, on the manner of touching and/or point of physical contact 110 111 113 between the two devices 102 104. Authorization may be provided for a greater number and/or different functions and/or features of one or both devices 102 104 than would be available if the devices were paired without physical contact. A secure channel may be established between the devices for communication of pairing information, particularly authentication/authorization information.

Feedback

The logic 118 may operate to provide one or more audible and/or visual and/or tactile indications on the progress and/or results of pairing of the devices. The device 102 may include feedback capabilities such as a speaker 107 and/or LED 108. The device 104 is shown as including a display 120 for feedback purposes, among other things.

Providing feedback may include providing at least one menu of pairing options, such as might be presented on a display 120 or by the speaker 107. Providing feedback may include providing an indication that a user should provide input to the pairing process. Such inputs could include speech, keyboard entry, pressing a switch, performing a scan, or taking an action or actions involving the contact points 110 111 113 of the devices 102 104. Providing feedback may include providing one or more lights, tones, vibrations, sounds, or display indications.

The feedback may include at least one indication that pairing was successful, unsuccessful due to insufficient available information, to indicate that pairing between the devices is available, or to indicate that pairing is in process. The feedback may indicate that the user should provide at least one of a password, spoken input, biometric input, or information from a card and/or memory device.

Interaction with Other Devices

The logic 118 may operate to communicate wirelessly with at least one device 122 124 different than the two devices 102 104 to obtain information needed to effect pairing between the devices 102 104. The other device or devices 122 124 may be physically near (same or close room or same building) or remotely located with respect to the location of the pairing devices 102 104. The other device or devices 122 124 may be accessed wirelessly, or via a network such as an intranet or the Internet.

User Input

The logic 118 to effect pairing may operate to await user input as a result of activation of one or more of the contact sensors 110 111 113. The system may await user input in the form of authentication information for the user, for example from a keypad, voice input, or biometric input. The system may await actions to be taken by the user, such as touching the devices 102 104 together again, touching for a certain approximate duration of time, touching multiple times in a pattern, rotating one device 102 with respect to the other 104 at the contact point 110 111 113, touching the devices 102 104 again but using at least one different contact point (such as 113 instead of 111), or other actions.

Proximity

The logic 118 may operate to detect increasing proximity between the devices 102 104 and to interpret activation of the contact sensor 110 111 113, in conjunction with recently detected increasing proximity between the devices, as an indication that pairing of the devices should be effected. For example, the wirelessly exchange of information needed for pairing may take place upon the devices approaching or becoming proximate with one another, but prior to activation of the contact sensor, and activation of the contact sensor may provide an indication that the information should be applied to complete the pairing process.

Figure 2:
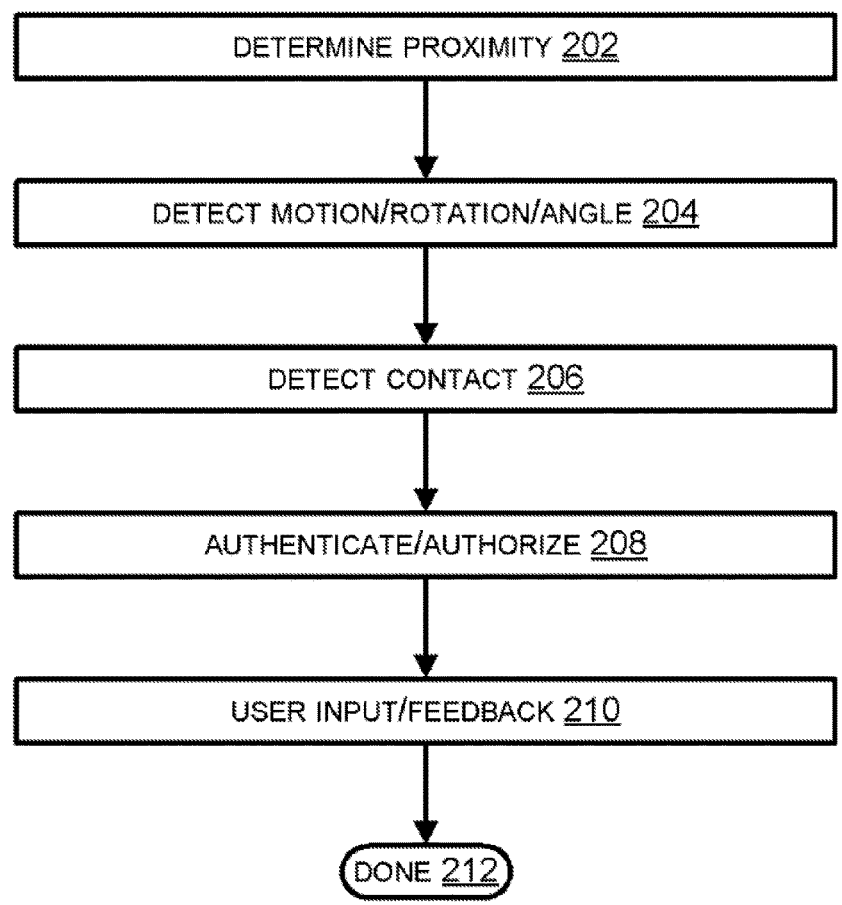
FIG. 2 is a flow chart of an embodiment of a device pairing method.

FIG. 2 is a flow chart of an embodiment of a device pairing method.

Overview of FIG. 2

At 202, the devices are recognized as proximate. This action may take place, for example, in situations where the devices communicate prior to device contact. At 204, the motion of the devices is analyzed. As previously noted, such analysis may take place prior to, during, or after contact. At 206, one or both devices detect that contact has occurred between them. At 208, information obtained prior to, during, or after contact is applied to authenticate and/or authorize the pairing of the devices. At 210, feedback is provided to the user and user input obtained. Feedback and user input may occur as a part of the authentication and authorization process 208, or for other reasons. At 212, the pairing effectuation process is complete.

Detecting Proximity

Activation of one or more contact sensors, in conjunction with recently detected increasing proximity between the devices, may provide an indication that pairing of the devices should be attempted. Information for pairing the devices may be exchanged wirelessly, upon the devices becoming proximate with one another, but prior to activation of one or more contact sensors, and activation of the one or more contact sensors may provide an indication to complete pairing of the devices.

Relative Motion Before or After Contact

As previously discussed, relative motion between the devices may be applied to influence the pairing process, and/or the extent of pairing undertaken.

Contact Detection and Processing

Pairing between the devices may be effected upon detection of physical contact between the devices. Pairing information may be exchanged, in some circumstances, via the physical contact point(s). Contact may result in initiating an exchange between the devices of at least some of authentication, authorization, or compatibility information needed for pairing. The pairing process may be interrupted if the devices lose contact with one another. The devices may exchange pairing information prior to, during, only during, or after a time when the devices are in physical contact.

Manner of Contact

The manner in which contact between the two devices is accomplished may be applied to influence the pairing process, as previously described.

Authentication/Authorization

The pairing process, and the extent of pairing effected, may involve authentication and/or authorization of a user of the device or devices, and/or the devices themselves, as previously discussed. For example, identification of one or both of the devices, or identification of a user of one or both of the devices, and/or characteristics thereof, may be involved in the pairing process.

The extent to which the devices are paired may be influenced by various factors, as previously discussed. Pairing may result in access to a greater number and/or different functions of one or both devices than would be available if the devices were paired without physical contact. Pairing may result in access to functions and/or features of one or both devices the extent of which varies according to the manner and/or point of physical contact between the devices.

Feedback

Feedback may be provided during the pairing process, as previously discussed.

User Input

User input to the pairing process may be provided, as previously discussed.

Figure 3:
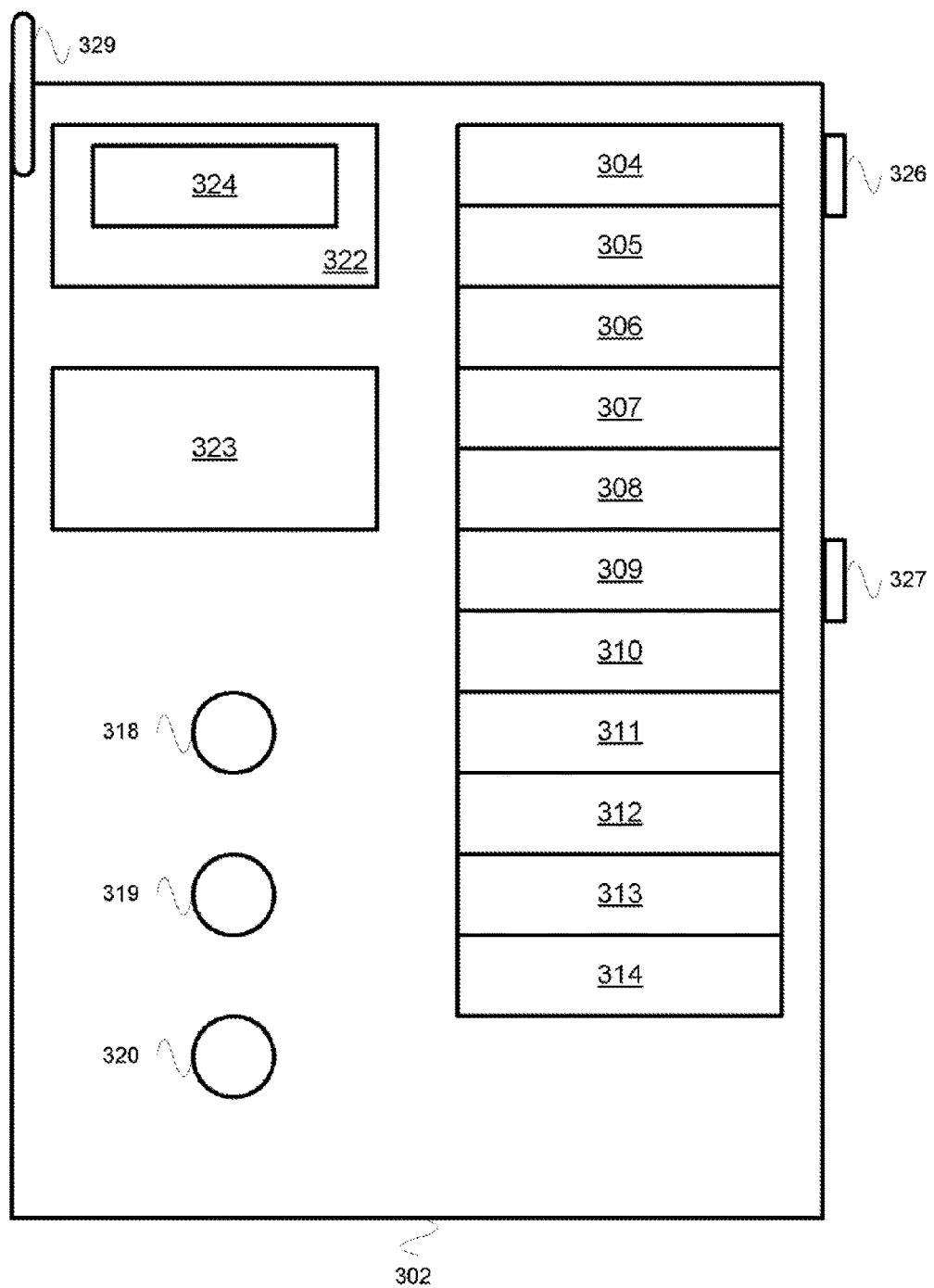
FIG. 3 is a block diagram of an embodiment of a device to accommodate pairing.

FIG. 3 is a block diagram of an embodiment of a device to accommodate pairing.

Overview of FIG. 3

A device 302 includes a display 322 that may be used, among other things, to provide a menu 324 of options. The device includes a microphone 318 which may be used to detect sound (such as tapping) and/or voice input. The device includes a keypad 323. The device includes two parts which may be used to provide user feedback, a speaker 319 and a LED 320. The device includes two contact sensors 326 and 327. The device also includes various logic elements which may operate to effect device pairing. Of course, the device may include additional elements that are not shown here and which are superfluous to this discussion.

Logic of the device includes pairing process management logic 304, contact processing logic 305, wireless communication logic 306, proximity and motion logic 307, user input logic 308, speech processing logic 309, biometric processing logic 310, logic 311 to interact with a device or devices other that the two pairing devices, authentication logic 312, and authorization logic 313.

An antenna 329 enables the device to engage in wireless communication.

Not all embodiments of the device 302 will include all of the illustrated logic. For example, if a device 302 did not have a speaker 319 or microphone 318 and performed no audible inputs or outputs, it would not need and probably would not have speech processing logic 309. If a device had no biometric input it would not need and probably would not have biometric processing logic 310. And so on.

Device Contact

The device 302 may include at least one contact sensor 326 327, and logic to effect pairing 304 with another device upon activation of the contact sensor 326 327.

The device 302 may include logic 305 to enable the device 302 to exchange with the other device information needed for pairing via the physical contact points 326 327. The device 302 may include logic to interrupt the pairing process if contact is broken. The device 302 may include logic to enable the device to wirelessly exchange with another device information needed for pairing only during activation of the contact sensor. The device 302 may include logic to detect temperature at the contact point or points, and/or conductivity at the contact point or points, as an indication of how and/or whether pairing of the device and the other device should proceed.

Communication with Other Devices

The device 302 may include logic 311 to communicate wirelessly with at least one device different than its pairing partner device to obtain information needed to effect pairing. Such a third device may include a network access point, or a proximate laptop, desktop, or handheld computing device, among other things.

The device 302 may include logic 305 to enable the device 302 to communicate information needed for pairing via the physical contact points 326 327. The device 302 may include logic 306 to enable wireless communication of information needed for pairing.

Device User Input

The device 302 may include logic 308 to await user input as a result of activation of the contact sensor(s) 326 327, such as authentication information for the user from a keypad, voice input, the display 120, or biometric input.

Device Authorization/Authentication

The device 302 may include logic to interpret activation of the contact sensors 326 327 as an indication to initiate exchange with the other device of at least some of authentication, authorization, or compatibility information needed for pairing. The device 302 may include logic 312 313 to authenticate and/or authorize pairing with the other device. The device 302 may include logic to switch from one pairing partner to another as a result of activation of the contact sensors 326 327. The device 302 may include logic to establish a secure channel for communication of pairing information.

The device 302 may include logic to authorize an extent of pairing of the device and the other device, such as paired access to a greater number and/or different functions and/or features of one or both devices than would be available if the devices were paired without physical contact.

The device 302 may include logic to authorize paired access the extent of which varies according to the manner and/or point of physical contact between the devices. The device 302 may include logic to authorize that a person using one or both devices is authorized to do so, and/or to what extent.

Device Feedback

The device 302 may include feedback logic (e.g. speaker 319, LED 320 and operation logic 314 there for) to provide one or more audible and/or visual and/or tactile indications on the progress and/or results of pairing of the device and the other device, such as lights, tones, vibrations, sounds, or display indications. The device 302 may include at least one menu 324 of pairing options. The device 302 may include logic to provide an indication that a user should provide input to the pairing process.

The device 302 may include at least one of logic to provide an indication that pairing was successful, unsuccessful due to insufficient available information, to indicate that pairing between the devices is available, or to indicate that pairing is in process.

The device 302 may include logic to provide an indication that the user should provide at least one of a password, spoken input, biometric input, or information from a card and/or memory device.

Device Manner of Contact

The device 302 may include contact processing logic 305 to ascertain a manner in which contact between devices is accomplished, such as rotation, angle of incidence, or relative lateral motion between the device 302 and the other device, either before and/or after contact, and/or during contact at the contact point or points. The device 302 may include logic to detect a duration of contact and to interpret the duration of contact as an indication of how and/or whether pairing of the device 302 and the other device should proceed.

The device 302 may include logic to detect multiple instances of contact and to interpret the multiple instances of contact as an indication of how and/or whether pairing of the device 302 and the other device should proceed. The device 302 may include logic to detect an intensity of contact and to interpret the intensity of contact as an indication of how and/or whether pairing of the device 302 and the other device should proceed, such as logic to detect at least one of an average contact force, a peak contact force, or force gradient.

Device Proximity

The device 302 may include logic 307 to detect proximity, and/or increasing proximity with another device and to interpret activation of the contact sensor, in conjunction with proximity and/or recently detected increasing proximity with the other device, as an indication that pairing with the other device should be attempted.

The device 302 may include logic 306 to enable the device to wirelessly exchange with the other device information needed for pairing, upon approaching or becoming proximate with the other device, but prior to activation of the contact sensor 326 327, and logic to interpret activation of the contact sensor 326 327 as an indication that the information should be applied to complete the pairing process.

Figure 1A:
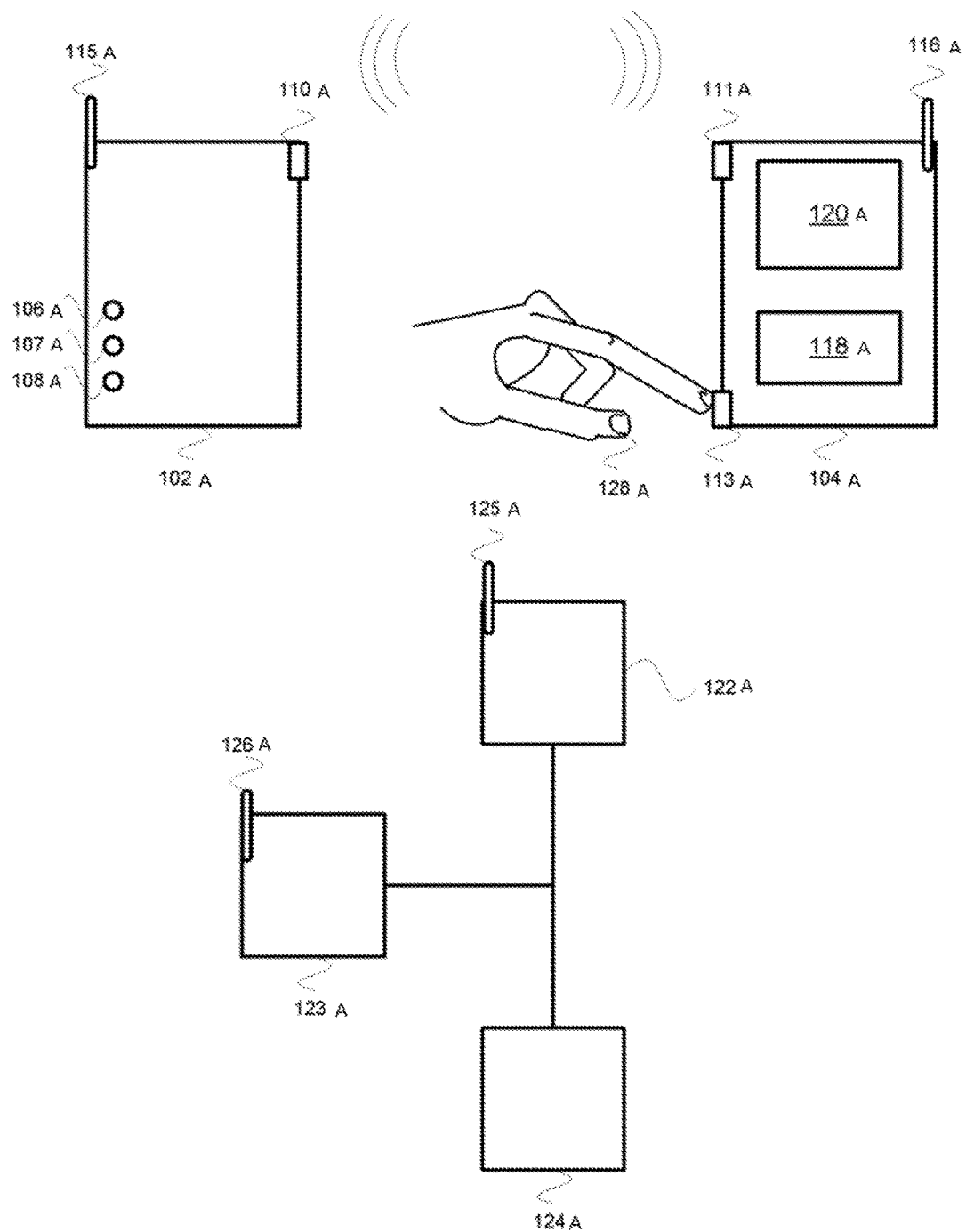
FIG. 1A is a block diagram of an embodiment of a device pairing arrangement.
Figure 2:
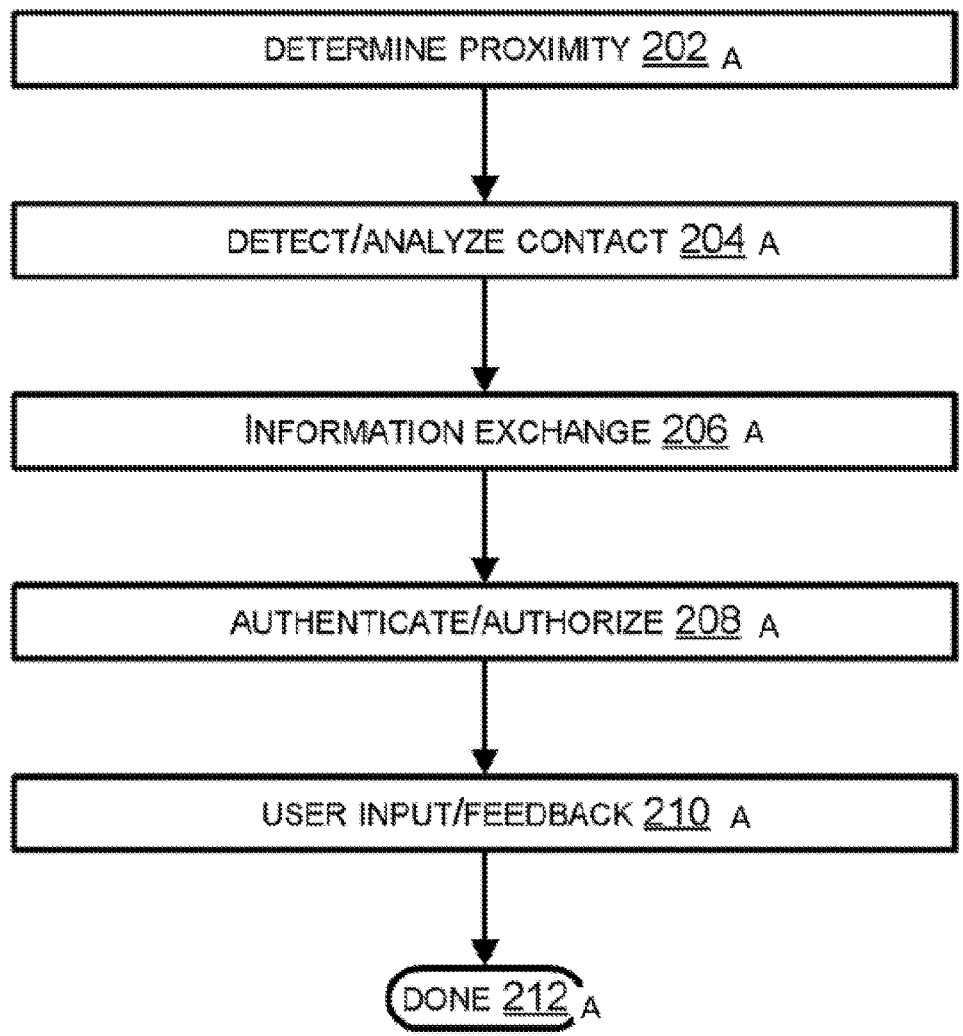
Figure 3:
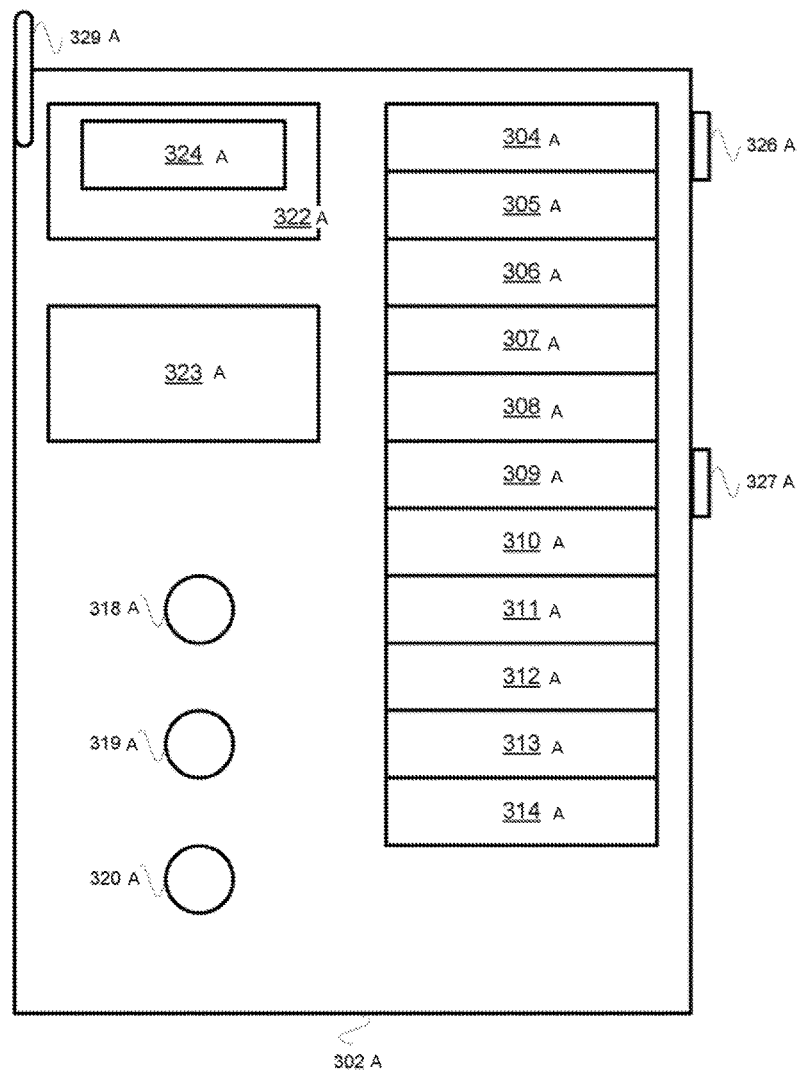

FIG. 1A is a block diagram of an embodiment of a device pairing arrangement.

Overview of FIG. 1A

A device 102A includes a microphone 106A, a speaker 107A, a LED 108A, an antenna 115A and a contact area 110A. There may be more than one contact area 110A. The contact area 110A may be incorporated in a complex device part such as a touch sensitive screen incorporating other functions such as display. The contact area 110A or areas may be any part of the device 102A which may be touched by an individual 128A to effect pairing with another device 104A.

The microphone 106A may be used for audible input to the device 102A and may not be present in all embodiments. Audible input may include sounds such as tapping or voice input such as whistling or speaking Voice input may be processed into words and/or phrases, and/or it may be processed as a sound pattern (e.g. a voice print). Voice input may be used, at least in part, as a biometric for individual identification.

The speaker 107A and LED 108A may be used for audible and visual information conveyed from the device 102A. Information conveyed from the device 102A may include requests that an individual perform an action, and/or feedback on the condition of some operation the device 102A may have performed or may be performing (such as pairing). The speaker 107A and/or LED 108A may not be present in all embodiments. Other mechanisms of communicating information such as a buzzer, display, tactile surface may be present additionally or instead of the speaker 107A and/or LED 108A.

Feedback may be communicated to the user in various ways, such as those described above using speakers, LEDs, other device outputs, or via some other proximate device such as device 122A.

The device 102A may include an antenna 115A for wireless communication with other devices. The device 102A may include other features such as a scanner, a camera, or cellular telephone capabilities.

Examples of devices 102A and 104A include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A second device 104A includes an antenna 116A, contact areas 111A and 113A, logic 118A, and a display 120A. The antenna 116A enables wireless communication between the device 104A and other devices.

The device 104A may have a single contact area, or, as shown, two or more contact areas 111A, 113A. The contact area of areas 111A, 113A may be any part of the device 104A which may be touched by an individual 128A to effect pairing.

The device 104A need not include a display 120A, although a display may prove useful for certain aspects of the pairing process. The display 120A could be part of the first device 102A, or some other device such as device 122A.

The logic 118A operates to effect techniques of the device pairing arrangement and acts for pairing devices 102A and 104A. The logic 118A may exist on the first device 102A, the second device 104A, or in part on both devices 102A and 104A. The logic 118A may exist, at least in part, on other devices, such as devices 122A and/or 124A. The devices 122A and 124A may comprise a proximate laptop, a desktop, or other computing device, and/or supporting network and communication equipment.

The display 120A may be used to provide information to an individual or individuals such as the person or persons touching the devices 102A, 104A. In some embodiments, other mechanisms of communicating information such as an LED, buzzer, or speaker may be present additionally or instead of the display 120A on either or both of devices 102A and 104A, and/or a proximate device such as 122A.

The devices 102A and/or 104A may include other features not described herein. The devices 102A and/or 104A may include a laptop, desktop, tower, or server computer attached via wireless or wired communications to an Intranet and/or the Internet and providing, for example, a sophisticated application such as a medical patient monitoring station or machine control application for a machine tool.

The logic 118A for devices 104A and/or 102A may include a capability to recognize that the device 102A and/or 104A is being touched by a person as versus an inanimate object. The capability to recognize that the device 102A, 104A is being touched by a person may include a capability to identify or otherwise authenticate the touching individual through the contact point 110A 111A or 113A. In some embodiments, one or both of devices 102A, 104A may not need to or have the capability of recognizing that a person is directly performing the touching. For example, a person might touch one device 102A using a finger and the other 104A using a pointer, and thus initiate pairing.

The device pairing arrangement may also include additional devices, such as devices 122A, 123A, and 124A. Various data, logic, resources, and capabilities, including information and logic, to accomplish the pairing process may be provided by these other devices 122A, 123A, and 124A. The devices 102A and/or 104A to pair may communicate with one or more of the devices 122A-124A using wireless or other types of communication during the pairing process.

By way of example, the device 123A may provide a network access point for a wired and/or wireless network. Thus, for example, the device 123A may include an antenna 125A. The antenna 125A may enable one or both of devices 102A,104A to communicate via a network with other devices, such as device 124A, located remotely from device 102A,104A. Such communication may enable devices 102A and/or 104A to receive additional information from device 124A that may assist in the pairing process. Some of the logic 118A used to effectuate pairing including even in some cases the decision to pair may be embodied in a remote device or devices 124A.

Pairing

The device pairing arrangement includes a first device 102A, a second device 104A, and logic 118A to effect pairing of devices 102A,104A upon detection that touching of both devices 102A,104A has occurred. Some functions of the logic 118A will be exercised at various times in various embodiments. For example, when devices 102A and 104A possess wireless capabilities, they may exchange some information prior to touching as well as potentially during and/or after. However, pairing will only occur if both devices 102A and 104A have been touched.

Pairing involves cooperative operation of the two devices 102A,104A, generally involving communication between the devices 102A,104A. Effecting pairing may involve actions such as identifying either one or both devices 102A,104A or one or more device characteristics, features, and/or functions; identifying (authenticating) the person or some characteristic of the person using the devices 102A, 104A; authorizing the pairing and/or to what extent; and configuring one or both of the devices 102A,104A with settings and information to facilitate paired operation.

Effectuating pairing involves communication of information. Information may be communicated in various ways, including using the contact points 110A and 111A or 113A, wirelessly, or using some wired communication method, or combinations thereof. An example of communicating information via a contact point 111A would be the use of a pen or ring having communication capabilities to touch device 104A. The touching might, along with a touch of the first device 102A, effect the initiation of pairing and during the same contact the pen device might communicate information about the identity of the touching individual 128A to device 104A which would be used for authentication by the logic 118A. As a second example, a person might touch a contact point 110A on device 102A using a cable. The person might then touch a contact point 113A on device 104A using the other end of the cable. Devices 102A and 104A might then communicate to effect pairing using their contact points 110A and 113A. After pairing is effected, they might continue to communicate but in some other manner, such as wirelessly. The use of a special cable to effect pairing may also act as an authentication/authorization mechanisms as individuals not possessing the cable would be unable to effect pairing.

Information to facilitate pairing may be communicated between the two devices 102A,104A, or almost entirely from one device to another. For example, device 102A may consist of a medallion or ring with containing stored value (similar in concept to a prepaid phone card) which is used primarily to accomplish a commercial transaction. After device 102A is touched at its contact point 110A, device 102A may use its antenna 115A to pass information about the stored value to device 104A. Device 104A may then perform many, most, or all actions involved necessary to establish pairing, such as identifying the commercial transaction and deciding if it may be accomplished. (The user may be interacting through a touch screen display 120A or keyboard or verbally with device 104A during this period.). Device 104A may then initiate pairing. While the two devices are paired, device 104A may pass information about the commercial transaction back to device 102A.

The information exchanged, and the direction of such exchange, may vary as pairing proceeds. For example, the device 102A might pass information about a desired common purpose to the device 104A, along with capabilities of the device 102A. The device 104A may determine if it is suitable to provide the common service with device 102A, and notify device 102A of this decision. The device 102A may then pass information authenticating the person using it to the device 104A. And so on.

Sometimes, effectuation of pairing may at times require an individual to provide an input to one or both of the devices 102A,104A, or to perform an action. For example, the user of the device 102A and/or 104A may have to enter a password or provide a biometric input before pairing will be accomplished. The user may have to speak his or her name, to be validated biometrically. The individual may have to present a finger to a scanner for biometric fingerprint identification. In some situations, the contact point such as 110A may also have biometric capability. For example, the contact point 110A might have fingerprint scanning capability.

Effectuation of pairing may in some instances involve access to information and processing capability external to the two pairing devices 102A,104A. For example, if an individual provides a biometric input to device 102A, it might use the antenna 115A to communicate the fingerprint information wirelessly to device 123A via the antenna 126A. Device 123A might then provide the fingerprint information, via a network, to device 124A for authentication and authorization of the user's permission to pair device 104A with device 102A.

The information needed to effect pairing may be passed using a variety of physical medium. Some or all of the information needed to effect pairing may be communicated through the contact point of the two devices 102A,104A as in the examples of the touching pen and the touching cable provided above. Some or all of the information needed to effect pairing may be communicated using a wireless capability of either or both devices 102A,104A. Either or both of devices 102A,104A may implement wired or wireless network connectivity, so that some or all of the information needed to effect pairing may be communicated to one or both devices via a communication network.

One or both devices 102A,104A may be paired with some other device (not shown) at the time the devices 102A,104A are touched. Depending on the circumstances, the original pairing or pairings may be terminated, and a pairing between the devices 102A,104A effected. Or, a second pairing may occur between devices 102A,104A and one or more original pairings may continue. In some circumstances, when the two devices 102A,104A are touched, pairing may be rejected if one or both devices 102A,104A are already paired.

Contact

The system may include a first device 102A, a second device 104A, and logic 118A to effect pairing of the first 102A and second devices 104A upon activation of contact sensors 110A and 111A or 113A of both devices 102A and 104A. The logic 118A may operate to interpret touching, e.g. activation of the contact sensors, of one or both devices 102A and/or 104A as an indication to initiate exchange between the devices 102A,104A of at least some of authentication, authorization, compatibility and/or configuration information needed for pairing. Under these circumstances, this information may be passed during or after touching has occurred. Again, although the logic 118A is illustrated with respect to device 104A, the logic may in fact exist wholly or in part in various elements of the system, including devices 102A, 122A, and 124A, or any other device of the system.

The logic 118A may operate to interpret recognition of touching as a confirmation that pairing is to occur. Some of the information needed to effect pairing may be communicated prior to the time of contact. For example, the devices 102A,104A may both have antennas 115A 116A supporting wireless communication and may pass some pairing information when in proximity but before making contact. More communication to effect pairing may then occur, as necessary, after the two devices 102A and 104A have been touched.

The logic 118A may include logic to enable the devices 102A,104A to obtain pairing information, at least in part, via the physical contact point 110A, 111A or 113A. The logic 118A may touching of both devices 102A and 104A to be simultaneous in order to effect pairing. The logic 118A may provide for interrupting or ending the pairing process if contact with one or both devices 102A, 104A is broken. The logic 118A may provide for enabling the devices 102A and 104A to wirelessly exchange information needed for pairing only during activation of the contact sensors 110A and 111A or 113A of both devices 102A, 104A.

Manner of Contact

The system may include logic 118A to ascertain a manner in which contact with one or both devices 102A, 104A is accomplished. By identifying a manner of contact, other information is provided by the contact beyond the fact of contact. The additional information may be used to determine that pairing is, in fact, intended. For example, pairing might be recognized as intended if each device is touched for at least some number of seconds.

The additional information obtained from the manner of pairing may be used during pairing effectuation. For example, the additional information may act to authenticate (identify) and/or authorize a user of the device(s) 102A, 104A. For example, moving the touching finger 128A vertically up and down three times could act to authorize pairing. The additional information may act to identify how to proceed with pairing, e.g. in what manner and/or to what extent to pair the devices. For example, touching and, at the same time, rotating the device 102A clockwise could indicate that pairing should occur between a headset and a telephone base, with connection to the office. Counterclockwise rotation could mean pairing between the headset and the base, with a connection to a relative's home.

The system may include logic 118A to determine which contact area (such as 111A or 113A) or areas are being touched.

The system may include logic 118A to ascertain relative motion between one or both devices 102A and/or 104A, and/or a finger or fingers contacting one or both devices 102A, 104A. The system may include logic 118A to ascertain at least one of rotation, angle of incidence, or relative lateral and/or circular motion between the devices 102A and 104A and/or the fingers and one or both devices 102A, 104A. Determining relative lateral motion may include logic to recognize that the finger 128A which has touched the device 104A is moving across one or more of the contact points 111A or 113A, how fast, and/or in what relative direction.

The system may include logic 118A to determine the orientation of one device 102A with respect to the touching instrument at the time of contact. For example, logic 118A may determine that the long axis of device 102A is oriented horizontally with respect to the long axis of the touching finger 128A. Determining the orientation of one device 102A with respect to a touching instrument may include determining the orientation of one contact area 110A on device 102A with respect to the touching instrument such as a touching finger 128A.

The logic 118A may operate to detect duration of contact with one or both devices 102A and/or 104A. The logic 118A may operate to detect multiple instances of contact for one device or both 102A and/or 104A. For example, a user 128A touching the device 102A may tap it on the contact area 110A a number of times to indicate that pairing is wanted and authorized to some particular second device 104A. The logic 118A may operate to detect an intensity of contact for one device or both 102A and/or 104A, for example, to detect at least one of an average contact force, a peak contact force, or force gradient.

All manner of touching information gained may be used when to effect a pairing, to identify the intent to pair, to identify the purpose and extent of pairing, to authenticate/authorize, and to configure, or to provide any other information needed to accomplish pairing.

Relative Motion Before or After Contact

The logic 118A may operate to ascertain relative motion between the devices 102A,104A prior to or after contact. Information about relative motion may be applied for various purposes, including authentication and/or authorization. For example, the user may be required to swing the device 102A to and fro when proximate to the device 104A within a certain number of seconds of touching in order for the pairing to be authorized. Ascertaining relative motion prior to or after contact may include use of the wireless capabilities of the devices 102A,104A.

Authorization/Authentication

The system may include logic 118A to authenticate and/or authorize pairing between the devices 102A,104A. Authenticating and/or authorizing the pairing may include identifying one or both devices 102A,104A and/or identifying at least one device characteristic for one or both devices 102A,104A, such as determining whether the devices 102A, 104A are suitable for use for the purpose required and that they 102A,104A are compatible for pairing to accomplish that purpose. For example, pairing may have been initiated with a goal of accomplishing a commercial transaction requiring secure communication. Both devices 102A,104A may have a device characteristic of supporting one or more varieties of encryption. However, they 102A,104A may support only DES encryption in common. The recognition that the devices 102A,104A are compatible and that DES encryption should be employed may occur as a result of the information exchanged during the pairing effectuation process. The system may include logic to authorize that a person using one or both devices 102A and 104A is authorized to do so, and/or to what extent. Authenticating and/or authorizing pairing may include identifying the user who is touching one or both of the devices 102A or 104A and/or identifying at least one characteristic of the user. For example, the user may be a member of a group, department, or organization, such as a computer network administrator with broad access privileges.

The system may include logic 118A to interpret activation of the contact sensors 110A 111A and/or 113A of one or both devices 102A and/or 104A as an indication to initiate exchange between the devices 102A and 104A of at least some of authentication, authorization, or compatibility information needed for pairing. The system may include logic 118A to interpret signals indicating that the devices 102A and 104A have been touched as an indication that the authentication, authorization, or compatibility information (which may have been obtained in communication occurring prior to touching) should be applied to complete pairing.

The system may include logic to authorize an extent of pairing of the devices 102A,104A. By extent of pairing it is meant authorization of which functions and how extensively certain functions can be performed while the devices 102A, 104A are paired. Authorization of an extent of pairing may be based, at least in part, on the identity or at least one characteristic of the user. Authorization of an extent of pairing may be based, at least in part, on the identity of the devices 102A,104A or device characteristics or state.

Authorization of an extent of pairing may be based, at least in part, on the manner of touching and/or point of physical contact 110A 111A 113A between the two devices 102A,104A. The system may include logic 118A to authorize paired access the extent of which varies according to an amount of area touched on one or both devices 102A,104A. The system may include logic 118A to determine an extent of pairing based at least in part upon which device 102A or 104A is touched first. Authorization may be provided for a greater number and/or different functions and/or features of one or both devices 102A,104A than would be available if the devices 102A and 104A were paired without touching.

Authorization of an extent of pairing may be based, at least in part, on time of day or physical location.

The system may include logic 118A to establish a secure channel between the devices 102A and 104A for communication of pairing information. Establishment of a secure channel may particularly be used to communicate authentication/authorization information. Establishment of a secure channel may depend on the purpose for which pairing is being established and the capabilities of the devices 102A, 104A. In some cases the secure channel established during pairing effectuation will also be used after the devices 102A,104A are paired for continuing device communications. In some cases the devices 102A,104A will reestablish communications, if needed, when pairing actually occurs, using the same or different physical mechanisms.

System Feedback

The system may include logic 118A to provide one or more audible and/or visual and/or tactile indications on the progress and/or results of pairing of the devices 102A and 104A. The system may include logic 118A to provide at least one of one or more lights, tones, vibrations, sounds, or display indications. Tactile, vibration, or other feedback may be provided through the contact point(s) 110A 111A 113A for one or both devices 102A,104A. The device 102A may include feedback capabilities such as a speaker 107A and/or LED 108A. The device 104A is shown as including a display 120A for feedback purposes, among other things.

The system may include logic 118A to provide a first indication when the first device 102A is touched, and logic 118A to provide a second indication when the second device 104A is touched.

Providing feedback may include providing at least one menu of pairing options, such as might be presented on a display 120A or by the speaker 107A.

Providing feedback may include providing an indication that a user should provide input to the pairing process. Such inputs could include speech, keyboard entry, pressing a switch, performing a scan, or taking an action or actions involving the contact points 110A 111A 113A of the devices 102A,104A. The feedback may indicate that the user should provide at least one of a password, spoken input, biometric input, or information from a card and/or memory device.

The system may include at least one of logic 118A to provide an indication that pairing was successful, unsuccessful due to insufficient available information, to indicate that pairing between the devices 102A and 104A is available, or to indicate that pairing is in process.

System Communication with Other Devices

The system may include logic 118A to communicate wirelessly or in some other manner with at least one device 122A 124A different than the two devices 102A,104A being paired, in order to obtain information needed to effect pairing between the devices 102A,104A. The other device or devices 122A 124A may be physically near (same or close room or same building) or remotely located with respect to the location of the pairing devices 102A,104A. The other device or devices 122A 124A may be accessed wirelessly, or via a network such as an intranet or the Internet.

The system may include at least one proximate desktop, laptop, or handheld computing device which may be used, at least in part, to effect pairing.

System User Input

The system may include logic 118A to await user input as a result of activation of one or more of the contact sensors 110A 111A 113A on one or both devices 102A,104A. The system may include logic 118A to await authentication information for the user. The system may include logic to await at least one of input from a keypad, voice input, or biometric input. The system may await actions to be taken by the user, such as touching for a certain approximate duration of time, touching multiple times in a pattern, or touching one of the devices 104A at a different contact point 113A or 111A from the original touch, or other actions.

Proximity Between Devices

The logic 118A may operate to detect increasing proximity between the devices 102A,104A and to interpret activation of one or both of the contact sensors 110A 111A 113A, in conjunction with recently detected increasing proximity between the devices 102A and 104A, as an indication that pairing of the devices 102A and 104A should be effected.

The system may include logic 118A to enable the devices 102A and 104A to wirelessly exchange information needed for pairing, upon the devices 102A and 104A approaching or becoming proximate with one another, but prior to activation of contact sensors 110A 111A 113A of one or both devices 102A and/or 104A, and logic 118A to interpret activation of the contact sensors 110A 111A 113A of one or both devices 102A and/or 104A as an indication that the information should be applied to complete the pairing process.

FIG. 2A is a flow chart of an embodiment of a device pairing method.

Overview of FIG. 2A

At 202A, the devices are recognized as proximate. This may take place, for example, in situations where the devices communicate prior to being touched. At 204A, one or both devices detect that they have been touched, e.g., that their contact sensors 110A 111A 113A have been activated. Information about the manner of touching may be analyzed. At 206A, information is exchanged between the two devices to effect pairing. As was previously noted, some or possibly all of this information may have been exchanged earlier in situations where the devices were communicating with each other prior to the touching. At 208A, information obtained prior to, during, or after contact is applied to authenticate and/or authorize the pairing of the devices. At 210A, feedback is provided to the user and user input obtained. Feedback and user input may occur as a part of the authentication and authorization process 20A8, or for other reasons. At 212A, the pairing effectuation process is complete.

Proximity

The method may include wirelessly exchanging information needed for pairing between the devices, upon the devices becoming proximate with one another, but prior to contact with the devices, and interpreting contact with the devices as an indication to complete pairing of the devices. Activation of one or more contact sensors, in conjunction with recently detected increasing proximity between the devices, may provide an indication that pairing of the devices should be attempted. Information for pairing the devices may be exchanged wirelessly, upon the devices becoming proximate with one another, but prior to activation of one or more contact sensors, and activation of the one or more contact sensors may provide an indication to complete pairing of the devices. In some cases, the pairing effectuation process may begin on activation of one contact sensor and information may be exchanged, but pairing is not completed until it is confirmed by actuation of another contact sensor on the other device.

Although in many embodiments the same individual may touch both devices, and they may therefore likely be proximate at the time of touching; in some cases two different individuals may be doing the touching, one for each device. In that situation the devices may be situated further apart at the time of touching. These devices may communicate wirelessly or through a wired network to effect pairing.

Relative Motion/Rotation/Angle Before During or After Contact

Relative motion between the devices may be applied to influence the pairing process, and/or the extent of pairing undertaken. The method may include ascertaining relative motion between the devices. The method may include ascertaining at least one of rotation, relative angle, or relative lateral motion of the devices. The method may include use of the wireless communications capabilities of the devices to determine relative motion.

Contact

The method may include detecting physical contact of a person with a first device and with a second device, and effecting pairing between the first and second device as a result of detecting the physical contact of the person with the first and second devices. Contact may result in initiating an exchange between the devices of at least some of authentication, authorization, or compatibility information needed for pairing. The devices may exchange pairing information prior to, during, only during, or after a time when the devices are one or both being touched.

The method may include effecting pairing between devices upon detection of simultaneous physical contact with both devices by the person.

The method may include detecting contact with the first device, followed by contact with the second device, as an indication that pairing of the devices should be effected.

The method may include the devices exchanging information needed for pairing via points where the devices are touched. A previous example discussed information exchange via the contact points using a cable.

The method may include interrupting the pairing process if contact is lost with one or both of the devices.

The method may include the devices wirelessly exchanging pairing information only during a time when contact is made with one or both of the devices. This may occur naturally, if, for example, touching is effected by a cable through which the pairing information is exchanged. It may also be designed to ensure that touching did not occur for some reason other than effecting pairing.

Manner of Contact

The method may include ascertaining a manner in which contact with one or both devices is accomplished. The information gained may be used for any purpose during pairing effectuation, but will frequently be applied for authentication and/or authorization.

The method may include ascertaining the manner is which one or more fingers touch one or both devices.

The method may include ascertaining at least one of rotation, angle of approach, or relative lateral motion of one or more fingers at one or points of contact with one or more of the devices.

The method may include interpreting a duration of contact with one or both devices as an indication of how and/or whether pairing of the devices should proceed and/or be accomplished.

The method may include interpreting multiple instances of contact with one or both devices as an indication of how and/or whether pairing of the devices should proceed and/or be accomplished.

The method may include interpreting the intensity of contact with one or both devices as an indication of how and/or whether pairing of the devices should proceed and/or be accomplished.

The method may include interpreting at least one of an average contact force, a peak contact force, or force gradient as the indication of how and/or whether pairing of the devices should proceed and/or be accomplished.

Authorization/Authentication

The pairing process, and the extent of pairing effected, may involve authentication and/or authorization of a user of the device or devices, and/or the devices themselves, as previously discussed. For example, identification of one or both of the devices, or identification of a user of one or both of the devices, and/or characteristics thereof, may be involved in the pairing process.

The method may include touching a first of the devices initiating exchange between the devices of at least some of authentication, authorization, or compatibility information needed for pairing.

The method may include the devices communicating wirelessly to obtain information needed to effect pairing with one another.

The method may include authorizing an extent of pairing of the devices according to at least one of identification of one or both of the devices, or identification of a user of one or both of the devices.

The method may include authorizing access to a greater number and/or different functions of one or both devices than would be available if the devices were paired without contact taking place to one or both devices.

The method may include authorizing access to functions and/or features of one or both devices to an extent of which varies according to the manner and/or point of contact with one or both devices.

The method may include authorizing that the user may use one or both devices, and/or to what extent.

Feedback

In many instances, the system user will need to know how the process to effect pairing is proceeding. The method may include providing one or more audible and/or visual and/or tactile indications on the progress and/or results of pairing of the devices.

User Input

The method may include prompting for user input as a result of contact occurring with one or both devices. The method may include providing an indication that the user should provide at least one of input from a keypad, voice input, or biometric input. The method may include prompting for authentication information for the user.

FIG. 3A is a block diagram of an embodiment of a device to accommodate pairing.

Overview of FIG. 3A

A device 302A includes a display 322A that may be used, among other things, to provide a menu 324A of options. The device 302A includes a microphone 318A which may be used to detect sound (such as tapping) and/or voice input. The device 302A includes a keypad 323A. The device 302A includes two parts which may be used to provide user feedback, a speaker 319A and a LED 320A. The device 302A includes two contact sensors 326A and 327A. The device 302A also includes various logic elements which may operate to effect device pairing. Of course, the device 302A may include additional elements that are not shown here and which are superfluous to this discussion.

Device logic includes pairing process management logic 304A, contact processing logic 305A, wireless communication logic 306A, proximity and motion logic 307A, user input logic 308A, speech processing logic 309A, biometric processing logic 310A, third device interface logic 311A to interact with a device or devices other that the two pairing devices, authentication logic 312A, authorization logic 313A, and feedback logic 314A.

An antenna 329A enables the device 302A to engage in wireless communication.

Not all embodiments of the device 302A will include all of the illustrated logic. For example, if a device 302A did not have a speaker 319A or microphone 318A and performed no audible inputs or outputs, it would not need and probably would not have speech processing logic 309A. If a device 302A had no biometric input it would not need and probably would not have biometric processing logic 310A. And so on.

Device Contact

The device 302A may include at least one contact sensor 326A or 327A, and logic to cause the device 302A to, upon activation of the contact sensor 326A or 327A, wait for a signal from another device indicating that the other device has been touched, and upon receiving the signal, undertaking pairing with the other device.

The device 302A may include logic 305A to cause the device 302A, upon activation of the contact sensor 326A or 327A, to wait for a limited amount of time for the signal indicating that the other device has been touched, and if such signal is not received within the limited amount of time, to cause the device 302A to stop waiting for the signal.

The device 302A may include one or more one touch-sensitive areas, temperature-sensitive areas, or conductivity-sensitive areas which may act as contact sensors 326A or 327A.

The device 302A may include logic 305A to enable the device 302A to exchange with the other device information needed for pairing via physical contact points 326A or 327A of the device 302A and other device.

The device 302A may include logic 304A and 305A to interrupt the pairing process if contact with the device or other device is broken.

The device 302A may include logic 306A to enable the device 302A to wirelessly exchange with the other device information needed for pairing only during activation of its 302A contact sensor 326A or 327A, or only during activation of its 302A contact sensor 326A and 327A and after receiving the signal indicating that the other device has been touched.

Device Manner of Contact

The device 302A may include logic 305A to ascertain a manner in which contact with the device 302A is accomplished. Ascertaining manner of contact provides additional information that may be used while pairing is being effected, most often, authentication/authorization information.

The device 302A may include logic 305A to ascertain relative motion between the device 302A and a finger or other touching instrument that is touching the device 302A.

The device 302A may include logic 305A to ascertain at least one of rotation, angle of incidence, or relative lateral and/or circular motion between the device 302A and the touching instrument.

The device 302A may include logic 305A to detect a duration of contact. The logic 305A may interpret the duration of contact as an indication of how and/or whether pairing of the device 302A and the other device should proceed.

The device 302A may include logic 305A to detect multiple instances of contact. The logic 305A may interpret the multiple instances of contact as an indication of how and/or whether pairing of the device 302A and the other device should proceed.

The device 302A may include logic 305A to detect an intensity of contact. The logic 305A may interpret the intensity of contact as an indication of how and/or whether pairing of the device 302A and the other device should proceed.

The device 302A may include logic 305A to detect at least one of an average contact force, a peak contact force, or force gradient.

Device Authentication/Authorization

The device 302A may include logic 304A to interpret activation of at least one of the contact sensors 326A 327A as an indication to initiate exchange with the other device of at least some of authentication, authorization, or compatibility information needed for pairing, and to interpret the signal indicating that the other device has been touched as an indication that the authentication, authorization, or compatibility information should be applied to complete pairing with the other device.

The device 302A may include logic to authenticate 312A and/or authorize 313A pairing with the other device. The device 302A may include logic to establish a secure channel for communication of pairing information, frequently including authentication and/or authorization information.

The device 302A may include logic to switch from one pairing partner to another as a result of activation of the contact sensors 326A 327A.

The device 302A may include logic 313A to authorize an extent of pairing of the device and the other device.

The device 302A may include logic 313A to authorize paired access to a greater number and/or different functions of one or both devices than would be available if the devices were paired without each device being touched.

The device 302A may include logic 313A to authorize paired access the extent of which varies according to the manner and/or point of physical contact with the device 302A and/or the other device.

The device 302A may include logic 313A to authorize that a person using one or both devices is authorized to do so, and/or to what extent.

The device 302A may include logic to determine an extent of pairing based at least in part upon which device is touched first.

The device 302A may include logic 313A to authorize paired access the extent of which varies according to an amount of area touched on one or both devices.

Device Feedback

The device 302A may include feedback (e.g. speaker 319A, LED 320A and feedback operation logic 314A) to provide one or more audible and/or visual and/or tactile indications on the progress and/or results of pairing. Logic 314A may provide for indications of at least one of lights, tones, vibrations, sounds, or display indications. Logic 314A may provide at least one menu 324A of pairing options. Logic 314A may provide an indication that a user should provide input to the pairing process.

The device 302A may include logic 314A to provide a first indication when the first device 302A is touched, and logic 314A to provide a second indication when the second device is touched.

The device 302A may include at least one of logic 314A to provide an indication that pairing was successful, unsuccessful due to insufficient available information, to indicate that pairing between the devices is available, or to indicate that pairing is in process.

The device 302A may include logic 314A to provide an indication that the user should provide at least one of a password, spoken input, biometric input, or information from a card and/or memory device.

Device Communication with Other Devices

The device 302A may include logic 311A to communicate wirelessly with at least one device (a third device) different than the other device (its pairing partner) to obtain information needed to effect pairing with the other device. The device 302A may include logic 311A to communicate using wired communication with at least one different device (the third device). The third device or different devices may be proximate or located remotely over a network. The third device or different devices may include at least one proximate desktop, laptop, or handheld computing device.

Device User Input

The device 302A may include logic 308A to await user input as a result of activation of the contact sensor 326A or 327A and, in some situations, the signal indicating that the other device has been touched The device 302A may include logic 308A to await authentication information for the user. The device 302A may include logic 308A to await at least one of input from a keypad, voice input 309A, or biometric input 310A.

Device Motion/Rotation/Angle

The device 302A may include logic to ascertain relative motion between the device and the other device. The device 302A may include logic to ascertain at least one of rotation of one device with respect to the other, angle between the devices, or relative lateral motion of the devices.

Device Proximity

The device 302A may include logic 307A to detect proximity and/or increasing proximity with the other device and to interpret activation of the contact sensor 326A or 327A, in conjunction with recently detected increasing proximity with the other device, as an indication that preparation to pair with the other device should be initiated.

The device 302A may include logic 306A to enable the device to wirelessly exchange with the other device information needed for pairing, upon approaching or becoming proximate with the other device, but prior to activation of the contact sensor 326A or 327A, and logic to interpret activation of the contact sensor 326A or 327A as an indication that the information should be applied to complete the pairing process upon receiving the signal indicating that the other device has been touched.

Figure 1B:
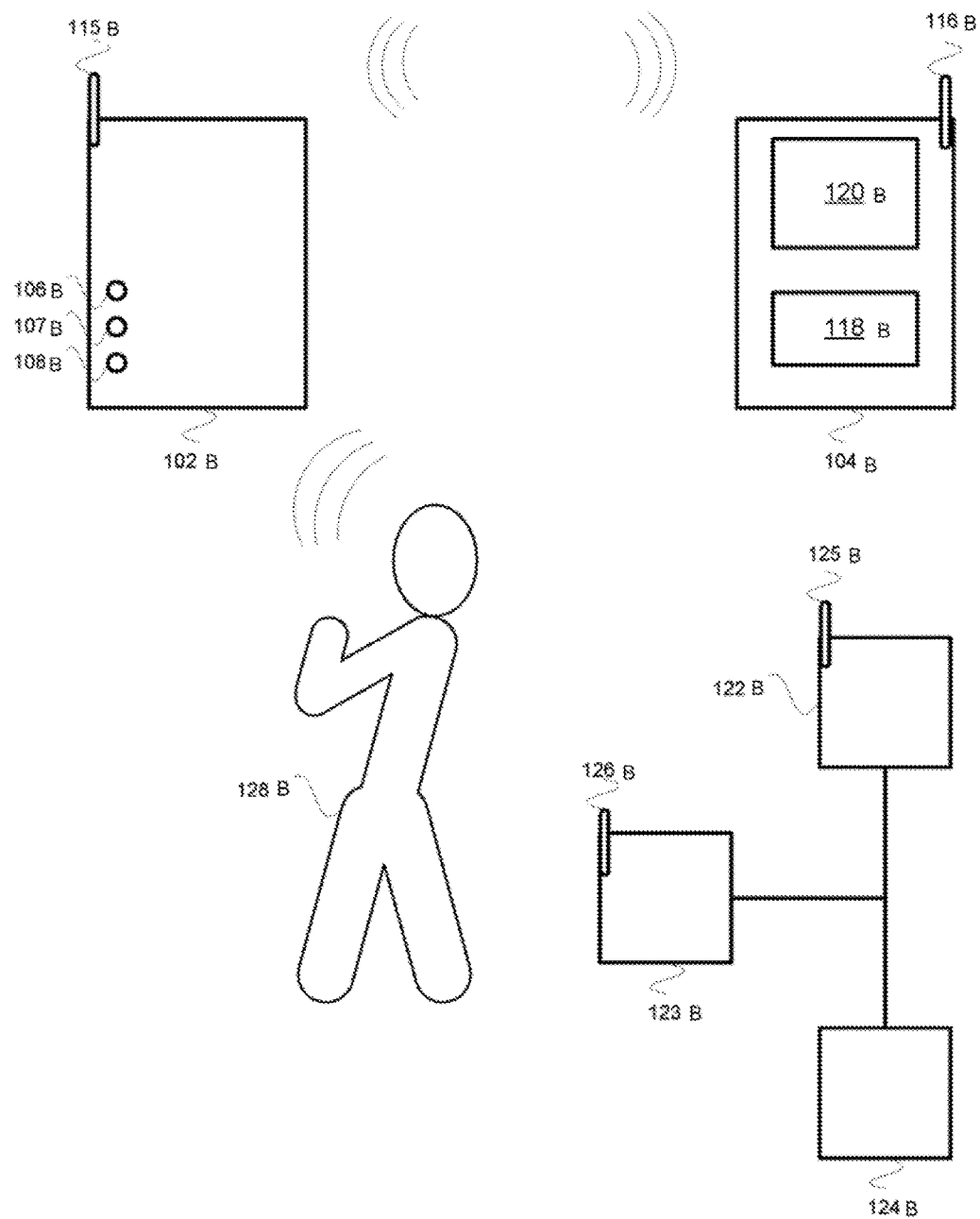
FIG. 1B is a block diagram of an embodiment of a device pairing arrangement.

Overview of FIG. 1B

FIG. 1B is a block diagram of an embodiment of a device pairing arrangement. The system may include and/or involve a first device 102B, a second device 104B, and logic 118B to enable the first and second devices 102B and 104B to pair as a result of at least one sound.

The first device 102B includes a microphone 106B, a speaker 107B, a LED 108B, and an antenna 115B. The microphone 106B is used for sound input to the device 102B. Sound input may include sounds such as tapping or voice input such as whistling or speaking Sound input of at least one sound may be generated by a second device 104B or another device (not shown). For example, an individual located remotely to the device 102B may use a speaker located in the room where device 102B is to effect pairing between the first device 102B and a second device 104B. Sound input of at least one sound may be created by an individual 128B to effect pairing. Sound input may be used, at least in part, to identify one or both devices 102B and 104B, to enter commands, to provide authentication information, and/or to provide authorization information.

Voice input may be processed into words and/or phrases, and/or it may be processed as a sound pattern (e.g. a voice print). Voice input may be used, at least in part, as a biometric for individual identification.

The speaker 107B and LED 108B may be used to convey audible and/or visual information from the device 102B. Information conveyed from the device 102B may include requests that an individual perform an action, and/or feedback on the condition of some operation the device 102B may have performed or may be performing (e.g. a status of pairing). The speaker 107B and/or LED 108B may not be present in all embodiments. Other mechanisms of communicating information such as a buzzer, display, or tactile surface may be present additionally or instead of the speaker 107B and/or LED 108B.

Feedback may be communicated to the user in various ways, such as those described above using speakers, LEDs, other device outputs, or via some other proximate device such as device 122B.

The device 102B may include an antenna 115B for wireless communication with other devices. The device 102B may include other features such as a scanner, a camera, or cellular telephone capabilities.

Examples of devices 102B and 104B include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A second device 104B includes an antenna 116B, logic 118B, and a display 120B, among other elements. The antenna 116B enables wireless communication between the device 104B and other devices.

The device 104B need not include a display 120B, although a display may prove useful for certain aspects of the pairing process. The display 120B could be part of the first device 102B, or some other device such as device 122B.

The logic 118B operates to effect techniques of the device pairing arrangement and acts for pairing devices 102B and 104B. The logic 118B may exist on the first device 102B, the second device 104B, or in part on both devices 102B and 104B. The logic 118B may exist, at least in part, on other devices, such as devices 122B and/or 124B. The devices 122B and 124B may comprise a proximate laptop, a desktop, or other computing device, and/or supporting network and communication equipment.

The logic 118B to enable the first and second devices 102B and 104B to pair as a result of at least one sound may include and/or involve logic to recognize from sound an identification of at least one of the first and second devices.

The logic 118B may also or alternatively include and/or involve logic to extract authentication information from the sound. It may be advantageous, in certain implementations, to include and/or involve logic to identify at least one purpose and/or function from the sound, and/or to identify from the sound at least one of the first and second devices 102B and 104B as providing at least one purpose and/or function. In certain implementations, logic may be present to compare information of the sound with a biometric voice print.

The logic 118B may also or alternatively include and/or involve logic to extract from the sound both information to identify the first and/or second devices 102B and 104B and a biometric voice print. It may be advantageous, in certain implementations, to include and/or involve logic to analyze voice information. The logic to analyze voice information may include and/or involve logic to identify words and/or phrases from the voice information. The logic to analyze voice information may also or alternatively include and/or involve logic to identify, from the voice information, an individual that is the source of the voice information.

The logic 118B may also or alternatively include and/or involve logic to identify a type of the sound. It may be advantageous, in some implementations, to include and/or involve logic to determine a level and/or variation or at least one of volume, pitch, or tone of the sound. The logic to identify a type of the sound may include and/or involve logic to identify at least one of a whistle, a click, a clap, a knock, a snap, a ring, or a tone.

The display 120B may be used to provide information to an individual or individuals such as the person or persons touching the devices 102B, 104B. In some embodiments, other mechanisms of communicating information such as an LED, buzzer, or speaker may be present additionally or instead of the display 120B on either or both of devices 102B and 104B, and/or a proximate device such as 122B.

The devices 102B and/or 104B may include other features not described herein. The devices 102B and/or 104B may include a laptop, desktop, tower, or server computer attached via wireless or wired communications to an Intranet and/or the Internet and providing, for example, a sophisticated application such as a medical patient monitoring station or machine control application for a machine tool.

The device pairing arrangement may also include additional devices, such as devices 122B, 123B, and 124B. Various data, logic, resources, and capabilities, including information and logic, to accomplish the pairing process may be provided by these other devices 122B, 123B, and 124B. The devices 102B and/or 104B to pair may communicate with one or more of the devices 122B-124B using wireless or other types of communication during the pairing process.

By way of example, the device 123B may provide a network access point for a wired and/or wireless network. Thus, for example, the device 123B may include an antenna 125B. The antenna 125B may enable one or both of devices 102B,104B to communicate via a network with other devices, such as device 124B, located remotely from devices 102B,104B. Such communication may enable devices 102B and/or 104B to receive additional information from device 124B that may assist in the pairing process. Some of the logic 118B used to effectuate pairing including even in some cases the decision to pair may be embodied in a remote device or devices 124B.

Pairing

The device pairing arrangement includes a first device 102B, a second device 104B, and logic 118B to effect pairing of devices 102B,104B upon detection that a sound or sounds has been input to device 102B. The sound may provide an indication that pairing should be effected. Herein, such sound or sounds may also be referred to as "pairing sound".

Some functions of the logic 118B may be exercised at various times, depending on the implementation. For example, when devices 102B and 104B possess wireless capabilities, they may exchange some information prior to as well as potentially during and/or after the pairing sound is input. In some embodiments, both device 102B and device 104B include logic 118B to recognize the pairing sound. In some situations, devices 102B and 104B may both recognize the pairing sound in order for pairing to be effected.

Effecting pairing may involve actions such as identifying either one or both devices 102B,104B or one or more device characteristics, features, and/or functions; identifying (authenticating) the person or some characteristic of the person using the devices 102B,104B; authorizing the pairing and/or to what extent; and configuring one or both of the devices 102B,104B with settings and information to facilitate paired operation. In some embodiments, the devices 102B and 104B may receive all information needed to effect pairing via microphones.

The two devices 102B and 104B may cooperate in order to effect pairing, such cooperation generally involving communication between the devices 102B and 104B.

Effectuating pairing involves communication of information. Information may be communicated in various ways, including wirelessly, or using some wired communication method, or combinations thereof. The devices 102B and 104B may also communicate using sound. For example, if device 104 has a speaker (not shown) it might communicate its functional capabilities and the authorization information it requires prior to allowing use of those capabilities to device 102B using its speaker. Device 102B may use its microphone 106B to receive the information.

Information to facilitate pairing may be communicated between the two devices 102B,104B, or almost entirely from one device to another. For example, device 102B may consist of a medallion or ring with containing stored value (similar in concept to a prepaid phone card) which is used primarily to accomplish a commercial transaction. After a person speaks commands to device 102B indicating that it should pair with device 104B in order to accomplish a purchase, device 102B may use its antenna 115B to pass information about the stored value to device 104B. Device 104B may then perform many, most, or all actions involved necessary to establish pairing, such as identifying the commercial transaction and deciding if it may be accomplished. (The user may be interacting through a touch screen display 120B or keyboard or verbally with device 104B during this period.) Device 104B may then initiate pairing. While the two devices are paired, device 104B may pass information about the commercial transaction back to device 102B.

The information exchanged, and the direction of such exchange, may vary as pairing proceeds. For example, the device 102B might pass information about a desired common purpose to the device 104B, along with information about its 102B capabilities. The device 104B may determine if it is suitable to provide the common service with device 102B, and notify device 102B of this decision. The device 102B may then pass information authenticating the person using it to the device 104B and so on.

At times, effectuation of pairing may require an individual to provide an input to one or both of the devices 102B,104B, or to perform an action. For example, the user of the device 102B and/or 104B may have to enter a password or provide a biometric input before pairing will be accomplished. The user may have to speak his or her name, to be validated biometrically. The individual may have to present a finger to a scanner for biometric fingerprint identification.

Effectuation of pairing may in some instances involve access to information and processing capability external to the two pairing devices 102B,104B. For example, if an individual provides a biometric fingerprint input to device 102B, it 102B may use the antenna 115B to communicate the fingerprint information wirelessly to device 123B via the antenna 126B. Device 123B may then provide the fingerprint information, via a network, to device 124B for authentication and authorization of the user's permission to pair device 104B with device 102B.

The information needed to effect pairing may be passed using a variety of physical medium. The devices 102B and 104B may communicate some or all of the information needed to effect pairing using microphones 106B and speakers 107B, as discussed in the example above. The devices 102B or 104B may communicate using their wireless capabilities. Either or both of devices 102B,104B may implement wired or wireless network connectivity, so that some or all of the information needed to effect pairing may be communicated to one or both devices via a communication network.

One or both devices 102B and 104B may be paired with some other device (not shown) at the time the pairing sound is recognized by device 102B. Depending on the circumstances, the original pairing or pairings may be terminated, and a pairing between the devices 102B and 104B effected. Or, a second pairing may occur between devices 102B and 104B and one or more original pairings may continue. In some circumstances, when device 102B recognizes the pairing sound, pairing may be rejected if one or both devices 102B and 104B are already paired.

Proximity

The system may include and/or involve logic to detect proximity between the devices 102B and 104B and to interpret at least one sound, in conjunction with proximity between the devices 102B and 104B, as an indication that pairing of the devices should be attempted.

The system may include and/or involve logic 118B to detect increasing proximity between the devices 102B and 104B and to interpret at least one sound, in conjunction with recently detected increasing proximity between the devices 102B and 104B, as an indication that pairing of the devices should be attempted.

The system may include and/or involve logic 118B to enable the devices 102B and 104B to wirelessly exchange information needed for pairing, upon approaching or becoming proximate with one another, but prior to receiving at least one sound, and logic 118B to interpret the at least one sound as an indication that the information should be applied to complete the pairing process.

Authentication and Authorization

The system may include and/or involve logic 118B to interpret the pairing sound as an indication to initiate exchange with the other device 102B or 104B of at least some of authentication, authorization, or compatibility information needed for pairing.

The system may include and/or involve logic 118B to authenticate and/or authorize pairing of the devices.

The system may include and/or involve logic 118B to establish a secure channel for communication of pairing information.

Authenticating and/or authorizing the pairing may include identifying one or both devices 102B,104B and/or identifying at least one device characteristic for one or both devices 102B,104B, such as determining whether the devices 102B, 104B are suitable for use for the purpose required and that they 102B,104B are compatible for pairing to accomplish that purpose. For example, pairing may have been initiated with a goal of accomplishing a commercial transaction requiring secure communication. Both devices 102B,104B may have a device characteristic of supporting one or more varieties of encryption. However, devices 102B and 104B may support only DES encryption in common. The recognition that the devices 102B and 104B are compatible and that DES encryption should be employed may occur as a result of the information exchanged during the pairing effectuation process.

The system may include and/or involve logic 118B to authorize an extent of pairing of the devices 102B and 104B. The logic 118B to authorize an extent of pairing may include and/or involve logic to authorize paired access to a greater number and/or different functions of one or both devices 102B and 104B than would be available if the devices 102B and 104B were paired without application of the sound. The logic 118B to authorize an extent of pairing may also or alternatively include and/or involve logic to authorize paired access the extent of which varies according to the nature of the sound.

For example, the device 102B may include a radio tuner and it might be paired with either a sound system or a computer, or both simultaneously. All may be located in a dormitory common room. A student may issue a voice command to play a certain radio station using the sound system. If device 102B is not paired at the time that command is received, the pairing with the sound system may be effected and the station indicated by the student may be played. However, when device 102B is paired with the computer, a voice command to initiate playing of a radio station using the sound system may be accepted but the currently playing radio station may be used, not the one indicated by the student. This would be a pairing of device 102B with both the sound system and the computer, enabling both to receive the radio input. If, on the other hand, the pairing sound (in this case actually sounds) includes a separate word that acts as a voice print to identify the user prior to the command word, and the user is authorized, the pairing sound may act to break the pairing with the computer and effect pairing with the sound system. The sound system would be provided the radio station input indicated by the command. This would assure that only responsible people, such as authorized users of the computer, would be affecting inputs to the computer (i.e. the radio input).

As a second example, in a machine shop a machine operator may be able to communicate "hands free" with a device 102B to initiate pairing. Three whistles of short duration may indicate pairing with device 104B using previous configuration information, whereas a whistle of long duration may indicate pairing with device 104B and ask device 104B to receive updated configuration information over a network.

The logic 118B to authorize an extent of pairing may include and/or involve logic to authorize that a person using one or both devices 102B and 104B is authorized to do so, and/or to what extent. Authenticating and/or authorizing pairing may include identifying the user who has communicated the pairing sound and/or identifying at least one characteristic of the user. For example, the user may be a member of a group, department, or organization, such as a computer network administrator with broad access privileges.

Authorization of pairing, authorization of an extent of pairing, and determination of the need for secure communication during the effecting of pairing may be based, at least in part, on other factors such as time of day or location. For example, device 102B and device 104B may effect pairing even though device 102B cannot support secure communications if they are in a certain location, such as a computer room, considered to be secure. However, if device 102B cannot support secure communications with device 104B and the location of device 102B is considered insecure (such as an Internet café), the logic 118B to effect pairing may reject pairing. In some cases, the user, by the nature of sound he provides when effecting pairing, may be able to override the decision of the logic 118B not to allow insecure communication to effect pairing. For example, the user may provide a "secret sound" at the beginning or end of the sounds that initiate pairing, and use of the secret sound may indicate "do it anyway".

Feedback

The system may include and/or involve logic 118B to provide one or more audible and/or visual and/or tactile indications on the progress and/or results of pairing of the devices 102B and 104B. The logic 118B to provide indications on the progress and/or results of pairing may include and/or involve logic to provide at least one presentation of pairing options.

The logic 118B to provide indications on the progress and/or results of pairing may include and/or involve logic to provide an indication that a user should provide input to the pairing process. Such inputs could include speech, keyboard entry, pressing a switch, or performing a scan. The logic 118B to provide an indication that a user should provide input to the pairing process may include and/or involve logic to indicate that the user should provide at least one of a password, spoken input, biometric input, a user selection of a pairing option, or information from a card and/or memory device.

The logic 118B to provide indications on the progress and/or results of pairing may also or alternatively include and/or involve logic to provide at least one of one or more lights, tones, vibrations, sounds, or display indications.

The logic 118B to provide indications on the progress and/or results of pairing may include and/or involve at least one of logic to provide an indication that pairing was successful, an indication that pairing was unsuccessful due to insufficient available information, an indication that pairing between the devices 102B and 104B is available, or an indication that pairing is in process.

Factors Affecting Pairing

The system may include and/or involve logic 118B to ascertain various factors that may affect the pairing process, such as relative motion between the devices. For example, the logic 118B may ascertain at least one of rotation, angle of approach, or relative lateral motion between the devices. Information about relative motion may be applied for various purposes, including authentication and/or authorization. For example, the user may be required to swing the device 102B, such as a medallion or cellular phone, to and fro during a time proximate to the issuing of the pairing sound. This may help ensure that the pairing sound is purposeful to initiate pairing.

The system may include and/or involve logic 118B to detect a duration of the sound and to interpret the duration of the sound as an indication of how and/or whether pairing of the devices should proceed. The logic 118B to detect sound duration may include logic to interpret sound duration information for authentication and/or authorization purposes.

The system may include and/or involve logic 118B to detect multiple sounds and to interpret the multiple sounds as an indication of how and/or whether pairing of the devices should proceed. The logic 118B to detect multiple sounds may include logic to interpret multiple sound information for authentication and/or authorization purposes.

The system may include and/or involve logic 118B to detect an intensity of sound and to interpret the intensity of sound as an indication of how and/or whether pairing of the devices should proceed. The logic 118B to detect sound intensity information may include logic to interpret sound intensity information for authentication and/or authorization purposes. The logic to detect an intensity of sound and to interpret the intensity of sound as an indication of how and/or whether pairing of the devices should proceed may include and/or involve logic to detect at least one of an average volume, a peak volume, or a volume gradient.

Other Devices

The system may include and/or involve logic 118B to communicate with at least one device 122B or 124B different than the devices 102B and 104B to be paired, to obtain information needed to effect pairing. The at least one different device 122B or 124B may include and/or involve at least one of a proximate desktop, a laptop, or a handheld computing device. A device or devices 122B and 124B remote from both of the pairing devices 102B and 104B may also be included or involved in the obtaining of information needed to effect pairing. The other device or devices 122B and 124B may be accessed wirelessly, or using wired communications. The other device or devices 122B and 124B may be accessed using a network such as an intranet or the Internet.

User Input

The system may include and/or involve logic 118B to await user input as a result of the pairing sound. The logic 118B to await user input as a result of the pairing sound may include and/or involve logic to await authentication information for the user. It may be advantageous, in certain implementations, for the logic 118B to await user input to include and/or involve logic to await at least one of input from a keypad, a voice input, a touch screen, or a biometric input.

Discontinuing Pairing

The system may include and/or involve logic 118B to terminate the pairing of the devices 102B and 104B as a result of the same or different sound or sounds. Logic 118B to terminate the pairing of two devices 102B and 104B may include logic to terminate the effectuation of pairing while pairing (i.e., to abort a pairing which is in progress). Logic 118B to terminate the pairing of two devices 102B and 104B may include logic to terminate the pairing of two paired devices. Logic 118B to terminate pairing may include logic to use authentication and/or authorization information in making the determination to terminate pairing.

Figure 2B:
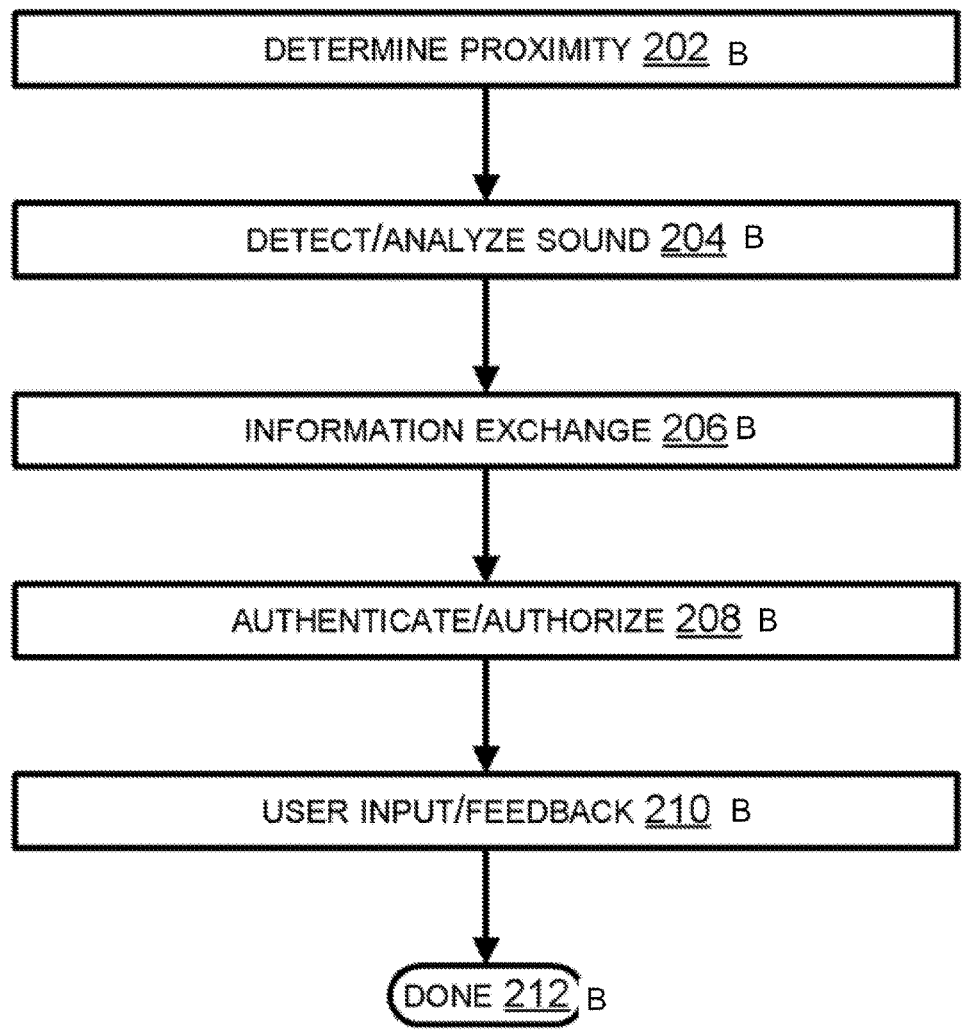
FIG. 2B is a flow chart of an embodiment of a device pairing method.
Figure 3:
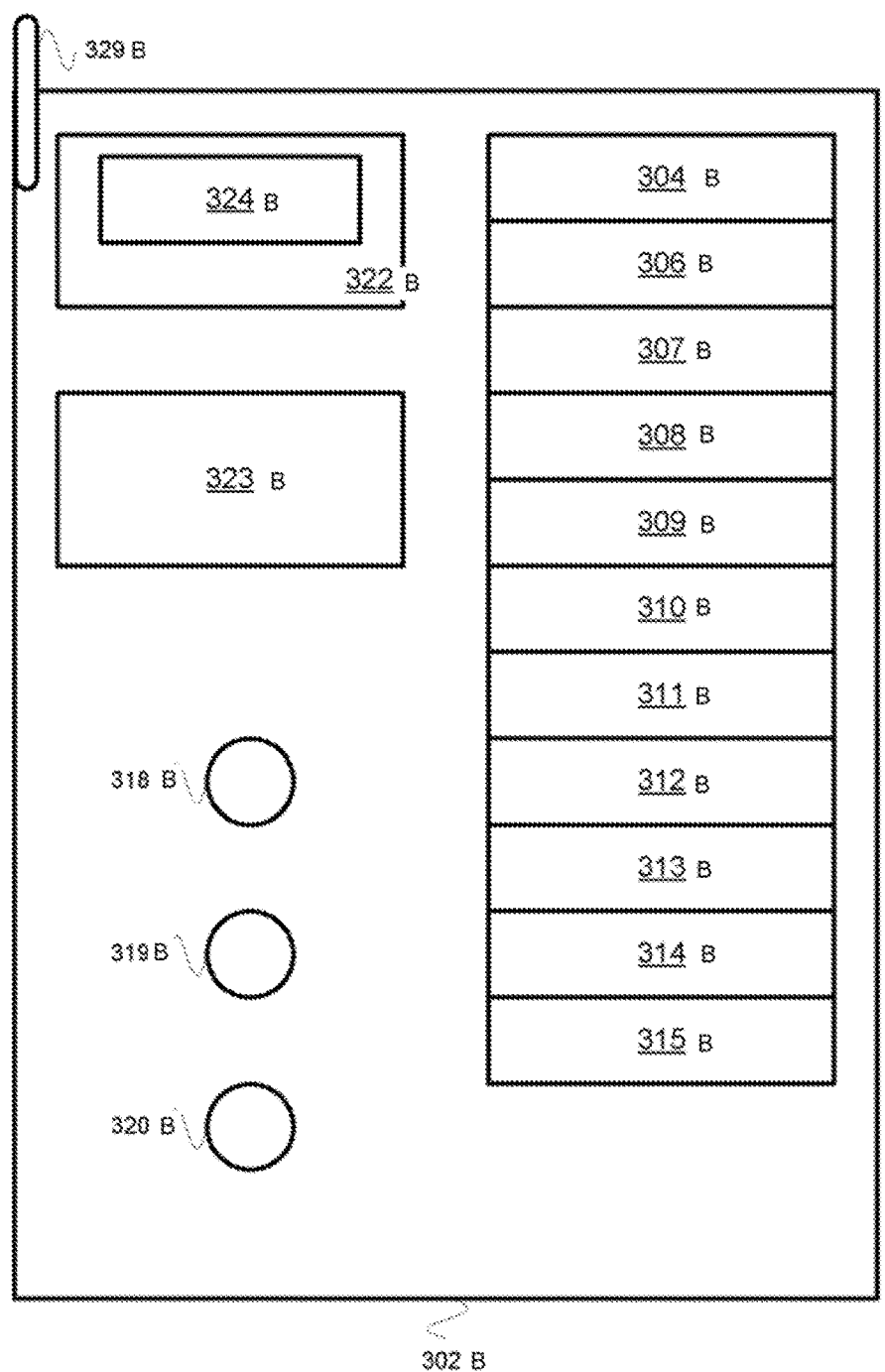

Overview of FIG. 2B

FIG. 2B is a flow chart of an embodiment of a device pairing method. At 202B, the devices are recognized as proximate. This may take place, for example, in situations where the devices communicate wirelessly prior to recognition of the device pairing sound.

At 204B, one or both devices detect the device pairing sound. Information conveyed by the sound, possibly including information about the nature of the sound, may be analyzed.

At 206B, information is exchanged between the two devices to effect pairing. As was previously noted, some or possibly all of this information may have been exchanged earlier in situations where the devices were communicating with each other prior to recognition of the pairing sound.

At 208B, information obtained prior to, during, or after the sound is applied to authenticate and/or authorize the pairing of the devices.

At 210B, feedback is provided to the user and user input obtained. Feedback and user input may occur as a part of the authentication and authorization process 208B, or for other reasons.

At 212B, the pairing effectuation process is complete.

Pairing Response to Sound

The method may include and/or involve receiving at least one sound, and pairing at least two devices as a result of the at least one sound. Pairing at least two devices as a result of the at least one sound may include and/or involve recognizing from the sound an identification of at least one of the devices. Pairing at least two devices may include and/or involve extracting authentication information from the sound. Pairing may include and/or involve identifying at least one purpose, feature, attribute, and/or function from the sound, such as identifying when at least one of the devices was purchased, identifying a status of at least one device, identifying an existing relationship between devices, identifying at least one device pairing history, identifying a manufacturer of at least one device, identifying a place of manufacture for at least one device, identifying a year of manufacture or version for at least one device, identifying a location of at least one device, and so on.

Pairing may include and/or involve comparing information of the sound with a biometric voice print, e.g. analyzing voice information of the at least one sound. Analyzing voice information of the at least one sound may include and/or involve identifying words and/or phrases from the voice information, and/or involve identifying, from the voice information, an individual that is the source of the voice information.

The pairing may involve identifying a type or types of the sound and determining an extent of pairing of the devices at least in part according to the type or types of the sound. A level and/or variation of at least one of volume, pitch, or tone of the sound may be determined, and at least one of the devices to pair, and/or an extent of pairing, may be selected accordingly. The type or types of sound may be identified, for example, as a whistle, a click, a clap, a knock, a snap, a ring, or a tone.

The devices may be paired to an extent determined by qualities and/or circumstances of the sound or sounds. Qualities and/or circumstances of the sound or sounds may determine which functions and/or features of one or both devices, or the combination thereof, are enabled for pairing. In certain implementations, the devices may be paired to an extent determined by qualities and/or circumstances of the sound or sounds, such as authorizing that a person or persons using one or both devices is authorized to do so, and/or to what extent.

Status/Progress Indications

One or more audible and/or visual and/or tactile indications may be provided on the progress and/or results of pairing of the devices. Providing one or more indications on the progress and/or results of pairing of the devices may include and/or involve presenting pairing options to a user of the devices, which may involve presenting at least one of a visual menu or voice prompts. Pairing options may include options relevant to the way the pairing is accomplished, presenting options for parameters of the pairing, or presenting options for one or more tasks and/or function served by the pairing. Parameters of the pairing may include options for pairing duration, location constraints, or conditions for terminating pairing.

An indication may be provided to a user to provide input to the pairing process. The user may be prompted to provide at least one of a password, a spoken input, a selection of an option, a biometric input, or information from a card and/or memory device, among other things.

It may be advantageous, in certain implementations, to provide one or more lights, tones, vibrations, sounds, or display indications to a user or users of the device(s). Such indications may indicate the progress and/or results of pairing, such as whether pairing was successful, unsuccessful due to insufficient available information, available, or in process.

Discontinuing Pairing

Pairing of the at least two devices may be discontinued under certain circumstances. Pairing of the at least two devices may be discontinued as a result of completion of a task, such as completion of placing a call, transferring a file, sending a message, or performing a backup.

Discontinuing pairing of the at least two devices may include and/or involve discontinuing pairing when the at least two devices are no longer proximate with one another.

Discontinuing pairing of the at least two devices may include and/or involve discontinuing pairing if an amount of authorized pairing time lapses.

Discontinuing pairing of the at least two devices may also or alternatively include and/or involve discontinuing pairing due to a user selection to discontinue pairing, and/or as a result of detecting a same or different sound or sounds that enabled pairing to begin with.

Retaining Pairing Information

Information about the pairing of the at least two devices may be retained and later applied to pair the devices.

The method may include and/or involve applying the retained information to resume pairing of the at least two devices, after pairing of the at least two devices is discontinued and/or interrupted. Pairing of the at least two devices may be resumed once the devices are once again in proximity with one another, and/or once the at least two devices are once again in communication with one another.

Proximity

Proximity between the devices may be detected. At least one sound, in conjunction with proximity between the devices, may provide an indication that pairing of the devices should be attempted.

Increasing proximity between the devices may be detected. At least one sound, in conjunction with recently detected increasing proximity between the devices, may provide an indication that pairing of the devices should be attempted.

The devices may wirelessly exchange information needed for pairing, upon approaching or becoming proximate with one another, but prior to receiving at least one sound.

Detecting the at least one sound may provide an indication that the exchanged information should be applied to complete the pairing process.

Authentication and Authorization

The sound may provide an indication that the devices should exchange at least some of authentication, authorization, or compatibility information needed for pairing. By exchanging such information, the devices may establish a secure channel for communication of information.

Motion and Other Factors Affecting Pairing

Various other factors may also influence the pairing process, such as relative motion between two or more of the devices. Relative motion between the devices may include rotation, angle of approach, or relative lateral motion between the devices. The relative motion information may be applied as an indication of whether and/or to what extent pairing of the devices may take place. The relative motion information may be applied for authentication and/or authorization purposes.

The duration of the sound or sounds may be detected and applied as an indication of to what extent and/or whether pairing of the devices should take place, possibly for authentication and/or authorization purposes. Multiple sounds may be detected and applied as an indication of to what extent and/or whether pairing of the devices should proceed, possibly for authentication and/or authorization purposes.

The intensity of sound may be detected and applied as an indication of to what extent and/or whether pairing of the devices should proceed, and/or for authentication and/or authorization purposes. This may involve detecting at least one of an average volume, a peak volume, or a volume gradient of the sound or sounds.

Other Devices

Communicating may take place with at least one device different than the devices to pair, to obtain information needed to effect pairing of the devices. The at least one different device may include and/or involve at least one of a proximate desktop, a laptop, or a handheld computing device. The at least one different device may be located remotely from both of the devices to pair.

User Input

User input may be awaited as a result of the sound or sounds. Awaiting user input as may include and/or involve awaiting authentication information for the user, from at least one of input from a keypad, voice input, touch screen, or biometric input.

User input may include and/or involve awaiting a user selection from among pairing options. A user selection may be received from among the presented pairing options, and pairing may proceed according to the user selection.

Overview of FIG. 3B

FIG. 3B is a block diagram of an embodiment of a device to accommodate pairing. A device 302B includes a display 322B that may be used, among other things, to provide a menu 324B of pairing options. The device 302B includes a microphone 318B which may be used to detect sound (such as tapping) and/or voice input. The device 302B includes a keypad 323B. The device 302B includes two parts which may be used to provide user feedback, a speaker 319B and a LED 320B. The device 302B also includes various logic elements which may operate to effect device pairing. Of course, the device 302B may include additional elements that are not shown here and which may be superfluous to this discussion.

Device logic includes pairing process management logic 304B, wireless communication logic 306B, proximity and motion logic 307B, user input logic 308B, sound/speech processing logic 309B, biometric processing logic 310B, third device interface logic 311B to interact with a device or devices other that the two pairing devices, authentication logic 312B, authorization logic 313B, feedback logic 314B, and logic 315B to discontinue pairing, retain pairing information, and/or reestablish/resume pairing under certain circumstances.

An antenna 329B enables the device 302B to engage in wireless communication.

Not all embodiments of the device 302B will include all of the illustrated logic. For example, if a device 302B had no biometric input it would not need and probably would not have biometric processing logic 310B. If a device 302B did not need to involve and communicate with a third device (other than its pairing partner) to effect pairing, it may not have third device interface logic 311B. And so on.

The device 102B may include and/or involve a sound sensor (the microphone 318B), and logic to enable the device to ascertain and/or identify pairing information from signals received via the sound sensor, such as an identification of at least one other device with which to pair, a person effecting pairing of the device with the at least one other device, an extent to which to pair with the at least one other device, and so on.

The logic 304B and 306B-315B may be applied to effect the operation of the device in accordance with actions previously described herein to effect pairing with at least one other device.

Figure 1C:
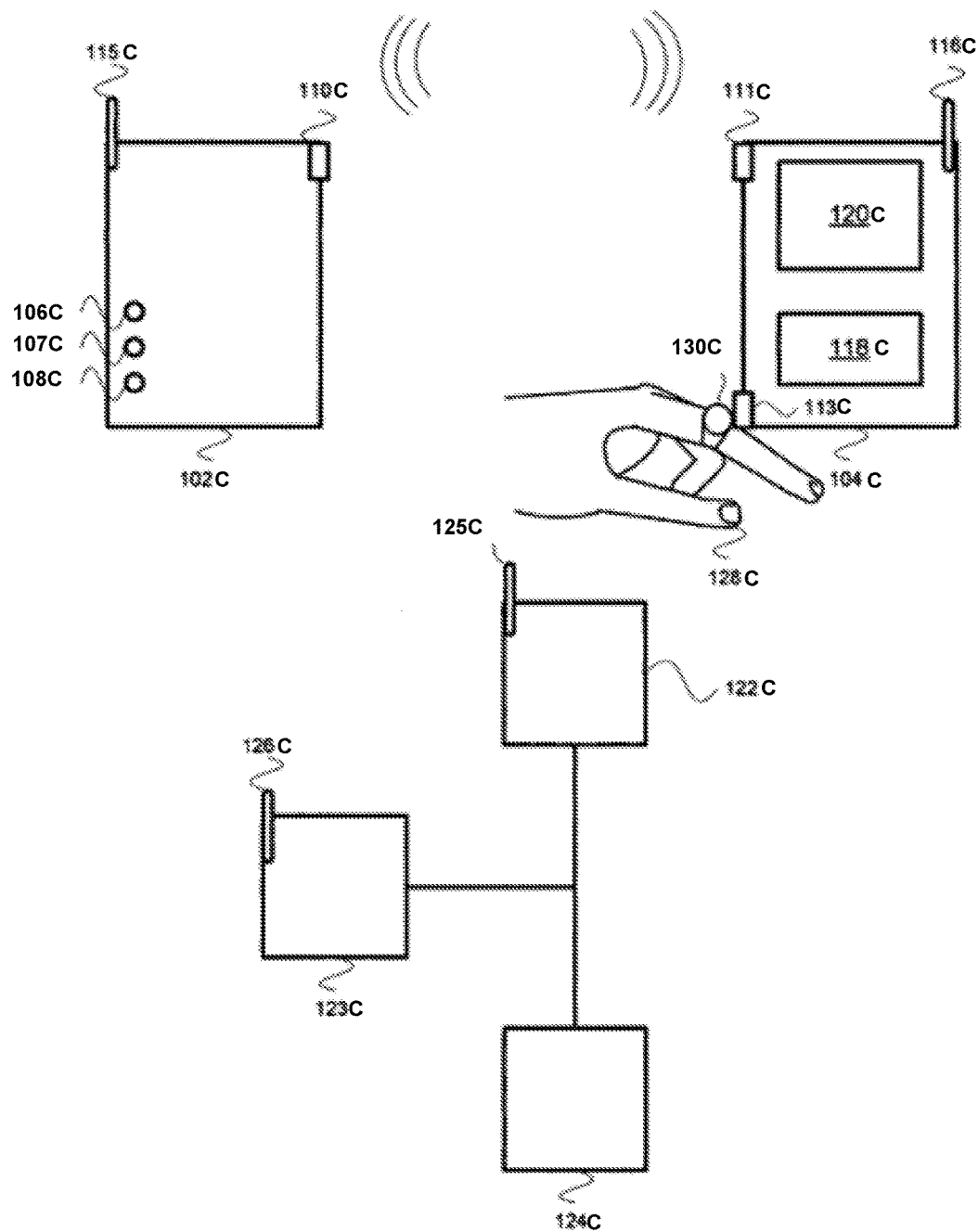
FIG. 1C is a block diagram of an embodiment of a device pairing arrangement.

Overview of FIG. 1C

FIG. 1C is a block diagram of an embodiment of a device pairing system/arrangement. The system/arrangement may include and/or involve a first device 130C, a second device 102C, and a third device 104C, and logic 118C to facilitate pairing between the second device 102C and the third device 104C as a result of contact between the first device 130C and at least one of the second 102C and third 104C devices.

The first device 130C is any device which, when it touches at least one of two other devices 102C and 104C, may initiate pairing between the two other devices 102C and 104C. In some cases, device 130C will contain a contact area (not shown in FIG. 1C) which must be used as the touching surface in order to initiate pairing. In some cases, device 130C will possess a wireless communication capability, which may work in conjunction with its touching to effect pairing. In some implementations, the device 130C may be a ring worn on the hand 128C of a user of the devices 102C 104C.

The second device 102C includes a microphone 106C, a speaker 107C, a LED 108C, an antenna 115C and a contact area 110C. There may be more than one contact area 110C. The contact area 110C may be incorporated in a complex device part such as a touch sensitive screen incorporating other functions such as display. The contact area 110C may be any part of device 102C which, when touched by another device 130C, is recognized as touched by logic within device 102C.

The microphone 106C may be used for sound input to the device 102C and may not be present in all embodiments. Sound input may include sounds such as tapping or voice input such as whistling or speaking Voice input may be processed into words and/or phrases, and/or it may be processed as a sound pattern (e.g. a voice print). Voice input may be used, at least in part, as a biometric for individual identification.

The speaker 107C and LED 108C may be used for audible and visual information conveyed from the device 102C, such as requests that an individual perform an action or feedback on the condition of some operation the device may have performed or be performing. The speaker 107C and/or LED 108C and/or other means for feedback may not be present in all embodiments. Other means of communicating information such as a buzzer, display, or tactile surface may be present additionally or instead of the speaker 107C and/or LED 108C.

User feedback may be communicated to the user in various ways, such as those described above using speakers/LEDs/other outputs of the device, or via some other proximate device.

The device 102C may include an antenna 115C for wireless communication with other devices. The device 102C may include other features such as a scanner, a camera, or cellular telephone capabilities.

Examples of devices 102C and 104C include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A third device 104C includes contact areas 111C and 113C, an antenna 116C, logic 118C, and a display 120C. The device 104C may have a single contact area, or, as shown, two or more contact areas 111C, 113C. The device 104C need not include a display 120C, although a display may prove useful for certain aspects of the pairing process. The display 120C could be part of the first device 102C, or some other device such as 122C and/or 124C.

The logic 118C operates to effect various techniques and acts for pairing the second device 102C and the third device 104C. The logic 118C may exist on the first device 130C, the second device 102C, the third device 104C, or in part on two or all of the devices 130C, 102C, 104C. The logic 118C may exist, at least in part, on other devices, such as devices 122C, and/or 124C. The devices 122C and 124C may comprise a proximate laptop, desktop, or other computing device, and/or supporting network and communication equipment. The logic 118C may exist, at least in part, remotely from the pairing devices 102C and 104C, such as on a remote device reachable over an intranet or the Internet.

The display 120C may be used to provide information to an individual or individuals such as the person or persons causing the contact between the two devices 130C and 102C and/or 104C. In some embodiments, other means of communicating information such as an LED, buzzer, or speaker may be present additionally or instead of the display 120C on either or both of devices 102C and 104C, and/or on a proximate device such as 122C or 124C.

The antenna 116C enables wireless communication between the device 104C and other devices. The device 104C may include other features not described herein. The device 104C may be, among other things, a laptop, desktop, tower, or server computer. The device 104C may be attached via wireless or wired communications to an Intranet and/or the Internet and may provide, for example, a sophisticated application such as a medical patient monitoring station or machine control application for a machine tool.

At least one of devices 130C, 102C, and 104C may be movable or mobile, at least in part, thus enabling the touching that initiates pairing. In some cases, the device performing the touching 130C, 102C, and/or 104C may be moving during the period of touching. For example, the first device 130C may be moved horizontally across a touching surface 111C or 113C of device 104C. In this example, the relative motion of devices 130C and 104C with respect to each other may convey information in addition to the fact of touching. This extra information may be needed to enable pairing. The extra information could, for example, facilitate identification of the pairing partner, or assist in authentication of the user. To assist in authentication, for example, the user could be required to provide a password and move the device 130C in a particular manner when contacting device 104C.

The device pairing arrangement may also include additional devices, such as device 122C, 123C, and 124C. Various data, logic, resources, and capabilities, including information and logic, to accomplish the pairing process may be provided by these other devices 122C, 123C, and 124C. The devices 102C and/or 104C to pair may communicate with one or more of the devices 122C-124C using wireless or other types of communication during the pairing process.

By way of example, one or more of the devices 122C 123C may provide a network access point for a wired and/or wireless network. Thus, for example, the devices 122C 123C may include antennae 125C 126C. The antennae 125C 126C may enable one or both of devices 102C 104C to communicate via a network with other devices, such as device 124C, located remotely from devices 102C, 104C. Such communication may enable devices 102C and/or 104C to receive additional information from device 124C that may assist in the pairing process. Some of the logic 118C used to effectuate pairing including even in some cases the decision to pair may be embodied in a remote device or devices 124C.

The logic 118C to facilitate pairing between the second device 102C and the third device 104C as a result of contact between the first device 130C and at least one of the second 102C and third 104C devices may include and/or involve logic in the first device 130C to receive pairing information from the second device 102C as a result of contact with the second device 102C, and to communicate the pairing information to the third device 104C as a result of contact with the third device 104C. There may be various manners of implementing the logic 118C to facilitate pairing between the second 102C and the third 104C device, including but not limited to logic to communicate pairing information to the second device 102C as a result of contact with the second device 102C, and to communicate the pairing information to the third device 104C as a result of contact with the third device 104C.

In some implementations the logic 118C to facilitate pairing between the second device and the third device may include and/or involve logic for the first device 130C to pick up pairing information from the second device 102C as a result of contact with the second device 102C, and to carry the pairing information and then to communicate the pairing information to the third device 104C as a result of contact with the third device 104C.

When information is communicated between the first device 130C and either or both of the second and third devices 102C, 104C, the means of communication may be either through the point of contact 110C, 111C, and/or 113C of the touching devices 130C and 102C or 104C, wirelessly, or in some other manner.

It may be advantageous in certain implementations for the logic 118C to facilitate pairing between the second 102C and third 104C devices as a result of contact between the first device 130C and at least one of the second 102C and third 104C devices to include and/or involve logic to wirelessly communicate information received from either or both of the second device 102C and third device 104C to a fourth device 122C, 124C in order to facilitate pairing. The logic 118C to wirelessly communicate pairing information received from either or both of the second device 102C and third device 104C to a fourth device 122C, 124C in order to facilitate pairing of the second device 102C and the third device 104C may include and/or involve logic to communicate user and/or device authentication information to the fourth device 122C or 124C.

The logic 118C to communicate pairing information to the second device 102C as a result of contact with the second device 102C, and to communicate the pairing information to the third device 104C as a result of contact with the third device 104C may include and/or involve logic to communicate the pairing information via one or more points of contact, and/or logic to communicate the pairing information using short-range wireless technology. This may include and/or involve logic to communicate the pairing information after a time or times of contact with the second device and/or the third device has ended. This could also include and/or involve logic to wirelessly communicate pairing information prior to contact with the second device and/or the third device, and to communicate additional pairing information upon contact with the second device and/or third device, the additional pairing information employed by the second device and/or third device to pair.

The pairing information may be communicated only during a time or times of contact with the second device and/or the third device, or information stored by the first device may be communicated prior to contact with either of the second device or the third device.

The additional information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information.

Pairing

The device pairing arrangement includes a first device 130C, a second device 102C, a third device 104C and logic 118C to effect pairing of the first and second devices upon detection of physical contact between the first device 130C and at least one of the second 102C and/or third 104C devices. Pairing involves cooperative operation of the two devices 102C, 104C, generally involving communication between the devices 102C, 104C. Effecting pairing may involve actions such as identifying either one or both devices 102C, 104C or one or more device characteristics, features, and/or functions; identifying (authenticating) the person or some characteristic of the person using the devices 102C, 104C; authorizing the pairing and/or to what extent; and configuring one or both of the devices 102C, 104C with settings and information to facilitate paired operation.

Pairing involves communication of information, between the first and second devices 130C and 102C, and/or the first and third devices 130C and 104C, and/or the second and third devices 102C and 104C, and/or between the second and/or third devices 102C and/or 104C and other devices 122C, 124C. Information communicated between the devices as mentioned just above may be communicated in various ways, including using the contact points 110C, 111C, and/or 113C, wirelessly, or using some wired communication method, or combinations thereof.

Information to facilitate pairing may be communicated between the two devices 102C, 104C, or almost entirely from one device to another. For example, device 102C may consist of a medallion or ring containing stored value (similar in concept to a prepaid phone card) which is used primarily to accomplish a commercial transaction. When the medallion 102C is touched to device 130C, information about the stored value may be passed to device 130C. Device 130C may then communicate this information to device 104C either by touching it or using short-range wireless communication. Device 104C may then perform many, most, or all actions necessary to establish pairing, such as identifying the commercial transaction and deciding if it may be accomplished. (The user may be interacting through a touch screen or keyboard or verbally with device 104C during this period.). Device 104C may then initiate pairing. While the two devices are paired, device 104C may pass information about the commercial transaction back to device 130C or device 102C.

The information exchanged, and the direction of such exchange, may vary according to the implementation. For example, after being touched by device 130C, device 102C might communicate information about a desired common purpose to the device 104C using wireless communications, along with information about its 102C capabilities. The device 104C may determine if it is suitable to provide the common purpose when paired with device 102C, and notify device 102C of this decision. The device 102C may then pass information authenticating the person using it to the device 104C. And so on.

Sometimes, effectuation of pairing may at times require an individual to provide an input to one or any of the devices 130C,102C, 104C, or to perform an action. For example, the user of the device 102C and/or 104C may have to enter a password or provide a biometric input before pairing will be accomplished. The user may have to speak his or her name, to be validated biometrically. The individual may have to present a finger to a scanner for biometric fingerprint identification.

Effectuation of pairing may in some instances involve access to information and processing capability external to the two pairing devices 102C, 104C. For example, if an individual provides a biometric input to device 102C, it might use the antenna 115C to communicate the fingerprint information wirelessly to device 123C via the antenna 126C. Device 123C might then provide the fingerprint information, via a network, to device 124C for authentication and authorization of the user's permission to pair device 104C with device 102C.

The information needed to effect pairing may be passed using a variety of physical medium. Some or all of the information needed to effect pairing may be communicated through the contact point 110C and 111C or 113C of the two devices 102C, 104C. Some or all of the information needed to effect pairing may be communicated using a wireless capability of either or both devices 102C, 104C. Either or both of devices 102C, 104C may implement wired or wireless network connectivity, so that some or all of the information needed to effect pairing may be communicated to one or both devices via a communication network.

One or both devices 102C, 104C may be paired with some other device (not shown) at the time at least one of the devices 102C, 104C are touched by device 130C. Depending on the circumstances, the original pairing or pairings may be terminated, and a pairing between the devices 102C, 104C effected. Or, a second pairing may occur between devices 102C, 104C and one or more original pairings may continue. In some circumstances, when the at least one of the devices 102C, 104C are touched by a device 130C, pairing may be rejected if one or both devices 102C, 104C are already paired.

Authentication/Authorization

The logic 118C to effect pairing may include logic to authenticate and/or authorize pairing between the devices 102C, 104C. Authenticating and/or authorizing the pairing may include identifying one or both devices 102C, 104C and/or identifying at least one device characteristic for one or both devices 102C, 104C, such as determining whether the devices 102C, 104C are suitable for use for the purpose required and that they 102C, 104C are compatible for pairing to accomplish that purpose. For example, pairing may have been initiated with a goal of accomplishing a commercial transaction requiring secure communication. Both devices 102C, 104C may have a device characteristic of supporting one or more varieties of encryption. However, they may support only DES encryption in common. The recognition that the devices are compatible and that DES encryption should be employed may occur as a result of the information exchanged during the pairing effectuation process.

Authenticating and/or authorizing pairing may include identifying a user of one or both of the devices) 102C, 104C and/or to identify at least one characteristic of the user. For example, the user may be a member of a group, department, or organization, such as a computer network administrator with broad access privileges.

The system may include logic 118C to authorize an extent of pairing of the devices 102C 104C. By extent of pairing it is meant authorization of which functions and how extensively certain functions can be performed while the devices are paired. Authorization of an extent of pairing may be based, at least in part, on the identity or at least one characteristic of the user. Authorization of an extent of pairing may be based, at least in part, on the identity of the devices 102C, 104C or device characteristics or state.

Other factors may be taken into consideration when authorizing an extent of pairing to allow. Authorization of an extent of pairing may be based, at least in part, on time of day or physical location. Authorization of an extent of pairing may be based, at least in part, on the manner of touching and/or point of physical contact 110C, 111C, 113C between the two devices 102C, 104C.

Authorization may be provided for a greater number and/or different functions and/or features of one or both devices 102C, 104C than would be available if the devices were paired without physical contact.

A secure channel may be established between the devices for communication of information, particularly authentication/authorization information but in general any information that the devices exchange that should not be made available to other parties/devices that may be listening in.

Retaining Information

The system may include and/or involve logic 118C to retain information about the pairing of the second device 102C and the third device 104C, after pairing of the second device 102C and the third device 104C is complete. The retained information may be applied to resume pairing of the second device 102C and the third device 104C, after pairing of the second device 102C and the third device 104C is interrupted.

The retained information may be applied to resume pairing of the second device 102C and the third device 104C once the second device 102C and the third device 104C are once again in proximity. The retained information may be applied to resume pairing once the first device 130C is once again in proximity with the second device 102C and/or the third device 104C. The logic 118C to apply the retained information to resume pairing after pairing is interrupted may include and/or involve logic to apply the retained information to resume pairing of the second device 102C and the third device 104C once the first device 130C is once again in contact or once again has been in contact with the second device 102C and/or the third device 104C.

Discontinue Pairing

The system may include and/or involve logic 118C to discontinue pairing of the second device 102C and the third device 104C. For example, pairing may be discontinued when the second device 102C and/or third device 104C are no longer proximate with the first device 130C and/or with one another, when an amount of authorized user time lapses, or based at least in part on some other factor, such as time of day or location.

Manner of Contact

The system may include and/or involve logic 118C to detect a manner of contact between the first device 130C and the second device 102C and/or the third device 104C. Relative motion may be detected between the first device 130C and the second device 102C and/or the third device 104C at a point or points of contact 110C, 111C, and/or 113C.

The duration of contact may be detected between the first device 130C and the second device 102C and/or the third device 104C, and to determine from the duration of contact an indication of how and/or whether pairing should be accomplished.

Multiple instances of contact may be detected between the first device 130C and the second device 102C and/or the third device 104C, and interpreted as an indication of how and/or whether pairing of should be accomplished.

The intensity of contact may be detected between the first device 130C and the second device 102C and/or the third device 104C, and interpreted as an indication of how and/or whether pairing should be accomplished. At least one of an average contact force, a peak contact force, or force gradient may be detected.

User Input

The system may include and/or involve logic 118C to await user input as a result of contact between the first device 130C and the second device 102C and/or third device 104C. As a result of contact, the system may await at least one of input from a keypad, one or more buttons, a voice input, a touch screen, or a biometric input. The user input may include and/or involve authentication information for the user.

Feedback

One or more audible and/or visual and/or tactile indications may be provided indicating the progress and/or results of pairing of the second device 102C and the third device 104C. For example, one of one or more lights, tones, vibrations, sounds, or display indications may be provided. The indications may provide feedback on whether or not the pairing was successful, unsuccessful due to insufficient available information or for other reasons, to indicate that pairing between the devices is available, or to indicate that pairing is in process.

A user may be prompted to provide input to the pairing process. For example, the user may be prompted for a password, spoken input, biometric input, or information from a card and/or memory device. The system may present a menu of pairing options for the user to select from.

Interaction with Other Devices

The logic 118C may operate to communicate wirelessly with at least one device 122C, 124C different than the two devices 102C, 104C to obtain information needed to effect pairing between the devices 102C, 104C. The other device or devices 122C, 124C may be physically near (same or close room or same building) or remotely located with respect to the location of the pairing devices 102C, 104C. The other device or devices 122C, 124C may be accessed wirelessly, or via a network such as an intranet or the Internet.

Figure 2C:
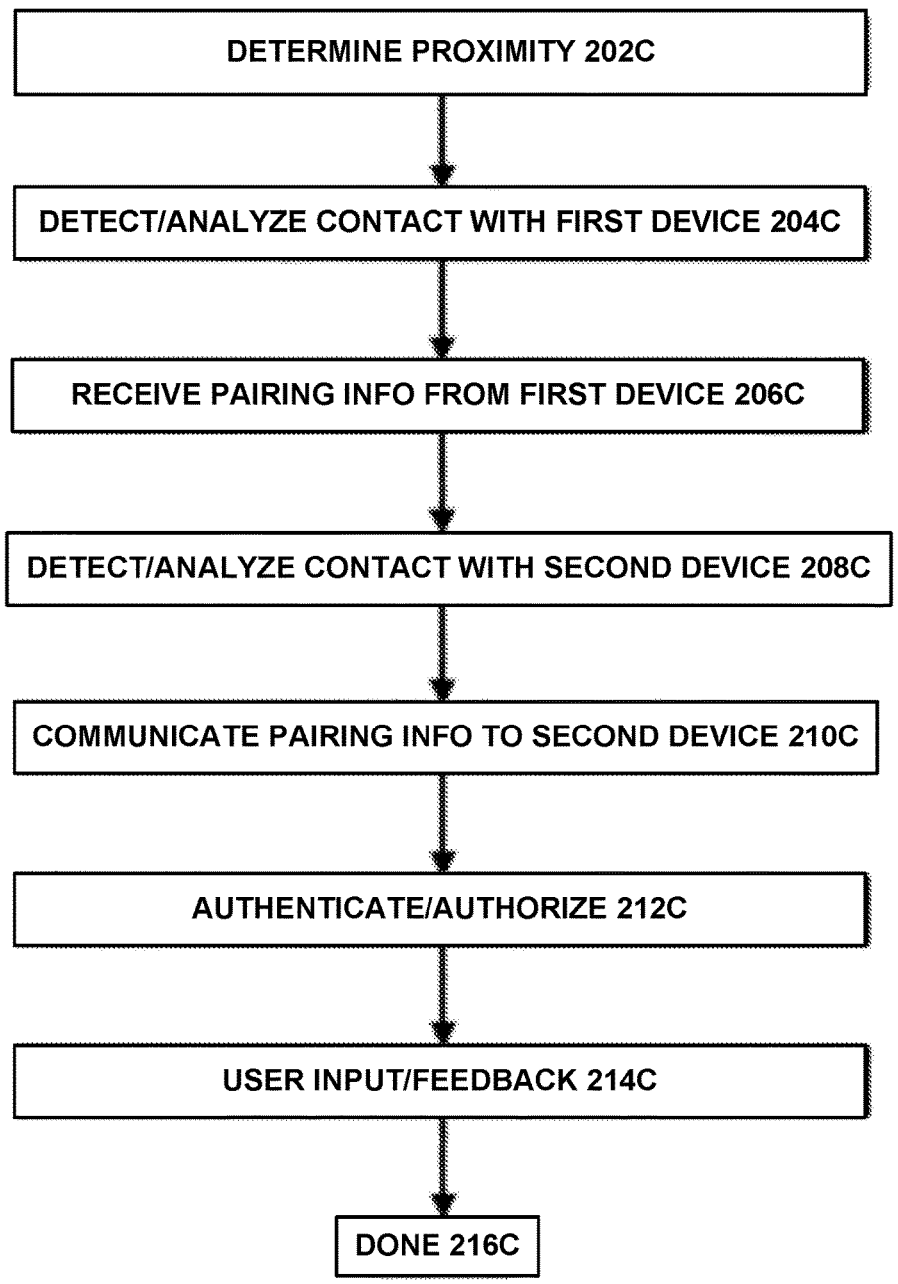
FIG. 2C is a flow chart of an embodiment of a device pairing technique.

Overview of FIG. 2C

FIG. 2C is a flow chart of an embodiment of a device pairing method/technique. At 202C, proximity is recognized between the first device and the second or third device. Alternatively or additionally, if one of the second or third devices is being moved, proximity may be recognized between the second and third devices (the two devices which are to be paired). Detection of proximity prior to any contact between the first device and the second and/or third device may result in communication between any two of the three devices or all three devices occur prior to contact.

At 204C, contact is detected between the first and third devices. At 206C, pairing information is communicated from the first device to the third device. Pairing information may be communicated wirelessly, via the contact point, or via another means.

At 208C, the second device recognizes that it has been touched by the first device and analyzes information that it receives as a result of the contact.

At 210C, pairing information is communicated either from the first device or from the third device to the second device.

At 212C, either the first, second, or third device, or some other device use the information obtained to authenticate and/or authorize the desired pairing.

At 214C, additional information is obtained from the user to complete the pairing process. Feedback is provided to the user on the status of pairing.

At 216C, pairing concludes. The pairing has either now occurred or been rejected based on the processing which has occurred.

Thus, the first device is applied to facilitate pairing between a second device and a third device by touching the first device to the second device, and then touching the first device to the third device, with a result that the second device and third device are thus enabled to pair with one another.

Pairing in this fashion may result in access to a greater number and/or different functions of one or both devices than would be available if the devices were paired without physical contact with the intermediate device. Pairing may result in access to functions and/or features of one or both devices the extent of which varies according to the manner and/or point of physical contact between the devices.

The pairing process may be interrupted if the first device loses contact with the second or third device. The devices may exchange pairing information prior to, during, only during, or after a time when one of the devices is in physical contact with the first device.

Pairing of the second device and the third device may be discontinued for various reasons. Pairing may be discontinued when the second device and third device are no longer proximate with one another, when the second device and/or third device are no longer proximate with the first device, due to an action of a user of the first and/or second devices, after an amount of authorized user time lapses, and/or based on an external event, such as the current time of day or current location of the second or third devices.

Information about the pairing of the second device and the third device may be retained by the first (intermediate) device, or by another device or devices of the system. The retained information may be applied to resume pairing of the second device and the third device, after pairing of the second device and the third device is discontinued and/or interrupted. For example, the retained information may be applied to resume pairing of the two devices once the two devices are once again in proximity with one another, once the first device is once again in contact with the second device and/or the third device, and/or once the first device is once again in proximity with the second device and/or the third device.

The manner of contact between the first device and the second device and/or the third device may influence the pairing process, as previously described. Detecting a manner of contact may include and/or involve detecting a point or points of contact between the first device and the second device and/or the third device, and interpreting the point or points of contact as an indication of how and/or whether pairing of the second device and the third device should be accomplished.

One or more audible and/or visual and/or tactile indications on the progress and/or results of pairing of the second device and the third device may be provided, as previously described. In some situations, this could include and/or involve providing at least one of one or more lights, tones, vibrations, sounds, or display indications.

The system may present at least one pairing options, from which one may be selected by user input. Pairing options may include and/or involve one or more of options relevant to the way the pairing is accomplished, options for parameters of the pairing, or options for one or more tasks and/or functions served by the pairing. Options for parameters of the pairing may include and/or involve presenting options for pairing duration, location constraints, or conditions for terminating pairing.

As previously described, the system may await user input as a result of contact between the first device and the second device and/or third device. The user input may include and/or involve input from a keypad, one or more buttons, a voice input, a touch screen, or a biometric input.

Figure 3C:
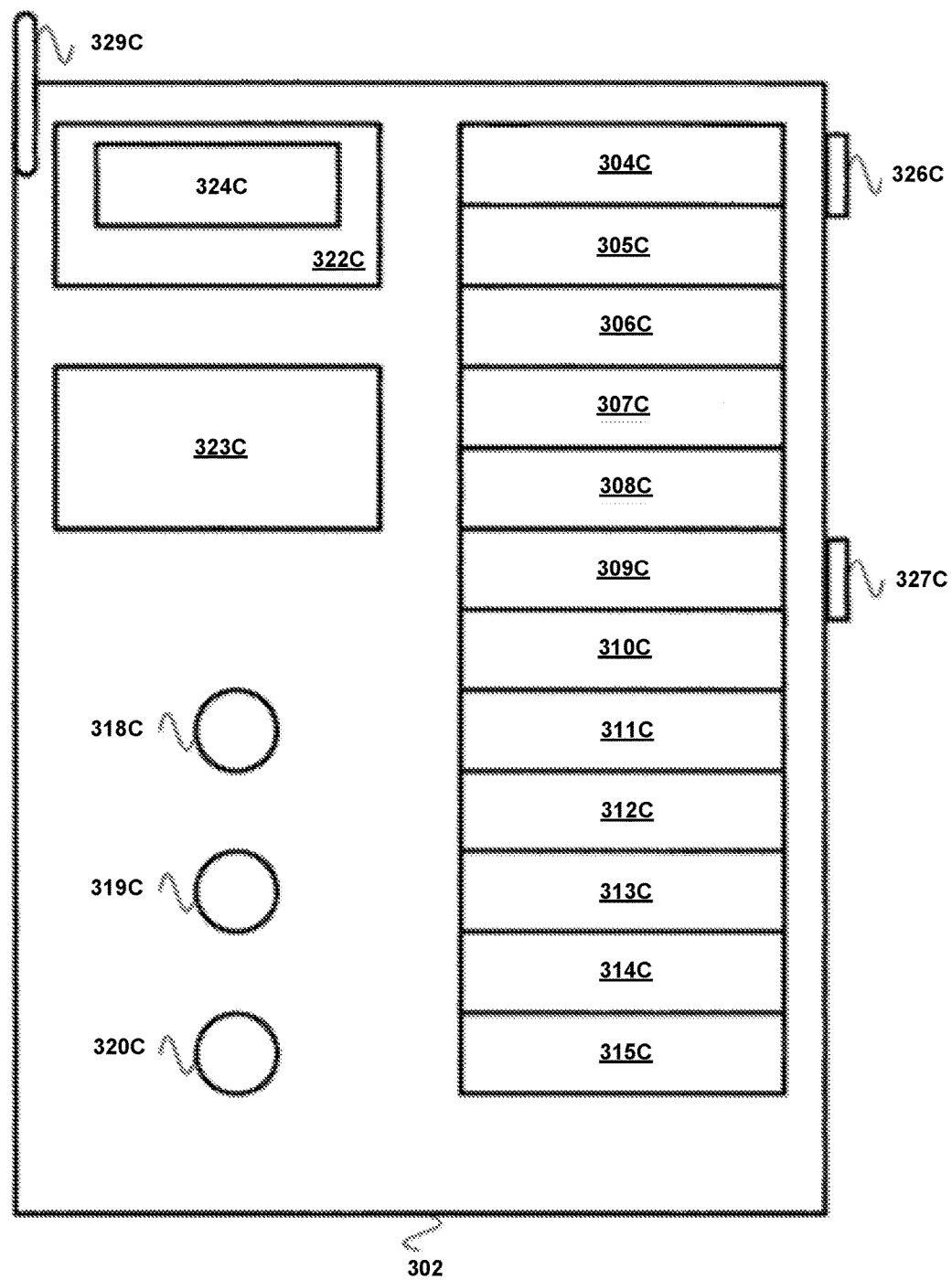
FIG. 3C is a block diagram of an embodiment of a pairing-capable device.

Overview of FIG. 3C

FIG. 3C is a block diagram of an embodiment of a pairing-capable device. The device 302C includes a display 322C that may be used, among other things, to provide a menu 324C of options. The device includes a microphone 318C which may be used to detect sound (such as tapping) and/or voice input. The device includes a keypad 323C. The device includes two parts which may be used to provide user feedback, a speaker 319C and a LED 320C. The device includes two contact sensors 326C and 327C. The device also includes various logic elements which may operate to effect device pairing. Of course, the device may include additional elements that are not shown here and which are superfluous to this discussion.

Logic of the device includes pairing process management logic 304C, contact processing logic 305C, wireless communication logic 306C, proximity and motion logic 307C, user input logic 308C, speech processing logic 309C, biometric processing logic 310C, logic 311C to interact with a device or devices other than the two pairing devices, authentication logic 312C, and authorization logic 313C. Device logic also includes feedback logic 314C and logic 315C to interrupt, resume, and end pairing and to retain pairing information.

An antenna 329C enables the device to engage in wireless communication.

Not all embodiments of the device 302C will include all of the illustrated logic. For example, if a device 302C did not have a speaker 319C or microphone 318C and used no sound inputs or outputs, it would not need and probably would not have speech processing logic 309C. If a device had no biometric input it would not need and probably would not have biometric processing logic 310C. And so on.

The device logic 304C-315C may be applied to facilitate pairing with at least one other device, in the manners described herein.

The device 302C may include feedback mechanisms (e.g. speaker 319C, LED 320C and feedback operation logic 314C) to provide one or more audible and/or visual and/or tactile indications on the progress and/or results of pairing, as described herein. For example, the logic 314C may provide at least one light, tone, vibration, sound, or display indication. The logic 314C may provide at least one menu 324C of pairing options, and/or an indication that a user should provide input to the pairing process.

The device 302C may include contact processing logic 305C to ascertain a manner in which contact occurs, and to interpret the manner of contact as an indication of how and/or whether pairing should proceed, for example in the manners previously described herein.

The device 302C may include logic 307C to detect proximity, and/or increasing proximity with the first device and/or device with which to pair, as described herein.

The device 302C may include logic 306C to enable the device to wirelessly exchange information with other devices, as described herein.

Figure 4C:
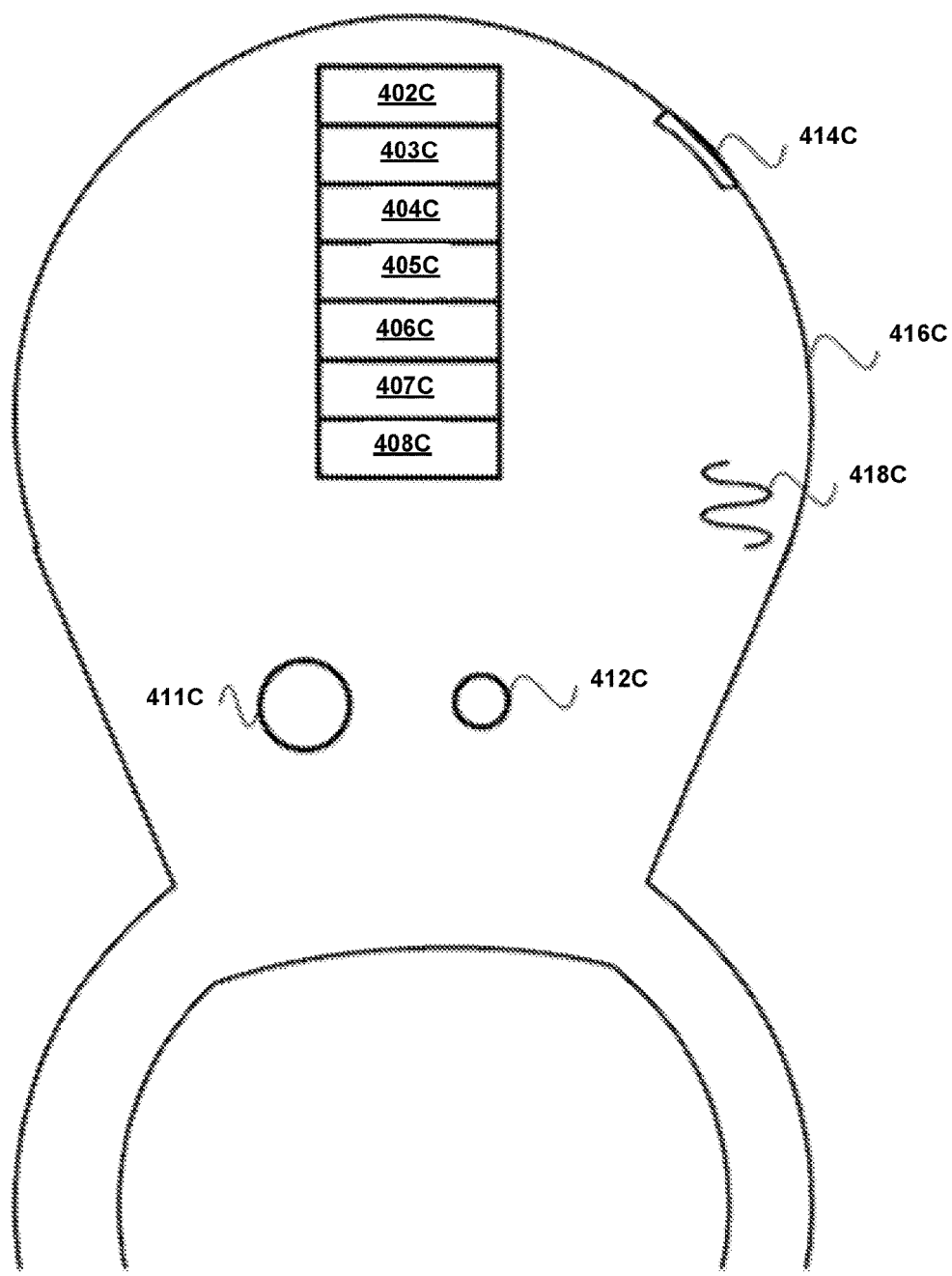
FIG. 4C is a block diagram of an embodiment of an intermediate device to facilitate pairing.

Overview of FIG. 4C

FIG. 4C is a block diagram of an embodiment of an intermediate device 416C, a.k.a. the intermediate device as referenced herein, which touches the second and/or third devices to facilitate pairing. The first device 416C includes a contact sensor 414C which includes all or part of the contact area used when touching another device. The device 416C includes an antenna 418C, used for wireless communication with other devices. The device 416C includes a sound generator 411C and light generator 412C, used, at least in part, to provide feedback on the progress and/or results of a pairing initiation.

The device 416C includes logic, including process control logic 402C, contact detection and analysis logic 403C, wireless communication logic 404C, proximity detection logic 405C, information exchange logic 406C, feedback and user input logic 407C, and memory 408C to hold logic and information.

The first device 416C may include and/or involve at least one contact sensor 414C, and logic 402C-406C to facilitate pairing between a second device and a third device as a result of contact between the contact sensor 414C and at least one of the second and third devices. The logic 402C-406C to facilitate pairing between a second device and a third device as a result of contact between the contact sensor 414C and at least one of the second and third devices may include and/or involve logic to receive pairing information from the second device as a result of contact with the second device, and to communicate the pairing information to the third device as a result of contact with the third device, and/or logic to communicate pairing information to the second device as a result of contact with the second device, and to communicate the pairing information to the third device as a result of contact with the third device.

This may include and/or involve logic 406C to pick up pairing information from the second device as a result of contact with the second device, and to carry the pairing information and to communicate the pairing information to the third device as a result of contact with the third device.

In some implementations the logic 402C-406C to facilitate pairing between a second device and a third device as a result of contact between the contact sensor 414 and at least one of the second and third devices may also or alternatively include and/or involve logic 404C and 406C to wirelessly communicate pairing information received from either or both of the second device and third device to a fourth device in order to facilitate pairing of the second device and the third device. In some situations, this could include and/or involve logic to detect a time interval between contact of the first device with the second device, and contact of the first device with the third device.

The logic 402C-406C to communicate pairing information to the second device as a result of contact with the second device and to communicate the pairing information to the third device as a result of contact with the third device may include and/or involve logic to communicate the pairing information via one or more points of contact 414C. It may be advantageous, in certain implementations, for the logic to communicate pairing information to the second device as a result of contact with the second device, and to communicate the pairing information to the third device as a result of contact with the third device to include and/or involve logic 404C to communicate the pairing information using short-range wireless technology.

The logic 402C-406C to communicate pairing information to the second device as a result of contact with the second device, and to communicate the pairing information to the third device as a result of contact with the third device may also or alternatively include and/or involve logic to communicate the pairing information during a time or times of contact with the second device and/or the third device. Alternatively or additionally, this logic may include logic to communicate information stored by the first device prior to contact with either of the second device or the third device. The logic 402C-406C to communicate pairing information to the second device as a result of contact with the second device, and to communicate the pairing information to the third device as a result of contact with the third device may also or alternatively include and/or involve logic to wirelessly communicate pairing information prior to contact with the second device and/or the third device, and to communicate additional pairing information upon contact with the second device and/or third device, the additional pairing information employed by the second device and/or third device to pair. One manner of implementing this may include and/or involve logic to communicate the pairing information during a time or times of contact with the second device and/or the third device. In some situations, the logic may operate to communicate the pairing information after a time or times of contact with the second device and/or the third device has ended.

The logic 402C-406C to wirelessly communicate pairing information received from either or both of the second device and third device to a fourth device in order to facilitate pairing of the second device and the third device may include and/or involve logic to communicate user and/or device authentication information to the fourth device.

The logic to detect a time interval between contact of the first device with the second device, and contact of the first device with the third device may include and/or involve logic to communicate pairing information to the third device sufficient to cause pairing with the second device to proceed only when the time interval does not exceed a threshold.

The additional pairing information employed by the second device and/or third device to pair may include and/or involve device and/or user authentication and/or authorization information. The logic to communicate information stored by the first device 416C prior to contact with either of the second device or the third device may include and/or involve logic to store at least one of user authentication information and/or financial transaction information. The additional pairing information employed by the second device and/or third device to pair may include and/or involve device and/or user authentication and/or authorization information.

The logic to communicate information stored by the first device 416C prior to contact with either of the second device or the third device may include and/or involve logic to store at least one of user authentication information and/or financial transaction information.

Retaining Information

The device 416C may include and/or involve logic to retain information about the pairing of the second device and the third device, after pairing of the second device and the third device is complete. The logic to retain information about the pairing of the second device and the third device, after pairing of the second device and the third device is complete may include and/or involve logic to apply the retained information to resume pairing of the second device and the third device, after pairing of the second device and the third device is interrupted. The logic to apply the retained information to resume pairing of the second device and the third device, after pairing of the second device and the third device is interrupted may include and/or involve logic to apply the retained information to resume pairing of the second device and the third device once the second device and the third device are once again in proximity. This could include and/or involve logic to apply the retained information to resume pairing of the second device and the third device once the first device 416C is once again in contact with the second device and/or the third device.

Discontinue Pairing

The first device 416C may include and/or involve logic to discontinue pairing of the second device and the third device. The logic to discontinue pairing of the second device and the third device may include and/or involve logic to discontinue pairing when the second device and/or third device are no longer proximate with the first device, and/or proximate with one another, and/or as a result of user action, and/or upon completion of a task or tasks, and/or after an amount of authorized user time lapses.

Manner of Contact

The first device 416C may include and/or involve logic 403C to detect a manner of contact between the first device 416C and the second device and/or the third device, as described herein. Various characteristics of the manner of contact may be detected and applied as an indication of how and/or whether pairing of the second device and the third device should be accomplished.

User Input and Feedback

The first device 416C may include and/or involve logic 407C to await user input as a result of activation of the at least one contact sensor 414C, as described herein. The first device 416C may include and/or involve logic to provide one or more audible and/or visual and/or tactile indications on the progress and/or results of pairing of the second device and the third device, as described herein.

Figure 5C:
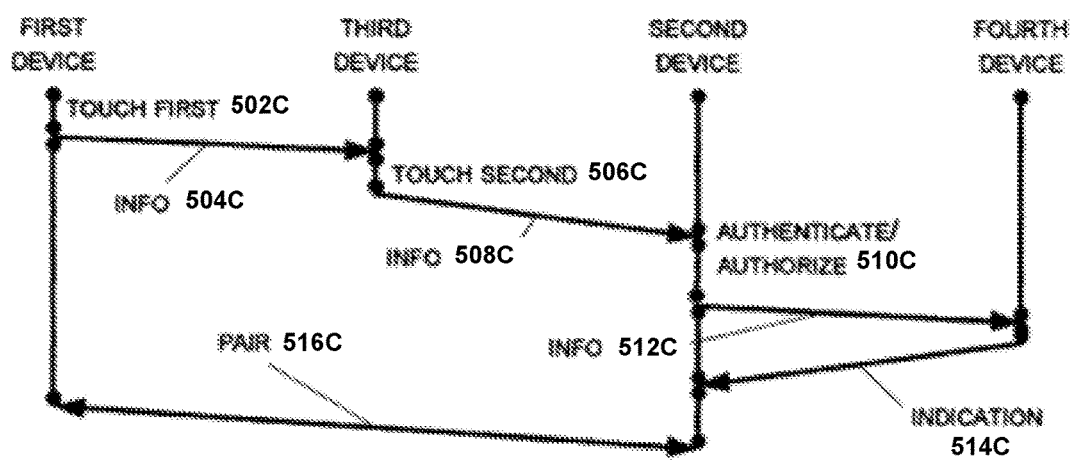
FIG. 5C is an action flow diagram of an embodiment of a pairing technique.

Overview of FIG. 5C

FIG. 5C is an action flow diagram of an embodiment of a pairing technique.

At 502C, the first device touches the third device.

At 504C, information about the pairing is communicated from the first device to the third device.

At 506C, the first device touches the second device.

At 508C, information is sent from the third device to the second device. (The information sent by the third device may include the pairing information it received from the first device).

At 510C, the second device begins analysis of the authentication and authorization information it now has.

At 512C, the second device communicates some of the information, such as its gathered information as to which devices will be pairing, what the purpose of the pairing is, and its gathered information which may be used for authentication and authorization, to a fourth device.

At 514C, the fourth device responds with a pairing go-ahead message, which may also include information as to the extent of pairing, i.e., the extent to which the second and third devices may work together in accomplishing the purpose.

At 516C, the second and third devices pair.

As shown, the decision to authorize pairing may be accomplished by logic of a fourth (e.g. different from the first, second, or third) device. In some systems, authentication information may reside in a central data store external to the two pairing partner devices or intermediate device.

Figure 6C:
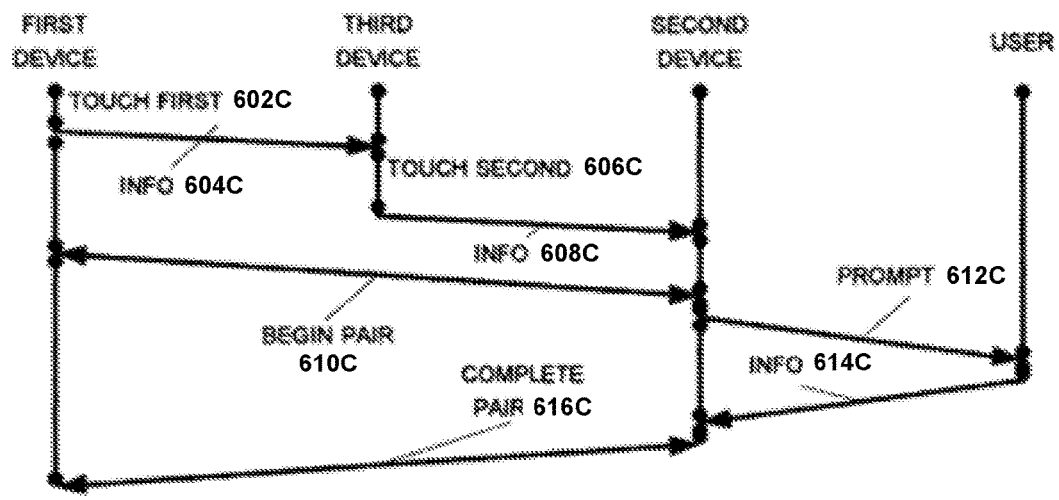
FIG. 6C is an action flow diagram of an embodiment of a pairing technique.

Overview of FIG. 6C

FIG. 6C is an action flow diagram of an embodiment of a pairing technique.

At 602C, the first device touches the third device.

At 604C, information about the pairing is communicated from the first device to the third device.

At 606C, the first device touches the second device.

At 608C, information is sent from the third device to the second device. (The information sent by the third device may include the pairing information it received from the first device).

At 610C, the first and third devices interact to begin the pairing process. The devices recognize that user input is needed to complete pairing. The first device is involved in the effecting of pairing in this action flow because it is performing an effecting role such as authentication or authorization analysis.

At 612C, the devices prompt for, then await, user input.

At 614C, the user performs an action providing the user input to the second device.

At 616C, the second and first device, which now have enough information to determine if pairing should occur, and to what extent, conclude the pairing activity. The outcome may be no pairing, limited pairing, or successful pairing with no restrictions of scope.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A system comprising:
   one or more electrical circuit devices including at least:
      circuitry configured for detecting at least one duration of direct physical contact of at least one mobile device with one or more of at least one home device or at least one office device;
      circuitry configured for determining, based at least on the detected at least one duration of direct physical contact of the at least one mobile device to the one or more of at least one home device or at least one office device, whether to effect pairing of the at least one mobile device and the one or more of at least one home device or at least one office device; and
      circuitry configured for pairing the at least one mobile device and the one or more of at least one home device or at least one office device as a result of the determination whether to effect pairing of the at least one mobile device and the one or more of at least one home device or at least one office device, the circuitry configured for pairing including at least circuitry configured for authenticating the pairing for securing at least one communication channel between the at least one mobile device and the one or more of at least one home device or at least one office device.

2. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
   circuitry configured for wirelessly communicating information between the at least one mobile device and the one or more of at least one home device or at least one office device.

3. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
   circuitry configured for extracting authentication information from information of at least one of the at least one mobile device, the at least one home device, or the at least one office device.

4. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:

circuitry configured for identifying at least one purpose, feature, attribute, or function associated with the at least one mobile device; and circuitry configured for identifying the at least one mobile device or a pairing of the at least one mobile device and the one or more of at least one home device or at least one office device as providing the identified at least one purpose, feature, attribute, or function.

5. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:

circuitry configured for cooperatively operating the at least one mobile device and the one or more of at least one home device or at least one office device involving communication between the at least one mobile device and the one or more of at least one home device or at least one office device.

6. The system of claim 1, further comprising:

circuitry configured discontinuing pairing of the at least one mobile device and the one or more of at least one home device or at least one office device.

7. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:

circuitry configured for identifying at least one of the at least one mobile device, the at least one home device, or the at least one office device.

8. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:

circuitry configured for communicating information stored by the at least one mobile device to the one or more of at least one home device or the at least one office device.

9. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:

circuitry configured for identifying at least one of characteristics, features, or functions of at least one of the at least one mobile device, the at least one home device, or the at least one office device.

10. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:

at least one of circuitry configured for identifying at least one person using at least one of the at least one mobile device, the at least one home device, or the at least one office device; or circuitry configured for identifying at least one characteristic of at least one person using at least one of the at least one mobile device, the at least one home device, or the at least one office device.

11. The system of claim 1, wherein the circuitry configured for determining, based at least on the detected at least one duration of direct physical contact of the at least one mobile device to the one or more of at least one home device or at least one office device, whether to effect pairing of the at least one mobile device and the one or more of at least one home device or at least one office device includes:

circuitry configured for detecting proximity between the at least one mobile device and the one or more of at least one home device or at least one office device and interpreting the proximity between the at least one mobile device and the one or more of at least one home device or at least one office device as an indication that pairing of the devices should be attempted.

12. The system of claim 1, wherein the circuitry configured for determining, based at least on the detected at least one duration of direct physical contact of the at least one mobile device to the one or more of at least one home device or at least one office device, whether to effect pairing of the at least one mobile device and the one or more of at least one home device or at least one office device includes:

circuitry configured for detecting increasing proximity between the at least one mobile device and the one or more of at least one home device or at least one office device and interpreting the increasing proximity between the at least one mobile device and the one or more of at least one home device or at least one office device as an indication that pairing of the devices should be attempted.

13. The system of claim 1, wherein the circuitry configured for determining, based at least on the detected at least one duration of direct physical contact of the at least one mobile device to the one or more of at least one home device or at least one office device, whether to effect pairing of the at least one mobile device and the one or more of at least one home device or at least one office device includes:

circuitry configured for determining, based at least on at least one detected duration of direct physical contact of the at least one mobile device to the one or more of at least one home device or at least one office device and based at least partly on wirelessly exchanging information needed for pairing, upon approaching or becoming proximate, at least one indication of whether information should be communicated between the at least one mobile device and the one or more of at least one home device or at least one office device.

14. The system of claim 1, wherein the circuitry configured for determining, based at least on the detected at least one duration of direct physical contact of the at least one mobile device to the one or more of at least one home device or at least one office device, whether to effect pairing of the at least one mobile device and the one or more of at least one home device or at least one office device includes:

circuitry configured for determining, based at least on at least one detected duration of direct physical contact of the at least one mobile device to the one or more of at least one home device or at least one office device and based at least on at least one of authentication, authorization, or compatibility information needed for pairing, at least one indication of whether pairing of the at least one mobile device and the one or more of at least one home device or at least one office device should be accomplished.

15. The system of claim 1, wherein the circuitry configured for detecting at least one duration of direct physical contact of at least one mobile device with one or more of at least one home device or at least one office device comprises:
circuitry configured for detecting at least one duration of direct physical contact involving one or more contact areas of at least one mobile device and the one or more of at least one home device or at least one office device.

16. The system of claim 1, wherein the circuitry configured for detecting at least one duration of direct physical contact of at least one mobile device with one or more of at least one home device or at least one office device comprises:
circuitry configured for detecting at least one duration of direct physical contact of at least one mobile device with one or more of at least one home device or at least one office device, wherein at least one of the at least one mobile device, the at least one home device, or the at least one office device is incorporated in one or more of a telephone, a personal digital assistant, a wearable article, a cellular telephone, a laptop computer, or a palmtop computer.

17. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
circuitry configured for establishing a secure channel for communication of pairing information.

18. The system of claim 1, further comprising:
circuitry configured for ascertaining relative motion between the at least one mobile device, the at least one home device, or the at least one office device.

19. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
circuitry configured for detecting a duration of at least one sound and applying the duration of the at least one sound as an indication of to what extent or whether pairing of the at least one mobile device and the one or more of at least one home device or at least one office device should take place.

20. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
circuitry configured for at least one of authorizing the pairing or authorizing an extent of pairing.

21. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
circuitry configured for configuring at least one of the at least one mobile device, the at least one home device, or the at least one office device with at least one of settings or information to facilitate paired operation.

22. The system of claim 1, further comprising:
at least one of
circuitry configured for communicating with at least one device different from the at least one mobile device or the one or more of at least one home device or at least one office device, to obtain information to effect pairing of the at least one mobile device and the one or more of at least one home device or at least one office device; or
circuitry configured for receiving user input from at least one user of the one or more of at least one home device or the at least one office device wherein the user input selects at least in part information to communicate to the at least one mobile device.

23. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
circuitry configured for pairing the at least one mobile device and the one or more of at least one home device or at least one office device to an extent determined by qualities or circumstances of one or more sounds.

24. The system of claim 1, further comprising:
circuitry configured for providing one or more of audible, visual, or tactile indications on at least one of progress or results of pairing of the at least one mobile device and the one or more of at least one home device or at least one office device.

25. The system of claim 1, wherein the circuitry configured for detecting at least one duration of direct physical contact of at least one mobile device to one or more of at least one home device or at least one office device includes:
circuitry configured for detecting multiple instances of direct physical contact of the at least one mobile device to the one or more of at least one home device or at least one office device; or
circuitry configured for detecting at least one intensity of direct physical contact for at least one of the at least one mobile device or the one or more of at least one home device or at least one office device.

26. The system of claim 1, wherein the circuitry configured for pairing the at least one mobile device and the one or more of at least one home device or at least one office device as a result of the determination whether to effect pairing of the at least one mobile device and the one or more of at least one home device or at least one office device includes:
at least one of
circuitry configured for exchanging at least one of authentication information, authorization information, compatibility, or configuration information between the at least one mobile device and the one or more of at least one home device or at least one office device;

circuitry configured for authenticating at least one user of the at least one mobile device or the one or more of at least one home device or at least one office device;

circuitry configured for authorizing at least one user of the at least one mobile device or the one or more of at least one home device or at least one office device;

circuitry configured for ascertaining relative motion between the at least one mobile device or the one or more of at least one home device or at least one office device prior to or after contact and at least one of authenticating or authorizing the pairing based at least partly on the relative motion;

circuitry configured for authorizing pairing of the at least one mobile device with the one or more of at least one home device or at least one office device including at least identifying at least one of the at least one mobile device, the at least one home device, or the at least one office device;

circuitry configured for authorizing pairing of the at least one mobile device with the one or more of at least one home device or at least one office device including at least determining at least one characteristic of at least one of the at least one mobile device, the at least one home device, or the at least one office device;

circuitry configured for authorizing at least an extent of pairing based at least partly on at least one of a time of day or a physical location of at least one of the at least one mobile device, the at least one home device, or the at least one office device; or circuitry configured for establishing at least one secure communication channel between the at least one mobile device and the one or more of at least one home device or at least one office device.

27. A method comprising:

detecting at least one duration of direct physical contact of at least one mobile device with one or more of at least one home device or at least one office device;

determining, based at least on the detected at least one duration of direct physical contact of the at least one mobile device to the one or more of at least one home device or at least one office device, whether to effect pairing of the at least one mobile device and the one or more of at least one home device or at least one office device; and pairing the at least one mobile device and the one or more of at least one home device or at least one office device as a result of the determination whether to effect pairing of the at least one mobile device and the one or more of at least one home device or at least one office device, the pairing including at least authenticating the pairing for securing at least one communication channel between the at least one mobile device and the one or more of at least one home device or at least one office device.

28. A system comprising:

means for detecting at least one duration of direct physical contact of at least one mobile device with one or more of at least one home device or at least one office device;

means for determining, based at least on the detected at least one duration of direct physical contact of the at least one mobile device to the one or more of at least one home device or at least one office device, whether to effect pairing of the at least one mobile device and the one or more of at least one home device or at least one office device; and means for pairing the at least one mobile device and the one or more of at least one home device or at least one office device as a result of the determination whether to effect pairing of the at least one mobile device and the one or more of at least one home device or at least one office device, the means for pairing including at least means for authenticating the pairing for securing at least one communication channel between the at least one mobile device and the one or more of at least one home device or at least one office device.

* * * * *